(12) United States Patent
Lauber et al.

(10) Patent No.: US 10,857,516 B2
(45) Date of Patent: Dec. 8, 2020

(54) CHROMATOGRAPHIC COMPOSITIONS

(71) Applicant: WATERS TECHNOLOGIES CORPORATION, Milford, MA (US)

(72) Inventors: Matthew A. Lauber, North Smithfield, RI (US); Daniel P. Walsh, Danvers, MA (US)

(73) Assignee: WATERS TECHNOLOGIES CORPORATION, Milford, MA (US)

(*) Notice: Subject to any disclaimer, the term of this patent is extended or adjusted under 35 U.S.C. 154(b) by 146 days.

(21) Appl. No.: 15/921,811

(22) Filed: Mar. 15, 2018

(65) Prior Publication Data
US 2018/0264438 A1 Sep. 20, 2018

Related U.S. Application Data

(60) Provisional application No. 62/472,342, filed on Mar. 16, 2017, provisional application No. 62/543,654, filed on Aug. 10, 2017.

(51) Int. Cl.
| | |
|---|---|
| B01J 20/286 | (2006.01) |
| B01J 20/32 | (2006.01) |
| C07F 7/08 | (2006.01) |
| B01J 20/289 | (2006.01) |
| B01J 20/10 | (2006.01) |

(Continued)

(52) U.S. Cl.
CPC ............ *B01J 20/286* (2013.01); *B01J 20/103* (2013.01); *B01J 20/22* (2013.01); *B01J 20/283* (2013.01); *B01J 20/289* (2013.01); *B01J 20/3204* (2013.01); *B01J 20/3206* (2013.01); *B01J 20/3219* (2013.01); *B01J 20/3227* (2013.01); *B01J 20/3259* (2013.01); *B01J 20/3261* (2013.01); *C07F 7/0836* (2013.01);

(Continued)

(58) Field of Classification Search
CPC ....... C07F 7/0836; C07F 7/0838; B01J 20/22; B01J 20/103; B01J 20/286; B01J 20/289; B01J 20/3204; B01J 20/3206; B01J 20/3219; B01J 20/3227; B01J 20/3259; B01J 20/3261; B01J 20/283; B01J 2220/46; B01J 2220/54
See application file for complete search history.

(56) References Cited

U.S. PATENT DOCUMENTS

| | | |
|---|---|---|
| 7,503,973 B1 | 3/2009 | Carlini |
| 9,169,245 B2 | 10/2015 | Armani et al. |

(Continued)

FOREIGN PATENT DOCUMENTS

| | | |
|---|---|---|
| WO | 2013-173501 A2 | 11/2013 |
| WO | 2013173494 A1 | 11/2013 |

OTHER PUBLICATIONS

International Search Report and Written Opinion of the International Searching Authority relating to corresponding Application No. PCT/IB2018/051748 issued by the European Patent Office, completed on May 8, 2018 and dated May 16, 2018.

(Continued)

*Primary Examiner* — Vishal V Vasisth
(74) *Attorney, Agent, or Firm* — Womble Bond Dickinson (US) LLP; Deborah M. Vernon; Benedict L. Hanrahan

(57) ABSTRACT

Provided herein are stationary phase compositions comprising a chromatographic surface of porous or non-porous core material comprising a surface modifier for use in chromatographic separations.

20 Claims, 18 Drawing Sheets

(51) Int. Cl.
 B01J 20/22 (2006.01)
 B01J 20/283 (2006.01)
(52) U.S. Cl.
 CPC ......... *C07F 7/0838* (2013.01); *B01J 2220/46* (2013.01); *B01J 2220/54* (2013.01)

(56) References Cited

U.S. PATENT DOCUMENTS

| | | | |
|---|---|---|---|
| 9,284,334 B2 | 3/2016 | Pastor Fernandez et al. | |
| 9,550,798 B2 | 1/2017 | Guckian et al. | |
| 2008/0293959 A1* | 11/2008 | Liu | B01J 20/288 556/449 |
| 2015/0136700 A1* | 5/2015 | Brousmiche | B01D 15/26 210/656 |

OTHER PUBLICATIONS

Stevenson, et al., "Selective stationary phases: (II) Adsorption behaviour of substituted aromatic compounds on n-alkyl-phenyl stationary phases," Journal of Chromatography: vol. 1217, No. 33, pp. 5365-5376, (Aug. 2010).
Unger, et al., "Recent developments in the evaluation of chemincally bonded silica packings for liquid chromatography", Journal of Chromatography: vol. 125, pp. 115-127 (1976).
Kirkland, J.J., "Microparticles with bonded hydrocarbon phases for high-performance reverse-phase liquid Chromatography," Chromatographia: vol. 8, No. 12, pp. 661-668; (1975).
Dong et al., "High-Throughput, Automated Protein A Purification Platform with Multiattribute LC-MS Analysis for Advanced Cell Culture Process Monitoring" Anal. Chem. 2016, 88 (17), 8673-9.
Halo Protein C4, Advanced Material Technologies, <https://www.advanced-materials-tech.com/halo-bioclass/halo-protein/>, accessed on Oct. 3, 2018.
Hayes, R., et al., Core-shell particles: preparation, fundamentals and application in high performance liquid chromatography, Journal of Chromatography, A 2014, 1357, 36-52.
Lundin, K. E.; Gissberg, O.; Smith, C. I., Oligonucleotide Therapies: The Past and the Present. Human gene therapy 2015, 26 (8), 475-85.
Keeler, A. M.; ElMallah, M. K.; Flotte, T. R., Gene Therapy 2017: Progress and Future Directions. Clinical and translational science 2017, 10 (4), 242-248.
Fekete et al., Adsorption and Recovery Issues of Recombinant Monoclonal Antibodies in Reversed-Phase Liquid Chromatography, Journal of Separation Science, 38 (1) pp. 1-8, Jan. 2015.
Schuster et al., Optimized Superficially Porous Particles for Protein Separations, Journal of Chromatography, A 2013, 1315, 118-26.
Kirkland, et al., Superficially Porous Silica Microspheres for Fast High-Performance Liquid Chromatography of Macromolecules, Journal of Chromatography, A 2000, 890 (1) 3-13.
Ren, D, et al., Reversed-phase liquid Chromatography-Mass Spectrometry of Site-Specific Chemical Modifications in intact Immunoglobulin Molecules and Their Frangments, Journal of Chromatogrphy, A 2008, 1179 (2), 198-204.
Ren D., et al., Reversed-phase Liquid Chromatography of Immunoglobulin G Molecules and Their Fragments with the Diphenyl Column, Journal of Chromatography, A 2007, 1175 (1), 63-8.
Rehder, D.S. et al., Reversed-phase Liquid Chromatography/Mass Spectrometry Analysis of Reduced Monoclonal Antibodies in Pharmaceutics, Journal of Chromatography, A 2006, 1102 (1-2), 164-75.
Guiochon, G. et al., Shell Particles, trials, tribulations and triumphs, Journal of Chromatography, A 2011, 1218 (15), 1915-38.
Makino, K.; Ozaki, H.; Matsumoto, T.; Imaishi, H.; Takeuchi, T.; Fukui, T., Reversed-phase ion-pair chromatography of oligodeoxyribonucleotides. Journal of chromatography 1987, 400, 271-7.
Gilar, M., Analysis and purification of synthetic oligonucleotides by reversed-phase high-performance liquid chromatography with photodiode array and mass spectrometry detection. Analytical biochemistry 2001, 298 (2), 196-206.
Wagner, B.M. et al., Superficially Porous Silica Particles with Wide Pores for Biomacromolecular Separations, Journal of Chromatography, A 2012, 1264, 22-30.
Wagner, B. M. et al., Tools to Improve Protein Separations, LCGC North America 2015, 33 (11).

* cited by examiner

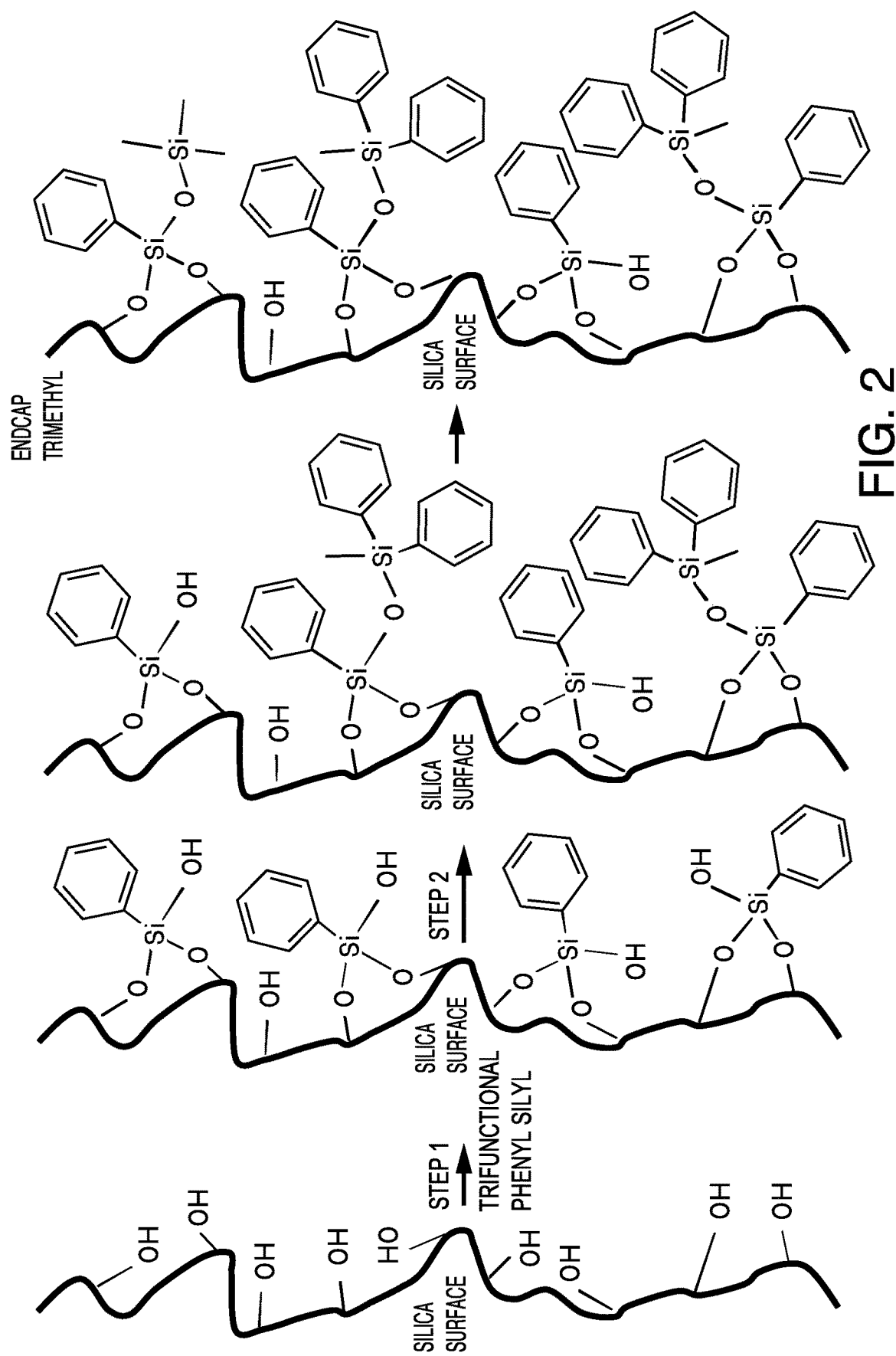

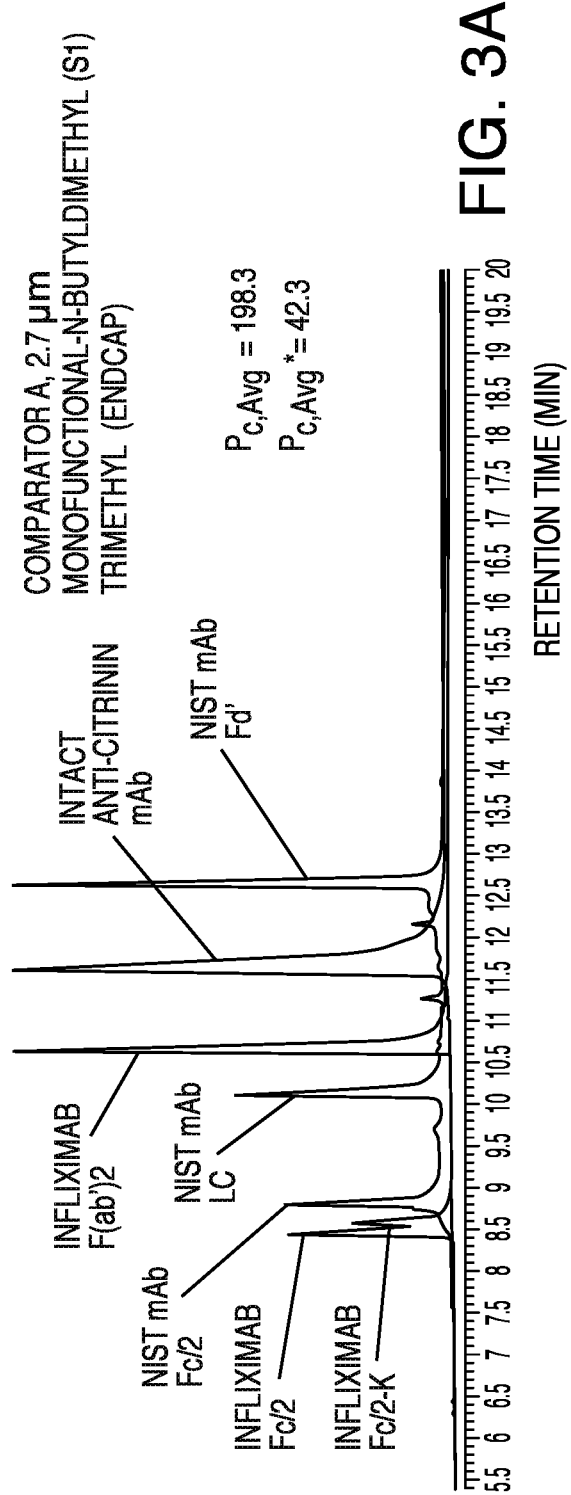
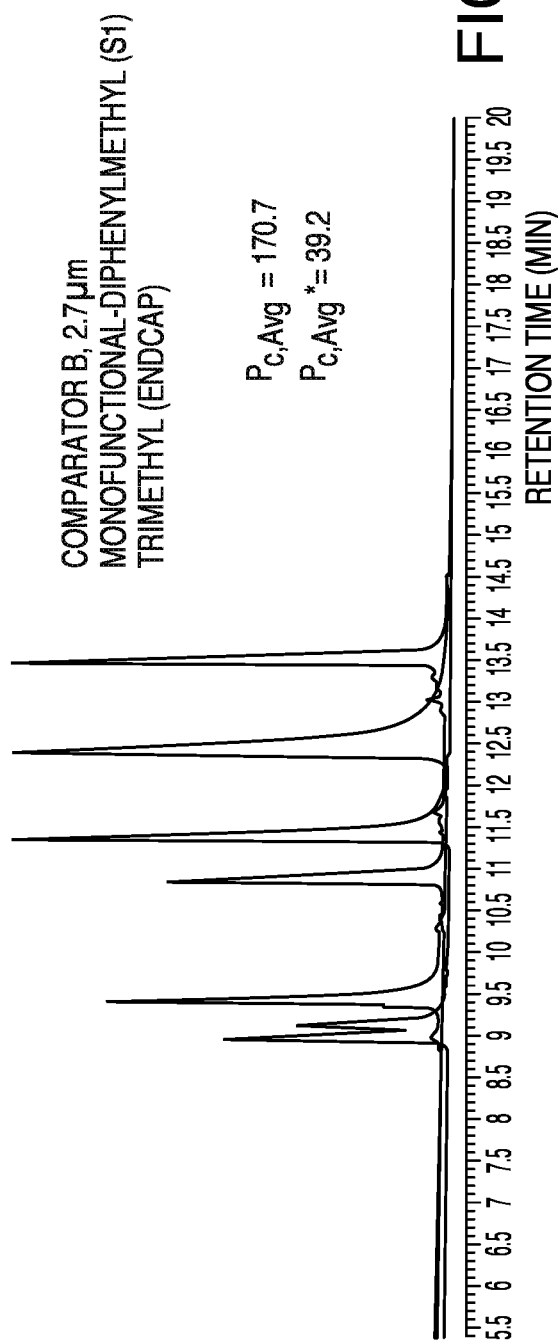

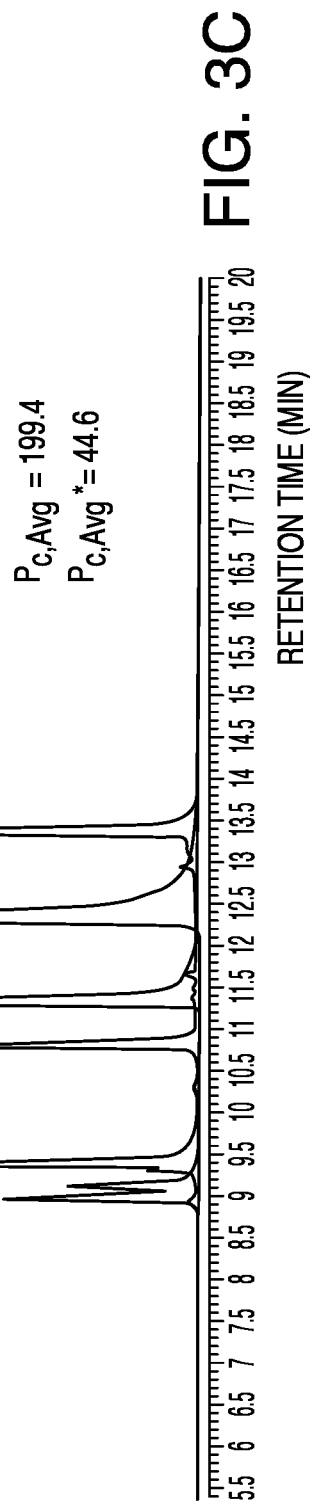
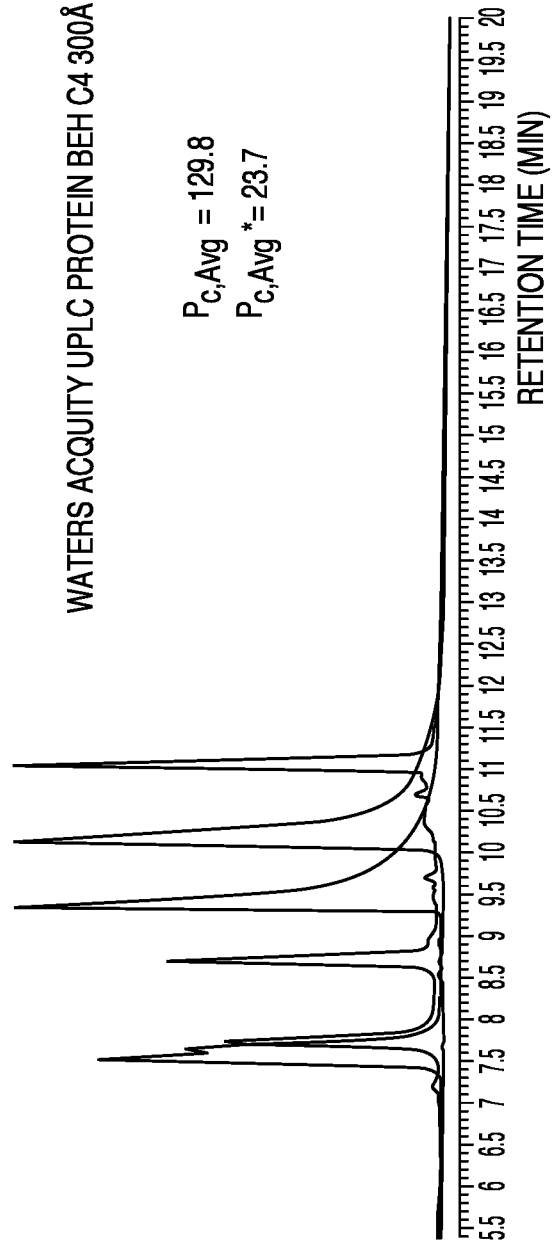

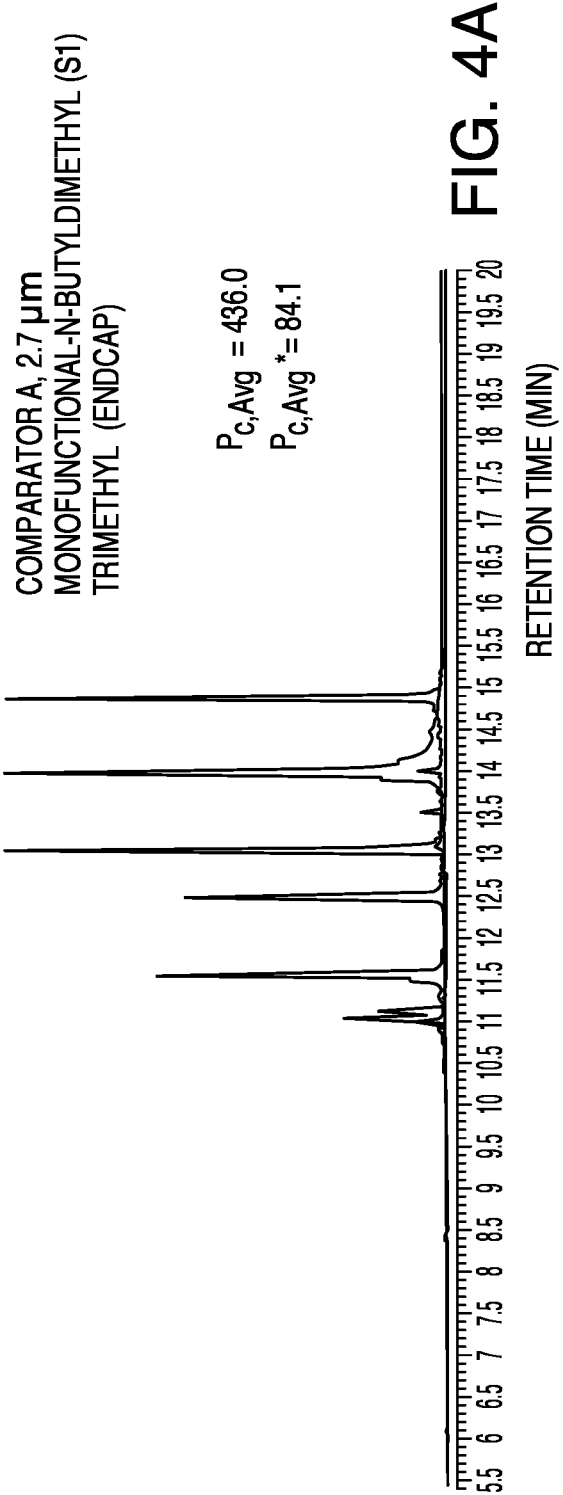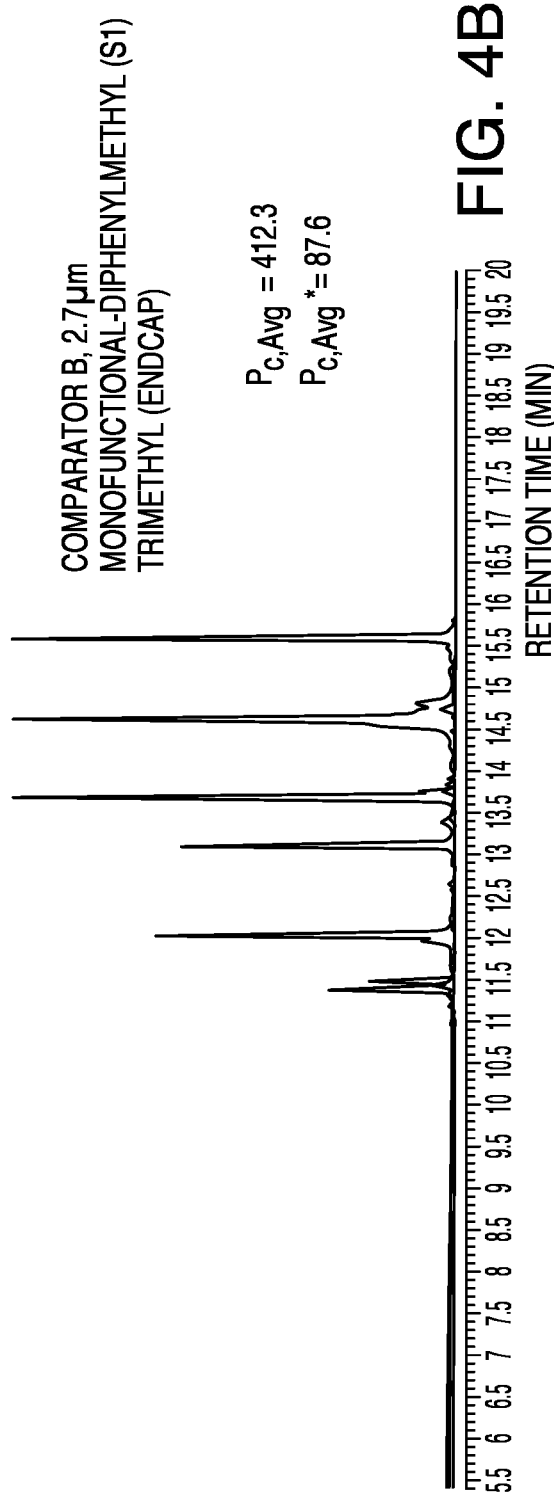

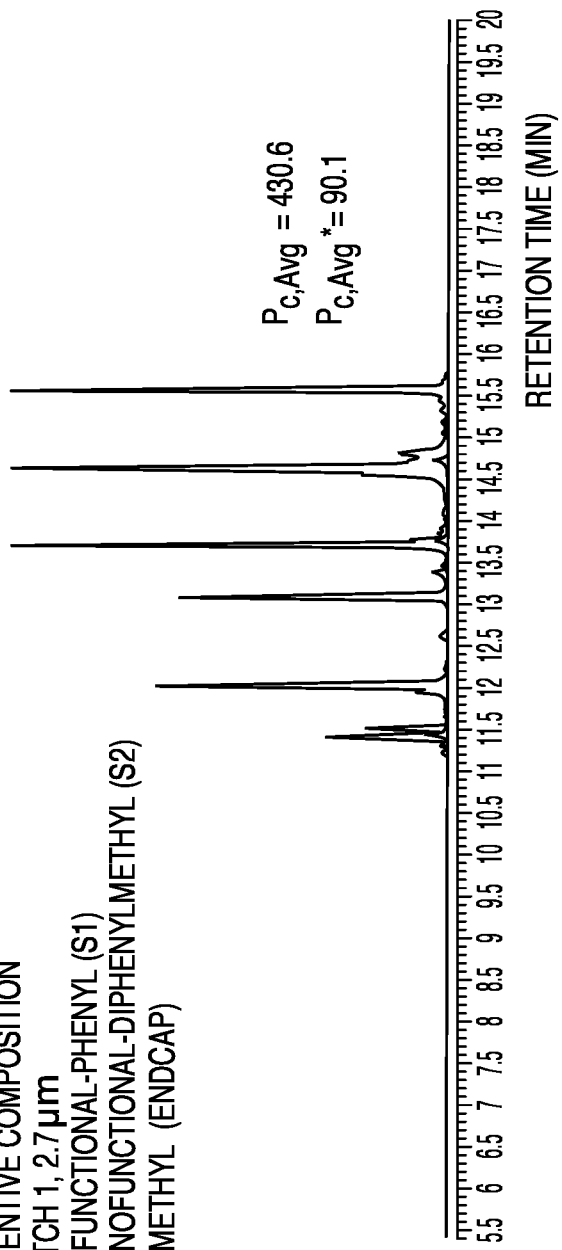
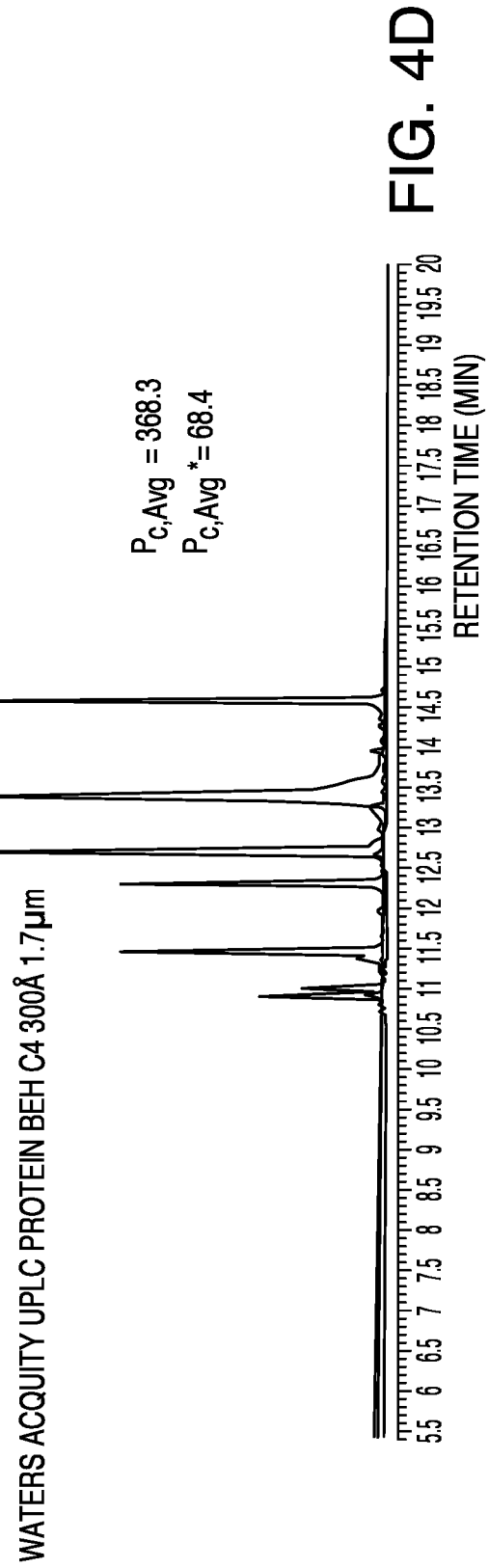

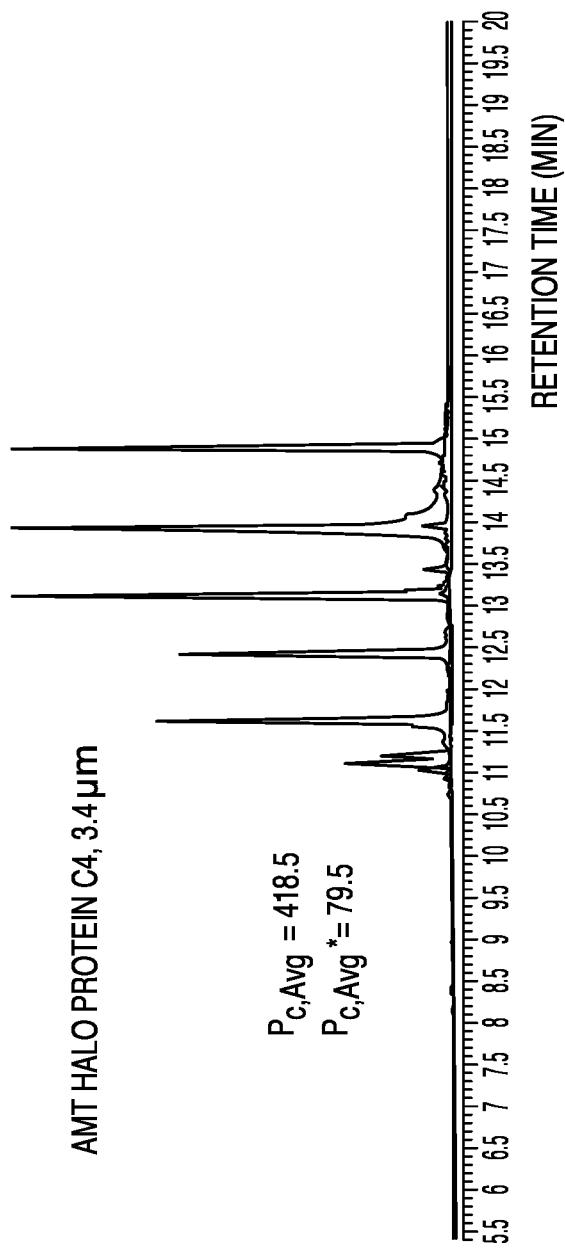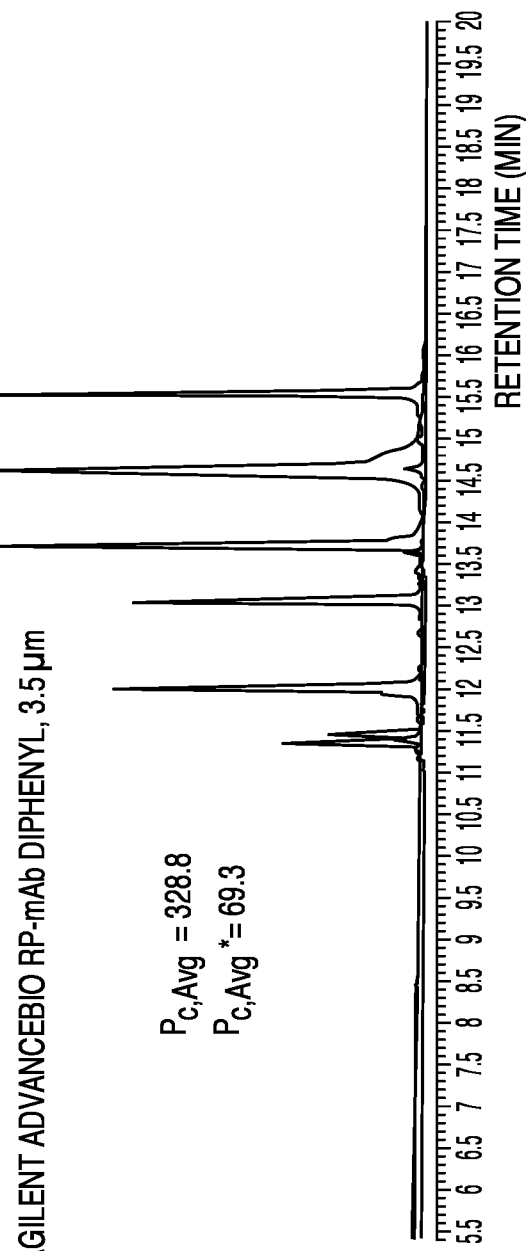

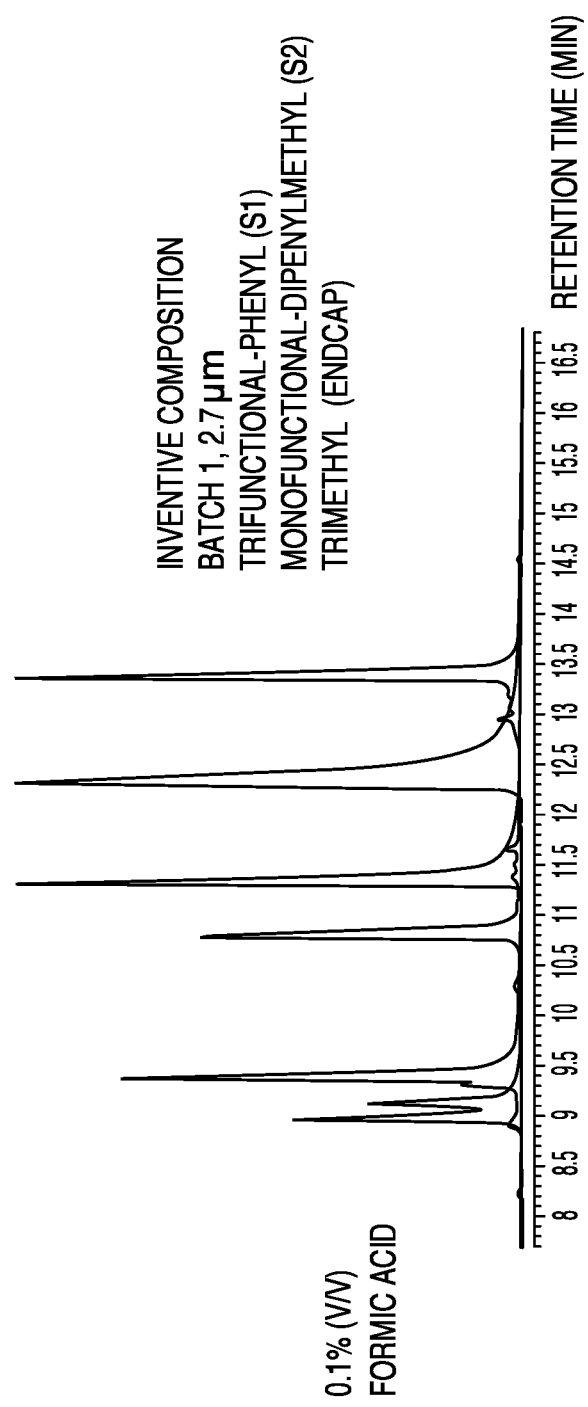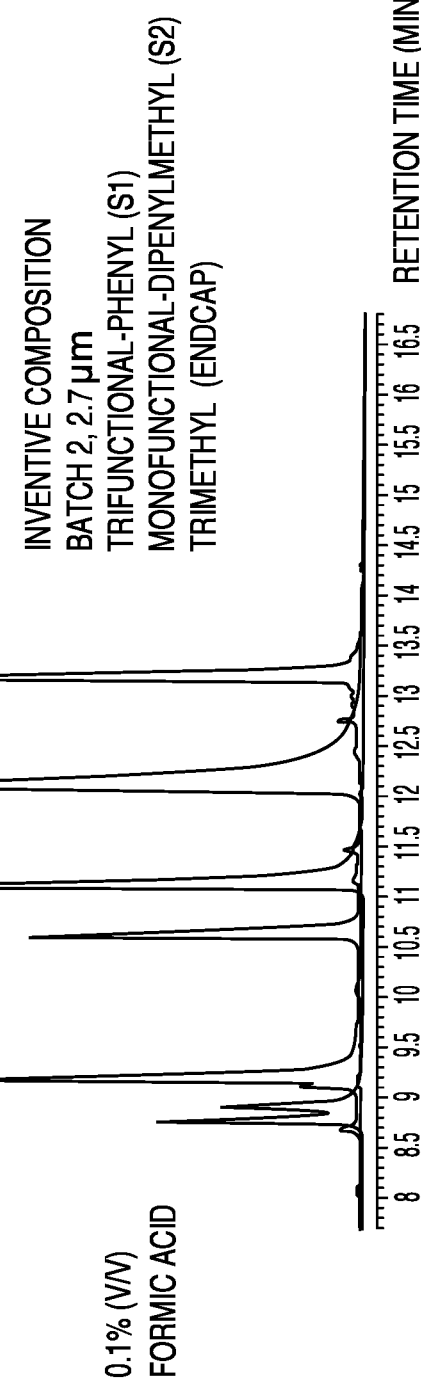

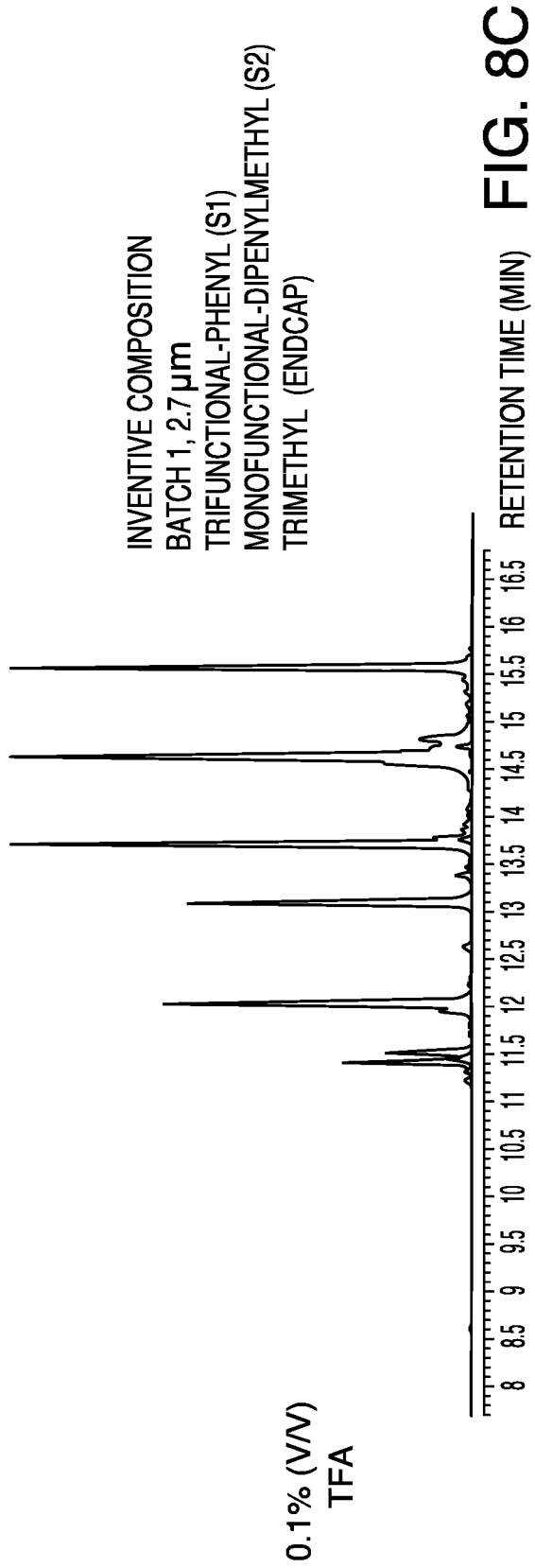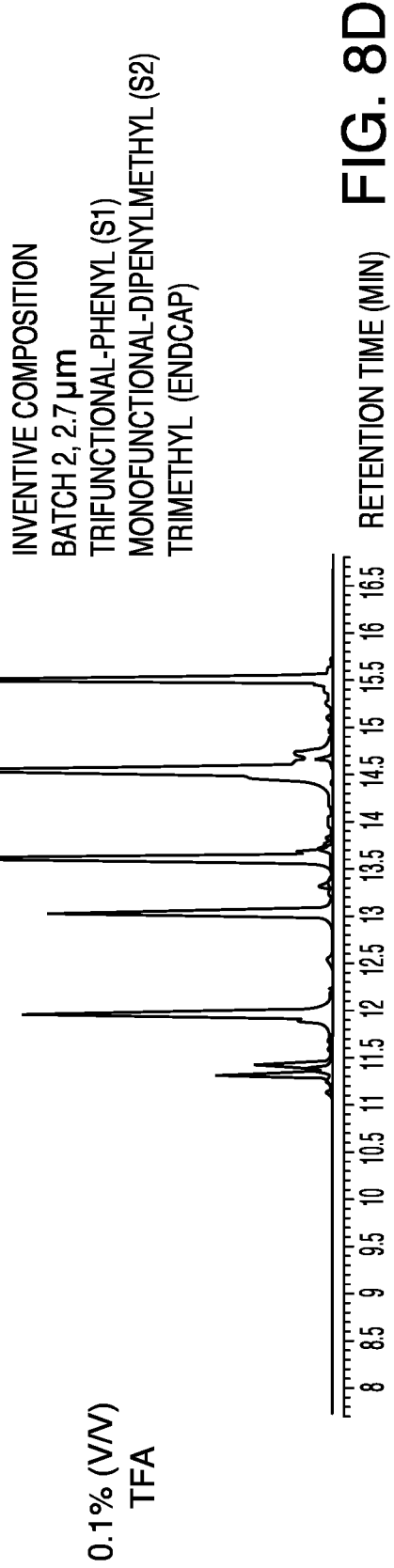

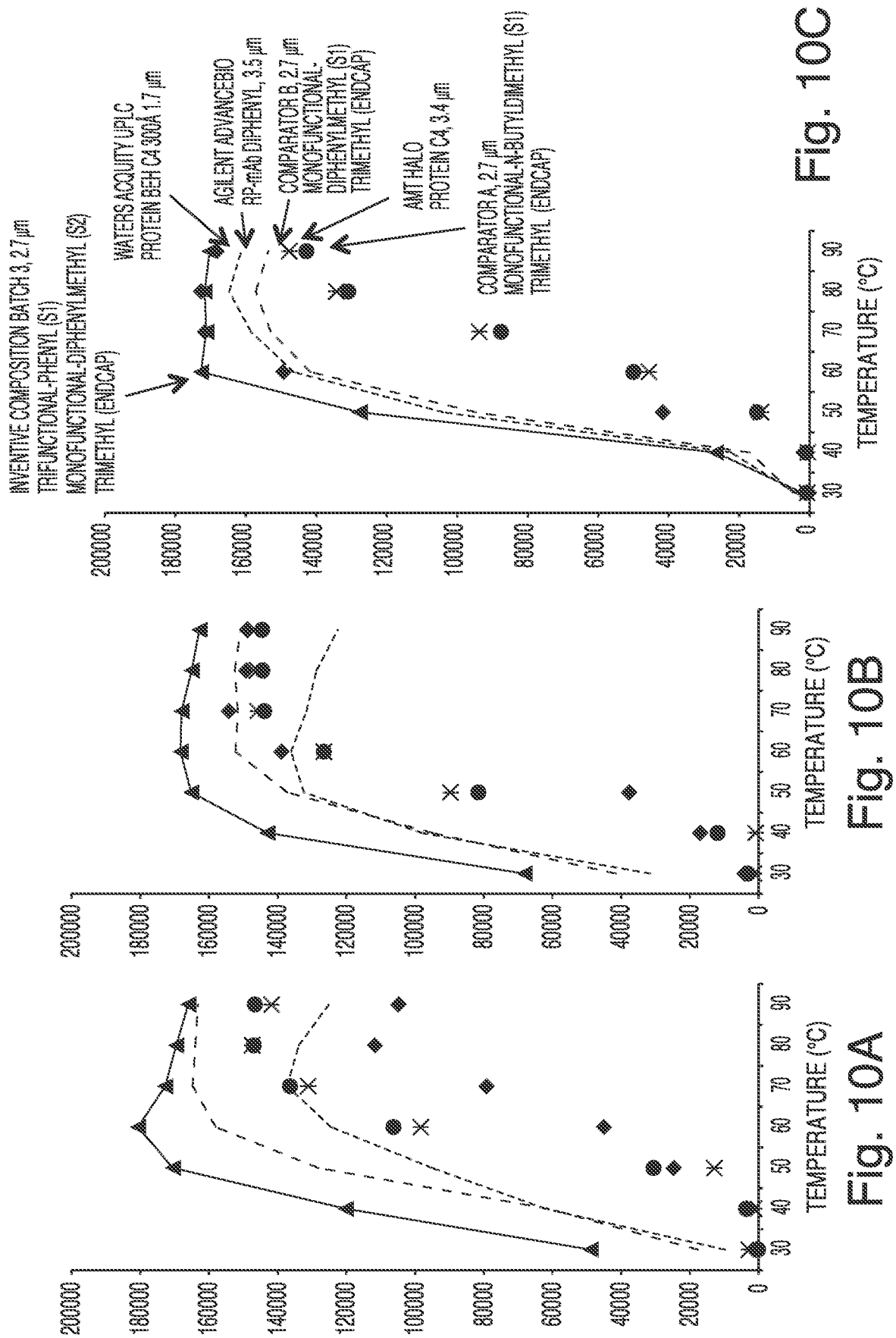

CHROMATOGRAPHIC COMPOSITIONS

CROSS REFERENCE TO RELATED APPLICATIONS

This application claims benefit of and priority to U.S. Provisional Application Nos. 62/472,342 entitled "Chromatographic Compositions" filed Mar. 16, 2017, and 62/543,654 entitled "Chromatographic Compositions" filed Aug. 10, 2017, the contents of each of which are incorporated herein by reference in their entirety.

FIELD OF THE TECHNOLOGY

The technology relates generally to chromatographic compositions. The invention relates more particularly, in various embodiments, to stationary phase compositions comprising a chromatographic surface of porous or non-porous core material comprising a surface modifier for use in chromatographic separations.

BACKGROUND

Liquid chromatography (LC) combined with mass spectrometry (MS) is one of the most powerful analytical tools for the characterization of proteins. Indeed, for the analysis of biopharmaceuticals, reversed phase liquid chromatography (RPLC) coupled with MS is frequently relied upon for measuring intact mass, for profiling product related impurities, and for assaying multiple product attributes—all in a single analysis. See e.g., Analytical chemistry 2016, 88 (17), 8673-9.

Much like the area of protein-based therapeutics, protein reversed phase chromatography has iteratively evolved into being a higher and higher resolution technique. The most frequently exploited substrate for chromatographic particles has been silica, since it can be manipulated into structurally rigid, high purity compositions that are amenable to the demands of modern liquid chromatography. Silica particles are routinely converted into protein RPLC materials through silane bondings. In these instances, silica stationary phases are prepared by reacting a primary silyl ligand such as a $C_4$-$C_8$alkyl silane, followed by a secondary endcapping reaction typically using a smaller silane (e.g., trimethylsilane). This synthetic practice for forming protein RPLC stationary phases manifests in the most recent commercially available column technologies. See e.g., HALO® Protein C4 offered by Advanced Materials Technology, Inc.

Despite the availability of various particle and bonded phase technologies, analytical challenges have persisted. It has been found, e.g., that monoclonal antibodies (mAbs), the most ubiquitous therapeutic protein modalities, often exhibit unique and problematic chromatographic behavior when analyzed by RPLC. For example, peak shape and recovery of mAbs from an RPLC separation are often complicated by secondary interactions. See e.g., Journal of separation science 2015, 38 (1), 1-8. As a result, methods for performing protein RPLC separations of mAbs and other proteins typically require the use of high temperatures and strongly acidic ion pairing agents. Unfortunately, the use of strongly acidic ion pairing agents, like TFA, suppresses electrospray ionization, thereby leading to impaired MS detection. On the other hand, less acidic mobile phase additives favor more sensitivity, but it is has been difficult to achieve high quality protein separations under less acidic conditions.

In sum, state-of-the-art protein reversed phase separations still suffer from varying degrees of peak tailing, distorted baselines, incomplete protein elution, poor recovery, high temperature dependence, low resolution, insufficient peak capacity, inadequate MS compatibility and/or undesirably poor low pH stability. There is consequently an unmet need for stationary phases that addresses these types of shortcomings.

SUMMARY

Provided herein are stationary phase compositions comprising a chromatographic surface of porous or non-porous core material comprising a surface modifier having the Formula I, II, III, or IV:

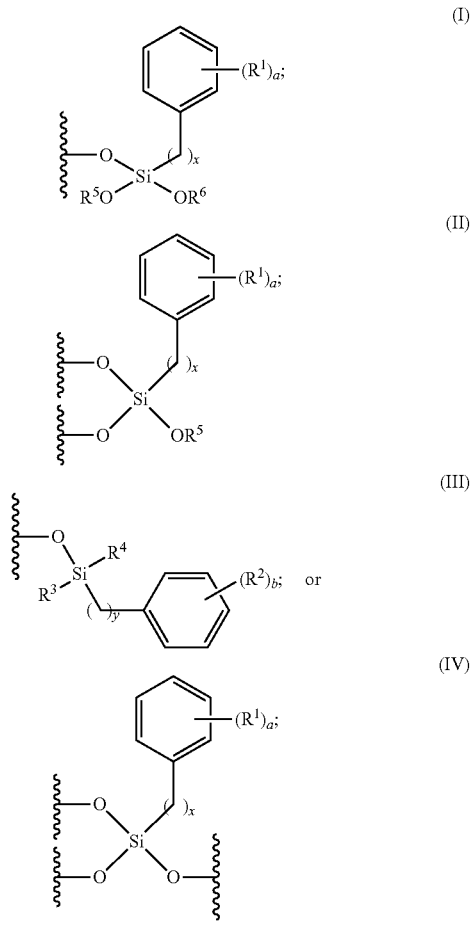

or a combination thereof, wherein each of a, b, x, y, $R^1$, $R^2$, $R^3$, $R^5$, and $R^6$ are as defined herein. These compositions display advantages over earlier chemistries and provide solutions to many of the unmet needs described above.

For example, in one aspect, the disclosed stationary phase compositions yield substantial improvements in peak capacity. See e.g., FIGS. 5A and 6B, where the effective peak capacity of the inventive compositions was at least 15% and 17% higher than commercially available counterparts under the common acidic ion pairing agents trifluoroacetic acid (TFA) and formic acid, respectively.

In another aspect, the disclosed stationary phase compositions solve issues involving incomplete peak elution and poor baseline quality. For example, the peak areas of an Fc/2 NIST mAb subunit was appreciably higher with the disclosed stationary phases than commercially available non-phenyl based counterparts. See e.g., FIG. 7. In turn, the resulting chromatograms were cleaner and easier to interpret. Excellent batch-to-batch reproducibility was also seen using the disclosed stationary phase compositions. See e.g., FIG. 8A.

In yet another aspect, the disclosed stationary phase compositions are stable at low pH (e.g., from 1 to 3) and at elevated temperatures such as 60° C. or above (e.g., 80° C. or above). See e.g., FIG. 9 and FIG. 10. In one aspect, the disclosed stationary phase compositions are stable at temperatures of 40° C. to 60° C. such as 50° C. See e.g., FIG. 10. The ability to perform protein reverse phase separations at these lower temperatures with high recovery provides means to minimize the degradation of protein analytes via hydrolysis or other mechanistic pathways.

Also described herein is the use of the disclosed stationary phase compositions for the separation of samples (e.g., a protein).

Further described herein is a novel multistep phenyl-based silanization process to form the disclosed stationary phase compositions having improved performance.

The technology relates to a stationary phase composition that includes a chromatographic surface of porous or non-porous core material including a surface modifier having the Formula I, II, III, or IV:

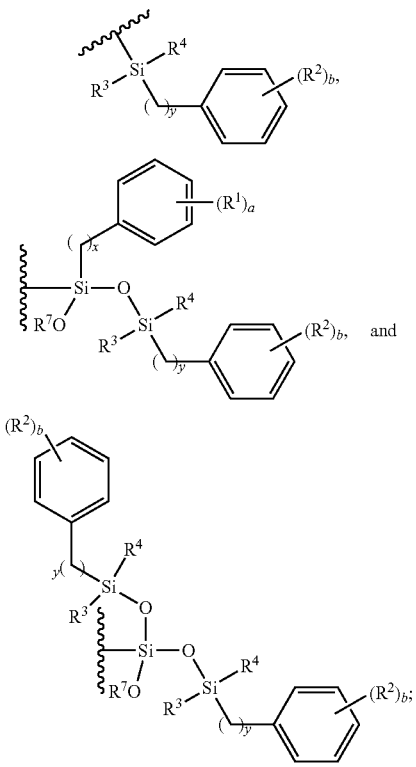

or a combination thereof. In Formulas I, II, III or IV, x and y are each independently integers from 0 to 10; a is 0 to 5; b is 0 to 5; $R^1$ and $R^2$ are each independently selected from $(C_1\text{-}C_3)$alkyl, hydroxyl, fluorine, chlorine, bromine, cyano, —$C(O)NH_2$, and carboxyl; $R^3$ and $R^4$ are each independently aryl optionally substituted with 1 to 5 groups selected from $(C_1\text{-}C_3)$alkyl, hydroxyl, fluorine, chlorine, bromine, cyano, —$C(O)NH_2$, and carboxyl, or $R^3$ and $R^4$ are each independently $(C_1\text{-}C_4)$alkyl optionally substituted with cyano; $R^5$ and $R^6$ are each independently selected from hydrogen, trimethylsilyl, triethylsilyl, triisopropylsilyl, tert-butyldimethylsilyl, n-butyldimethylsilyl,

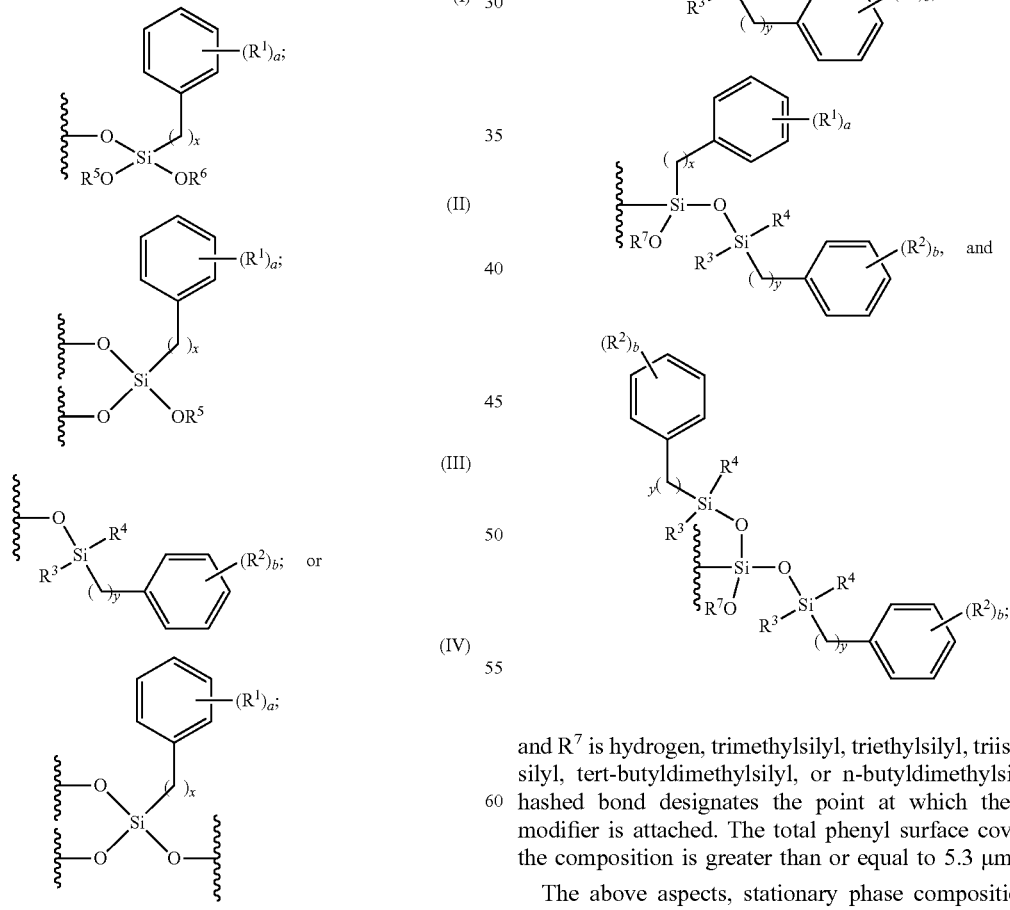

and $R^7$ is hydrogen, trimethylsilyl, triethylsilyl, triisopropylsilyl, tert-butyldimethylsilyl, or n-butyldimethylsilyl. The hashed bond designates the point at which the surface modifier is attached. The total phenyl surface coverage of the composition is greater than or equal to 5.3 µmol/m².

The above aspects, stationary phase compositions, and processes can include one or more of the following features.

In some embodiments, the surface modifier of Formula II is of the formula:

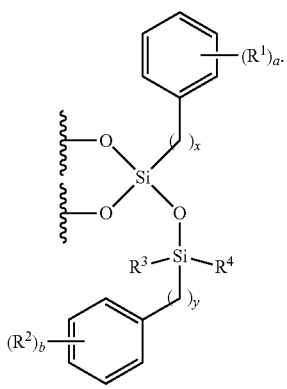

In some embodiments, the surface modifier of Formula II is of the formula:

In some embodiments, the surface modifier of Formula II is of the formula:

wherein R⁵ is selected from trimethylsilyl, triethylsilyl, triisopropylsilyl, tert-butyldimethylsilyl, and nbutyldimethylsilyl. In some embodiments, R⁵ is trimethylsilyl.

In some embodiments, the surface modifier of Formula II is of the formula:

wherein R⁵ is selected from

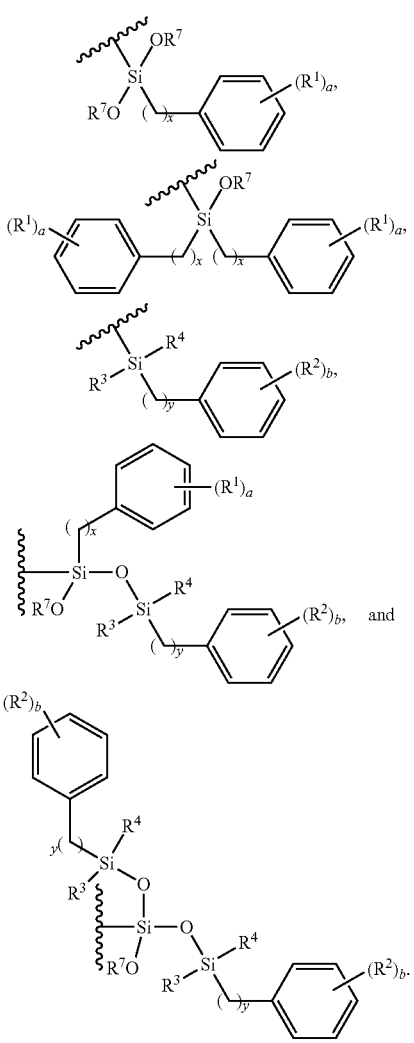

In some embodiments, the surface modifier of Formula I is of the formula:

wherein R⁵ is selected from hydrogen, trimethylsilyl, triethylsilyl, triisopropylsilyl, tert-butyldimethylsilyl, and n-butyldimethylsilyl; and R⁶ is selected from

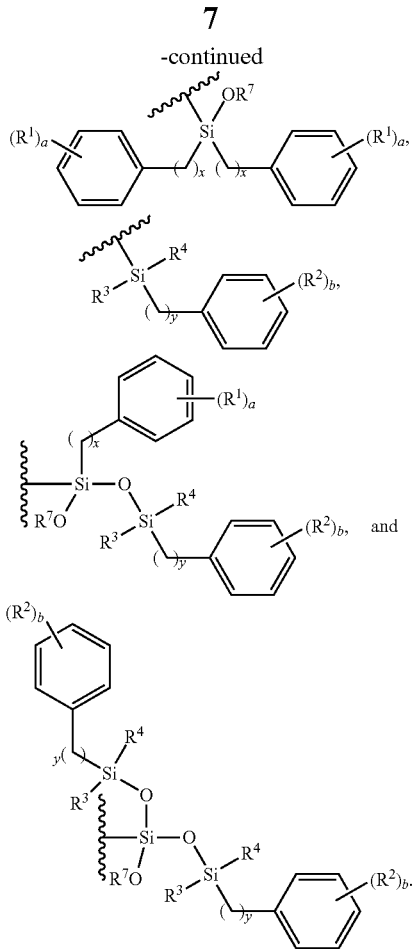

In some embodiments, the surface modifier of Formula I is of the formula

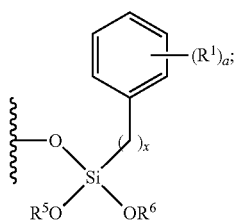

wherein $R^5$ is selected from hydrogen, trimethylsilyl, triethylsilyl, triisopropylsilyl, tert-butyldimethylsilyl, and n-butyldimethylsilyl; and $R^6$ is selected from

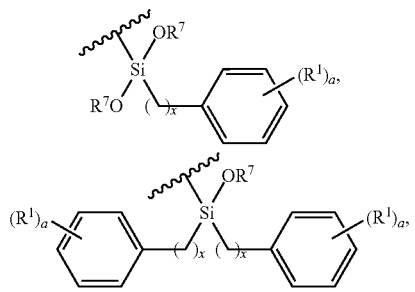

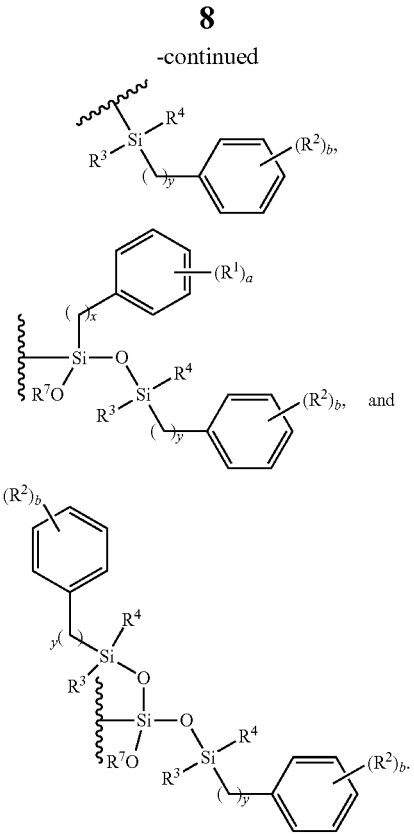

In some embodiments, the surface modifier of Formula I is of the Formula

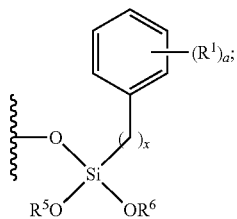

wherein $R^5$ and $R^6$ are each independently selected from hydrogen,

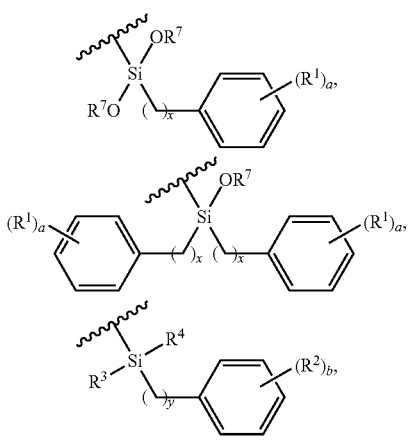

-continued

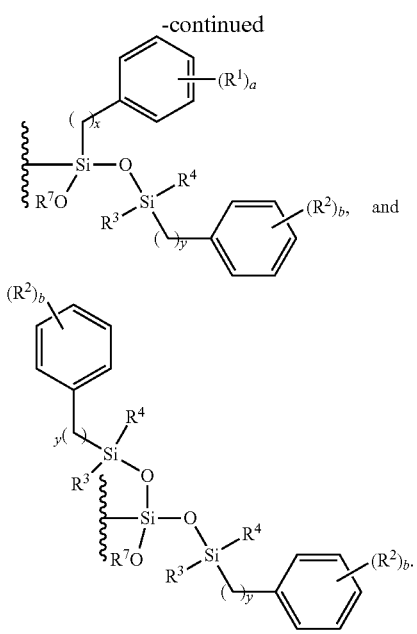

The surface of the porous or non-porous core material can also include a surface modifier having the Formula V:

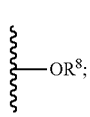

(V)

wherein $R^8$ is selected from trimethylsilyl, triethylsilyl, triisopropylsilyl, tert-butyldimethylsilyl, and n-butyldimethylsilyl. In some embodiments, $R^8$ is trimethylsilyl.

In some embodiments, each b is 0 to 3. Each b can be 0. In some embodiments, each a is 0 to 3. Each a can be 0. In some embodiments, wherein each x is 0 to 4. Each x can be 0. In some embodiments, each y is 0 to 4. Each y can be 0.

In some embodiments, each $R^3$ and $R^4$ are independently aryl or $(C_1-C_4)$alkyl optionally substituted with cyano. Each $R^3$ can be phenyl or napthyl. In some embodiments, Each $R^3$ is phenyl or napthyl and each $R^4$ is $(C_1-C_4)$alkyl. Each $R^3$ can be phenyl and each $R^4$ is $(C_1-C_4)$alkyl. In some embodiments, each $R^7$ is hydrogen or trimethylsilyl.

In some embodiments, the total phenyl surface coverage of the composition is greater than or equal to 5.4 µmol/m². The total phenyl surface coverage of the composition can be greater than or equal to 5.5 µmol/m². In some embodiments, the composition is the form of a plurality of particles having an average particle size of about 0.5 to about 20 µm. The material can be in the form of a monolith.

In some embodiments, the composition is stable at pH of 1 to 5. The composition can be stable at pH of 1 to 3. In some embodiments, the composition is stable at pH of 10 to 14.

The composition can be stable at temperatures up to and including 100° C. In some embodiments, the composition is stable at temperatures up to and including 80° C.

In some embodiments, the composition is the form of a particle.

The composition can have a surface area of about 0.1 to about 1100 m²/g. In some embodiments, the composition has a surface area of about 0.5 to about 500 m²/g. The composition can have a surface area of about 0.7 to about 330 m²/g. The composition can have a surface area of about 5 to about 1100 m²/g. In some embodiments, the composition has a surface area of about 10 to about 500 m²/g. The composition can have a surface area of about 15 to about 330 m²/g.

In some embodiments, the composition has a pore volume of about 0.001 to about 1.7 cm³/g. The composition can have a pore volume of about 0.1 to about 1.7 cm³/g. In some embodiments, the composition has a pore volume of about 0.01 to about 1.3 cm³/g. The composition can have a pore volume of about 0.15 to about 1.3 cm³/g.

In some embodiments, the composition can have a micropore surface area of less than about 110 m²/g. The composition can have a micropore surface area of less than about 105 m²/g. In some embodiments, the composition has a micropore surface area of less than about 80 m²/g. The composition can have a micropore surface area of less than about 50 m²/g.

In some embodiments, the composition has an average pore diameter of about 20 to about 1500 Å. The composition can have an average pore diameter of about 50 to about 1200 Å. In some embodiments, the composition has an average pore diameter of about 100 to about 1100 Å. The composition can have an average pore diameter of about 200 to about 1000 Å. In some embodiments, the composition has an average pore diameter of about 300 to about 1000 Å. The composition can have an average pore diameter of about 300 to about 700 Å.

In some embodiments, the composition is a particle comprising a chromatographic core having a ratio of core diameter to particle diameter of about 0.05 to about 0.99. The composition can be a particle comprising a chromatographic core having a ratio of core diameter to particle diameter is about 0.2 to about 0.9. In some embodiments, the composition is in the form of a non-porous particle.

A chromatography column can include the stationary phase composition of any of the embodiments described above. The internal diameter of the column can range from 75 microns to 50 mm size. The column length can be from 20 mm to 300 mm.

A reversed-phase liquid chromatography method for the separation of one or more proteins is disclosed. The method includes applying a sample comprising one or more proteins to the stationary phase composition of any of the embodiments described above. The method also includes eluting the sample through the stationary phase composition using a mobile phase and isolating the one or more proteins. The method can include one or more of the following features.

In some embodiments, the mobile phase is selected from acetonitrile, methanol, ethanol, isopropanol, n-propanol, n-butanol, n-pentanol, tetrahydrofuran, and water, or a combination thereof. The mobile phase can be selected from acetonitrile, isopropanol, n-propanol, n-butanol, n-pentanol, and water, or a combination thereof. In some embodiments, the mobile phase is a combination of acetonitrile and water. The mobile phase can also include a pH modifier. In some embodiments, the mobile phase also includes a pH modifier selected from trifluoroacetic acid, formic acid, phosphoric acid, sulfonic acid, hydrochloric acid, perchloric acid, and chloroacetic acid. The mobile phase can also include trifluoroacetic acid.

In some embodiments, the pH of the mobile phase is less than 3.5. The pH of the mobile phase can be less than 3.0.

In some embodiments, sample is eluted at a temperature of greater than or equal to 40° C. The sample can be eluted at a temperature of greater than or equal to 60° C.

In some embodiments, the method includes the step of performing UV or fluorescence detection. The method can also include the step of performing mass spectrometry after eluting said sample. In some embodiments, the method includes the step of performing electrospray mass spectrometry after eluting said sample.

In some embodiments, the protein is a monoclonal antibody or fragment thereof.

A process for preparing a stationary phase composition including a chromatographic surface of porous or non-porous core material is disclosed. The process includes reacting a silica or an organosilica particle with a trifunctional phenyl silane to form a first surface modification. The process also includes reacting the silica or an organosilica particle again with a monofunctional phenyl silane to form a second surface modification, wherein the total phenyl surface coverage of the composition is greater than or equal to 5.3 μmol/m². The process can include one or more of the following features.

In some embodiments, the process also includes the step of endcapping.

In some embodiments, the process produces a surface modification comprising the Formula I, II, III, or IV:

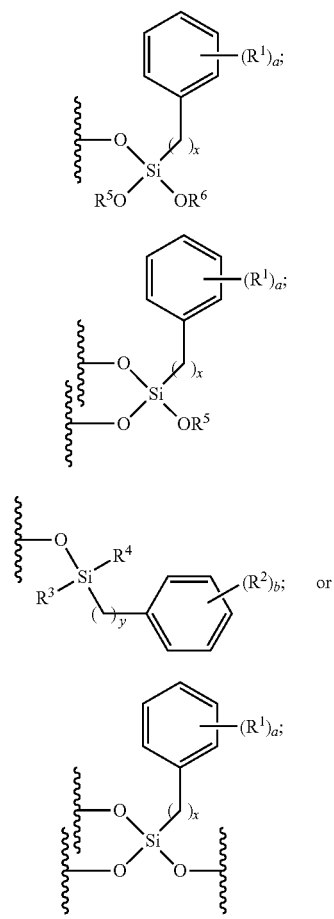

or a combination thereof, where x and y are each independently integers from 0 to 10; a is 0 to 5; b is 0 to 5; $R^1$ and $R^2$ are each independently selected from $(C_1-C_3)$alkyl, hydroxyl, fluorine, chlorine, bromine, cyano, —C(O)NH$_2$, and carboxyl; $R^3$ and $R^4$ are each independently aryl option-ally substituted with 1 to 5 groups selected from $(C_1-C_3)$ alkyl, hydroxyl, fluorine, chlorine, bromine, cyano, —C(O)NH$_2$, and carboxyl, or $R^3$ and $R^4$ are each independently $(C_1-C_4)$alkyl optionally substituted with cyano; $R^5$ and $R^6$ are each independently selected from hydrogen, trimethylsilyl, triethylsilyl, triisopropylsilyl, tert-butyldimethylsilyl, n-butyldimethylsilyl,

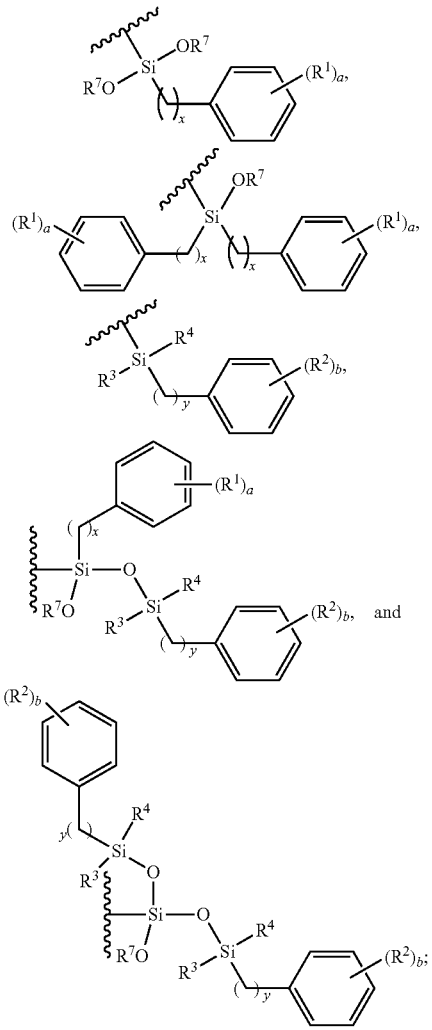

and $R^7$ is hydrogen, trimethylsilyl, triethylsilyl, triisopropylsilyl, tert-butyldimethylsilyl, or n-butyldimethylsilyl. The hashed bond designates the point at which the surface modifier is attached, wherein the total phenyl surface coverage of the composition is greater than or equal to 5.3 μmol/m².

In some embodiments, the total phenyl surface coverage of the composition is greater than or equal to 5.4 μmol/m². The total phenyl surface coverage of the composition can be greater than or equal to 5.5 μmol/m². In some embodiments, the silica or organosilica particles are rehydroxylated prior to reacting with a trifunctional phenyl silane.

BRIEF DESCRIPTION OF THE FIGURES

FIG. 2 is a schematic representation of an exemplary process for forming the disclosed stationary phase composition with specific phenyl silyl ether presentations.

FIGS. 3A-3F illustrate a comparison between the use of a disclosed stationary phase and comparator compositions packed in chromatography columns for reversed phase separations of monoclonal antibody (mAb) samples using 0.1% (v/v) formic acid mobile phases and 2.1×50 mm columns.

FIGS. 4A-4F illustrate a comparison between the use of a disclosed stationary phase and comparator compositions packed in chromatography columns for reversed phase separations of monoclonal antibody (mAb) samples using 0.1% (v/v) trifluoroacetic acid mobile phases and 2.1×50 mm columns.

FIG. 5A is the average gradient time peak capacity values and FIG. 5B is the average effective peak capacity values as calculated using the delta retention time between the first and last eluting protein analytes of the mAb sample test mixtures.

FIG. 6A is the average gradient time peak capacity values and FIG. 6B is the average effective peak capacity values as calculated using the delta retention time between the first and last eluting protein analytes of the mAb sample test mixtures.

FIGS. 8A-8F, shows the batch-to-batch reproducibility of an exemplified stationary phase composition, where FIGS. 8A and 8B show reversed phase separations of mAb samples as obtained using 0.1% (v/v) formic acid and FIGS. 8C and 8D show reversed phase separations of mAb samples as obtained using 0.1% (v/v) TFA mobile phases and 2.1×50 mm columns packed with various stationary phases; FIGS. 8E and 8F show the average effective peak capacity values calculated using the delta retention time between the first and last eluting protein analytes of the mAb sample test mixtures.

FIGS. 10A-10C display peak area of an intact monoclonal antibody as a function column temperature as obtained with various mobile phase systems and an exemplified stationary phase composition. Comparative data are also provided as obtained with various comparator stationary phase compositions.

DETAILED DESCRIPTION

1. General Description of Compositions

Figure 1:
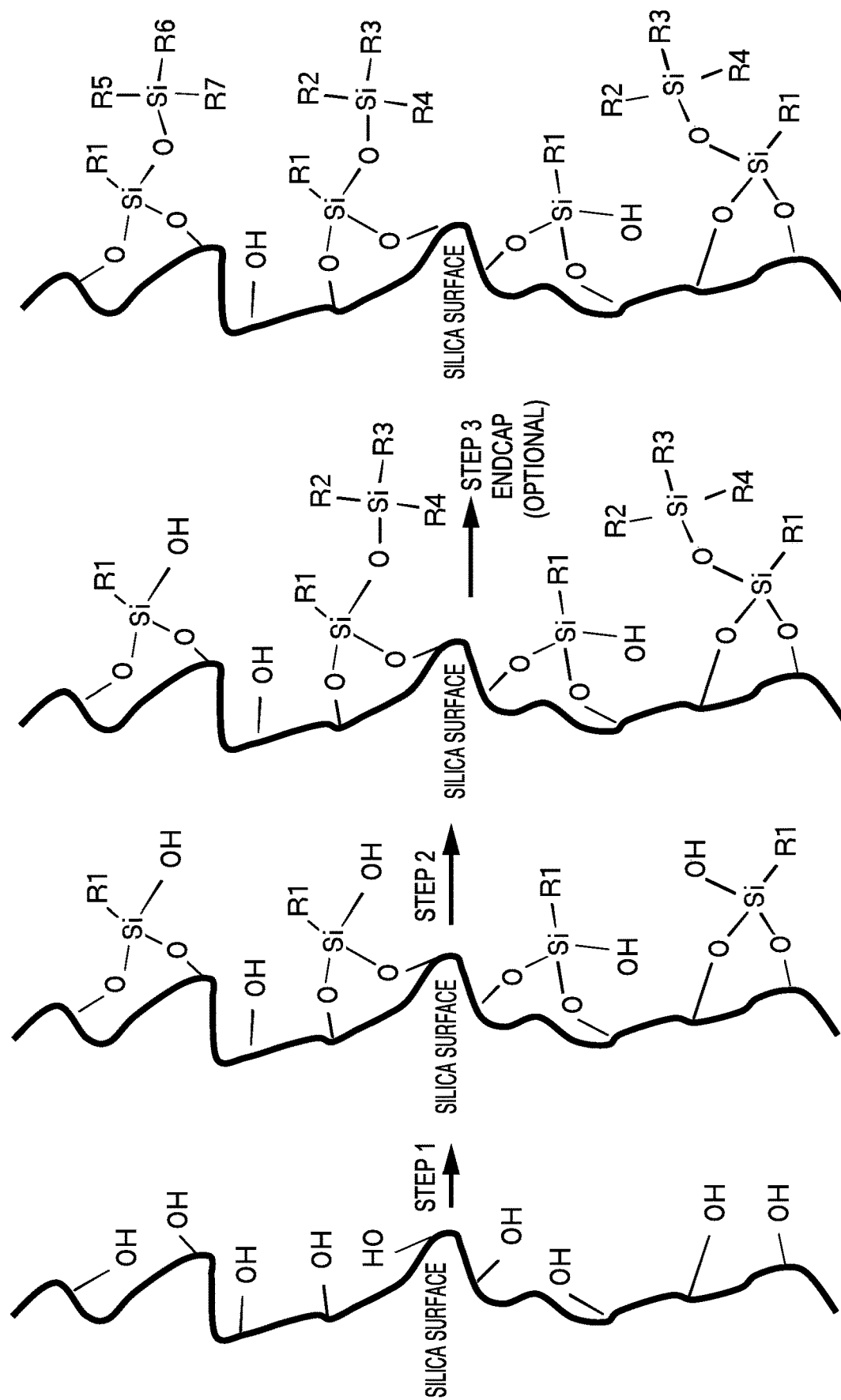
FIG. 1 is a schematic representation of an exemplary process for forming the disclosed stationary phase compositions.
Figure 3E:
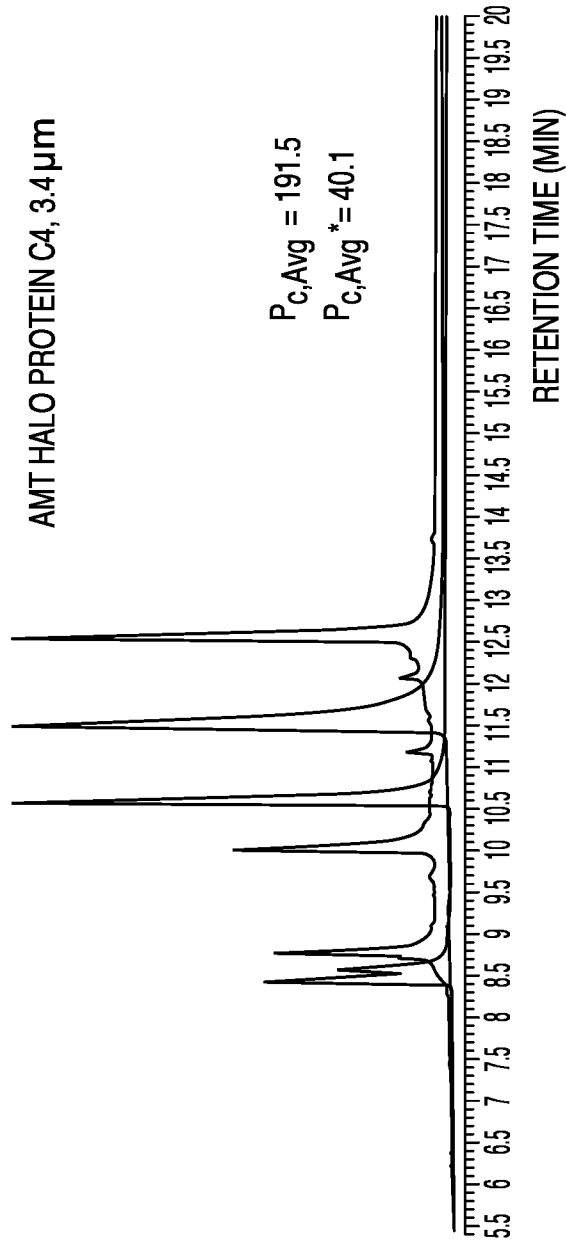
Figure 3F:
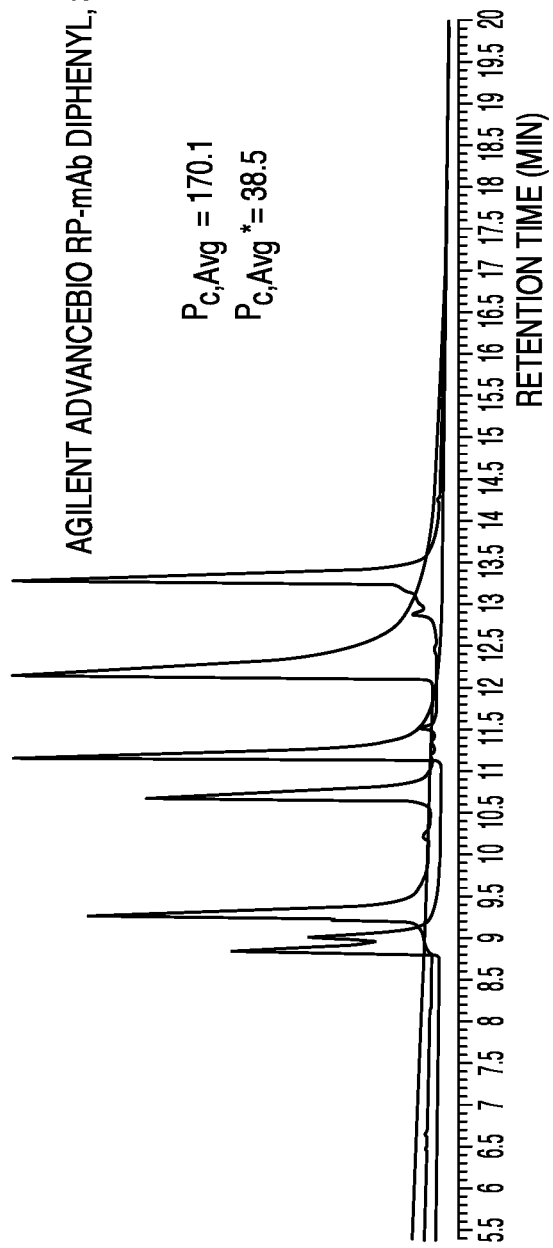
Figures 5A, 5B:
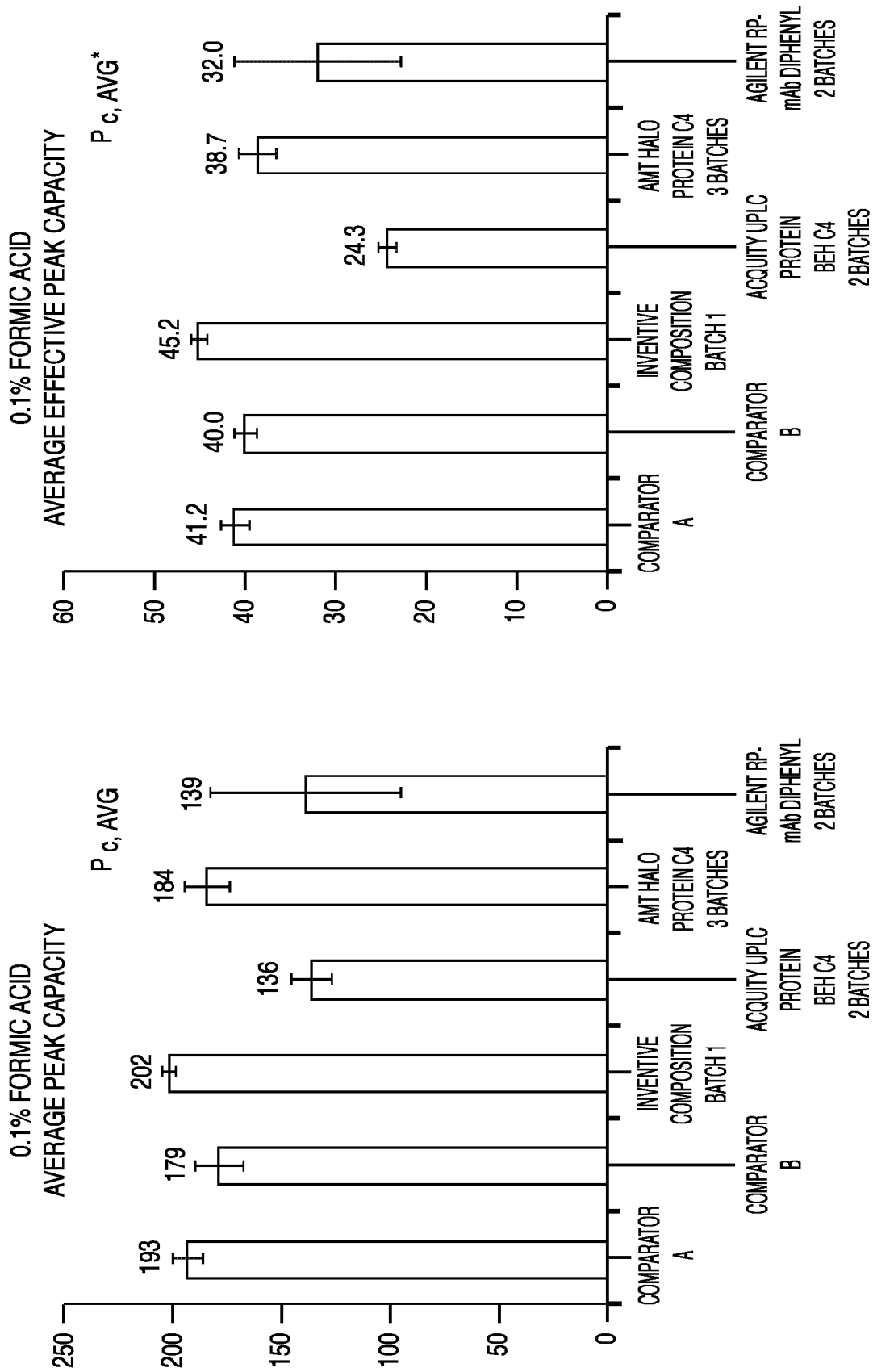
FIG. 5A and FIG. 5B each show the average peak capacity values obtained with an exemplified stationary phase composition and comparator compositions when using mobile phases modified with 0.1% (v/v) formic acid, where

Provided herein are stationary phase compositions comprising a chromatographic surface of porous or non-porous core material comprising surface modifiers. In one aspect, these stationary phase compositions comprise a chromatographic surface of porous or non-porous core material comprising a surface modifier having the Formula I, II, III, or IV:

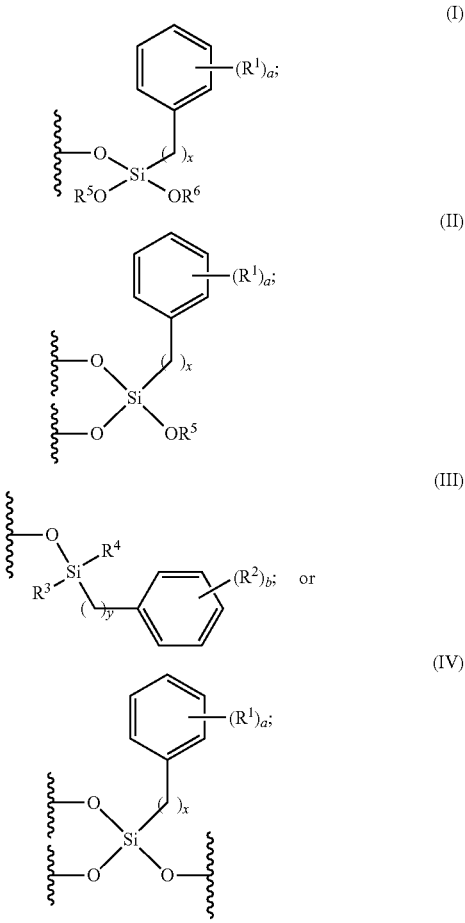

or a combination thereof, wherein:
x and y are each independently integers from 0 to 10;
a is 0 to 5;
b is 0 to 5;
$R^1$ and $R^2$ are each independently selected from $(C_1$-$C_3)$ alkyl, hydroxyl, fluorine, chlorine, bromine, cyano, —C(O)NH$_2$, and carboxyl;
$R^3$ and $R^4$ are each independently aryl optionally substituted with 1 to 5 groups selected from $(C_1$-$C_3)$alkyl, hydroxyl, fluorine, chlorine, bromine, cyano, —C(O)NH$_2$, and carboxyl, or $R^3$ and $R^4$ are each independently $(C_1$-$C_4)$ alkyl optionally substituted with cyano;
$R^5$ and $R^6$ are each independently selected from hydrogen, trimethylsilyl, triethylsilyl, triisopropylsilyl, tert-butyldimethylsilyl, n-butyldimethylsilyl,

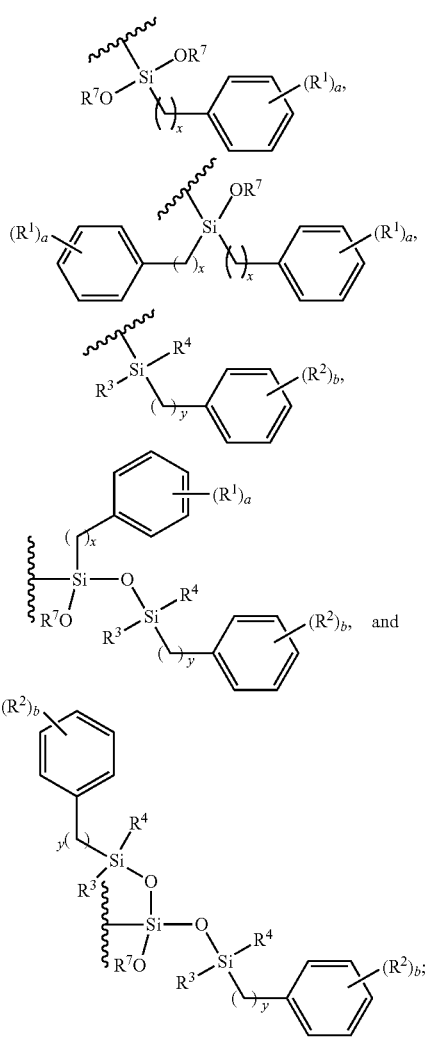

$R^7$ is hydrogen, trimethylsilyl, triethylsilyl, triisopropylsilyl, tert-butyldimethylsilyl, or n-butyldimethylsilyl; and the hashed bonds designate the point at which the surface modifier is attached.

2. Definitions

The term "alkyl" means a saturated monovalent straight or branched hydrocarbon radical having, unless otherwise specified, 1-6 carbon atoms and includes, for example, methyl, ethyl, n-propyl, isopropyl, n-butyl, sec-butyl, isobutyl, tert-butyl, n-pentyl, n-hexyl, n-heptyl, n-octyl, n-nonyl, n-decyl and the like. "Monovalent" means attached to the rest of the molecule at one point.

The term "aryl" refers to monocyclic, bicyclic, and tricyclic aromatic carbocyclic ring systems having a total of 6 to 15 ring members. The term "aryl" may be used interchangeably with the term "aryl ring". Aryl rings include e.g., phenyl, biphenyl, naphthyl, anthracyl, and the like. Also included within the scope of the term "aryl", as it is used herein, is a group in which an aromatic ring is fused to one or more non-aromatic rings. Such groups include e.g., indanyl, phthalimidyl, naphthimidyl, phenanthridinyl, or tetrahydronaphthyl, and the like.

The term "phenyl surface coverage" as used in e.g., "total phenyl surface coverage" refers to the quantity of phenyl groups per unit surface area of a material such as the stationary phase to which the disclosed surface modifiers are attached. The quantity can be reported in units of μmoles/meter$^2$ and can be calculated from a determination of a material's percent carbon composition (by weight) and specific surface area (m$^2$/grams). See e.g., J. Liq. Chromatogr., 1, (1978) 561-586 and J. Chromatogr. A, 852, (1999), 375-381.

The term "pore volume" refers to the total volume of empty space (e.g., air volume) present within a particle bed.

Micropore surface area (MSA) refers to the surface area in pores with diameters less than or equal to 34 Å, determined by multipoint nitrogen sorption analysis from the adsorption leg of the isotherm using the Barrett-Joyner-Halenda (BJH) analysis method. See e.g., J. Amer. Chem. Soc. 61 (1951) 373.

Surface area refers to the total surface area per unit of mass.

The term "chromatographic core" refers to a material encased by a chromatographic surface. The chromatographic surface material can be deposited on or bonded to or annealed to the chromatographic core in such a way that a discrete or distinct transition is discernible or can be bound to the chromatographic core in such a way as to blend with the surface of the chromatographic core resulting in a gradation of materials and no discrete internal core surface. In certain embodiments, the chromatographic surface material can be the same or different from the material of the chromatographic core and can exhibit different physical or physiochemical properties from the chromatographic core, including, but not limited to, pore volume, surface area, average pore diameter, carbon content or hydrolytic pH stability.

The term "chromatographic surface" means a surface that provides for the separation of a sample. In certain aspects, the chromatographic surface is porous. In some aspects, a chromatographic surface can be the surface of a particle, a superficially porous material or a monolith. In certain aspects, the chromatographic surface is composed of the surface of one or more particles, superficially porous materials or monoliths used in combination during a chromatographic separation. In certain other aspects, the chromatographic surface is non-porous.

Proteins refer to large biomolecules or macromolecules having one or more long chains of amino acid residues. Proteins include, but are not limited to, fibrous proteins, globular proteins, membrane proteins, immunoglobulins, therapeutic Fc domain fusion proteins, glycoproteins, conjugated proteins, pegylated proteins, and antibody drug conjugates. Proteins can also refer to fragments of larger protein precursors.

The term "antibody" is used in the broadest sense and includes monoclonal antibodies, polyclonal antibodies, multispecific antibodies (including bispecific antibodies), antibody fragments that can bind an antigen (including, Fab', F'(ab)$_2$, Fv, single chain antibodies, diabodies), and recombinant peptides comprising the foregoing as long as they exhibit the desired biological activity and antigen binding specificity.

The term "monolith" means a collection of individual particles packed into a bed formation, in which the shape and morphology of the individual particles are maintained. The particles are packed using a material that binds the particles together. Binding materials that are well known in the art can be used such as, for example, linear or crosslinked polymers of divinylbenzene, methacrylate, urethanes, alkenes, alkynes, amines, amides, isocyanates, or epoxy groups, as well as condensation reactions of organoalkoxysilanes, tetraalkoxysilanes, polyorganoalkoxysiloxanes, polyethoxysiloxanes, and ceramic precursors. In certain embodiments, the term "monolith" also includes hybrid monoliths made by other methods, such as hybrid monoliths detailed in U.S. Pat. No. 7,250,214; hybrid monoliths prepared from the condensation of one or more monomers that contain 0-99 mole percent silica (e.g., Sift); hybrid monoliths prepared from coalesced porous inorganic/organic particles; hybrid monoliths that have a chromatographically-enhancing pore geometry; hybrid monoliths that do not have a chromatographically-enhancing pore geometry; hybrid monoliths that have ordered pore structure; hybrid monoliths that have non-periodic pore structure; hybrid monoliths that have non-crystalline or amorphous molecular ordering; hybrid monoliths that have crystalline domains or regions; hybrid monoliths with a variety of different macropore and mesopore properties; and hybrid monoliths in a variety of different aspect ratios. In certain embodiments, the term "monolith" also includes inorganic monoliths, such as those described in G. Guiochon/J. Chromatogr. A 1168 (2007) 101-168.

3. Exemplary Compositions

In a first embodiment, provided herein is a stationary phase composition comprising a chromatographic surface of porous or non-porous core material comprising a surface modifier having the Formula I, II, III, or IV:

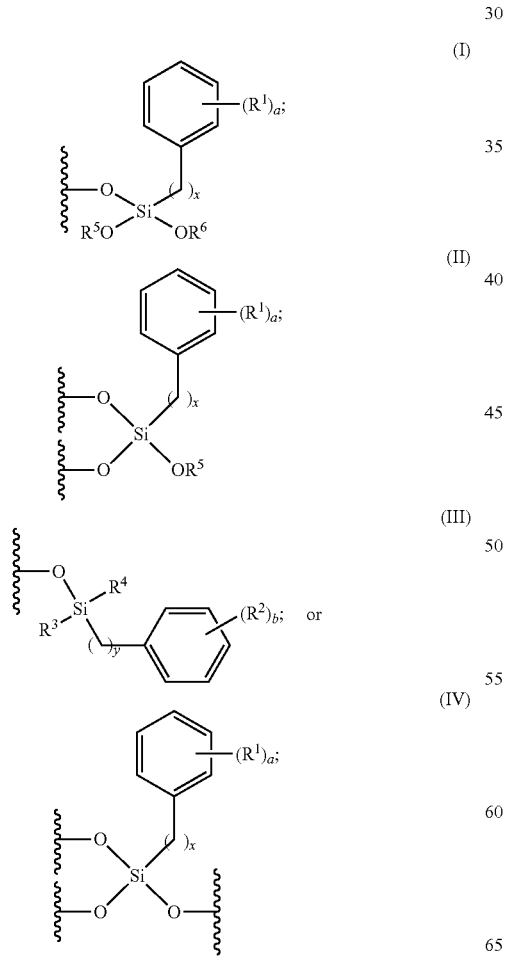

or a combination thereof, wherein the variables are as defined above.

In a second embodiment, the surface modifier of Formula II is of the formula:

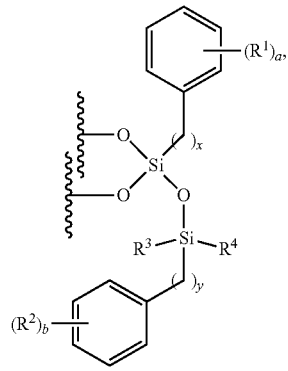

wherein the variables are as defined above.

In a third embodiment, the surface modifier of Formula II is of the formula:

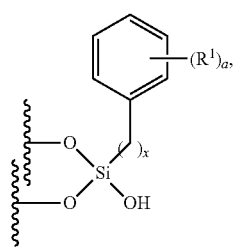

wherein the variables are as defined above.

In a fourth embodiment, the surface modifier of Formula II is of the formula:

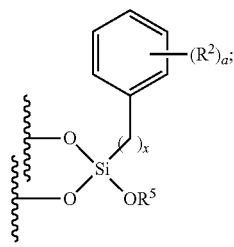

wherein $R^5$ is selected from trimethylsilyl, triethylsilyl, triisopropylsilyl, tert-butyldimethylsilyl, and n-butyldimethylsilyl, and wherein the remaining variables are as described in the first embodiment. In one alternative, $R^5$ in the surface modifier of Formula II is trimethylsilyl, wherein the remaining variables are as described in the first embodiment.

In a fifth embodiment, the surface modifier of Formula II is of the formula:

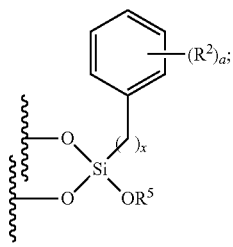

wherein, $R^5$ is selected from

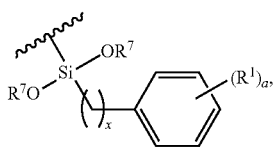

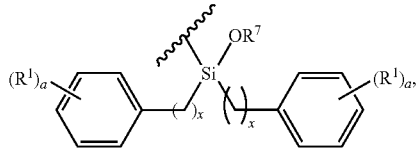

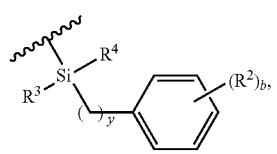

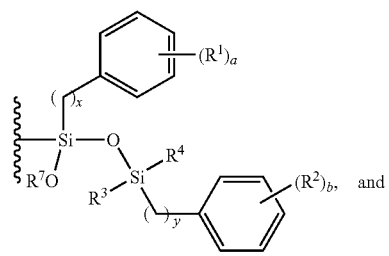

and

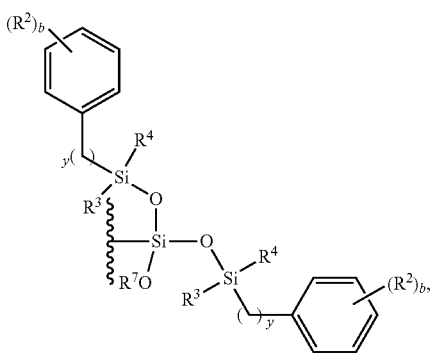

and wherein the remaining variables are as described in the first embodiment.

In a sixth embodiment, the surface modifier of Formula I is of the formula:

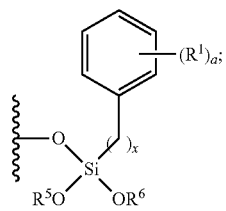

wherein $R^5$ is selected from hydrogen, trimethylsilyl, triethylsilyl, triisopropylsilyl, tert-butyldimethylsilyl, and n-butyldimethylsilyl; and $R^6$ is selected from

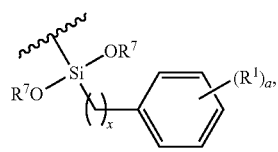

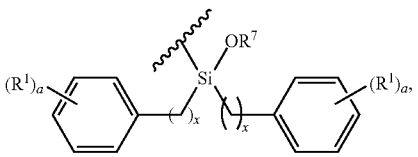

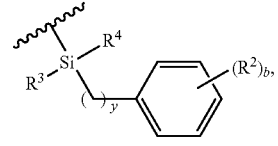

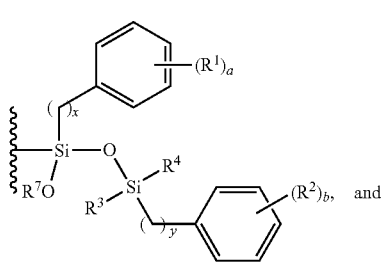

and

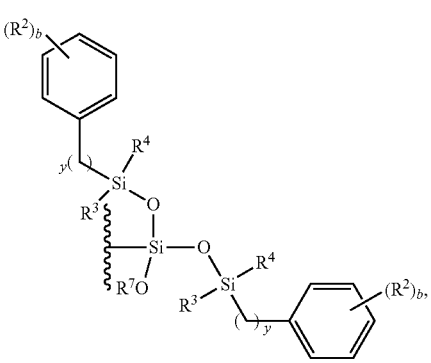

and wherein the remaining variables are as described in the first embodiment.

In a seventh embodiment, the surface modifier of Formula I is of the formula

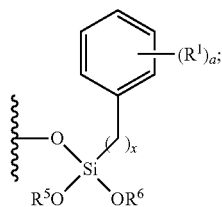

wherein R⁵ is selected from hydrogen, trimethylsilyl, triethylsilyl, triisopropylsilyl, tert-butyldimethylsilyl, and n-butyldimethylsilyl; and R⁶ is selected from

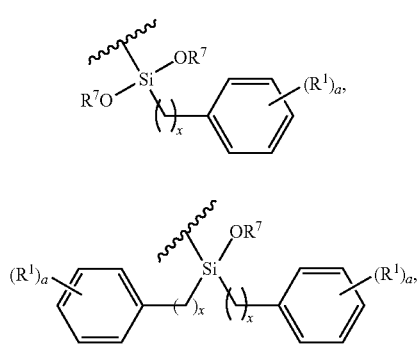

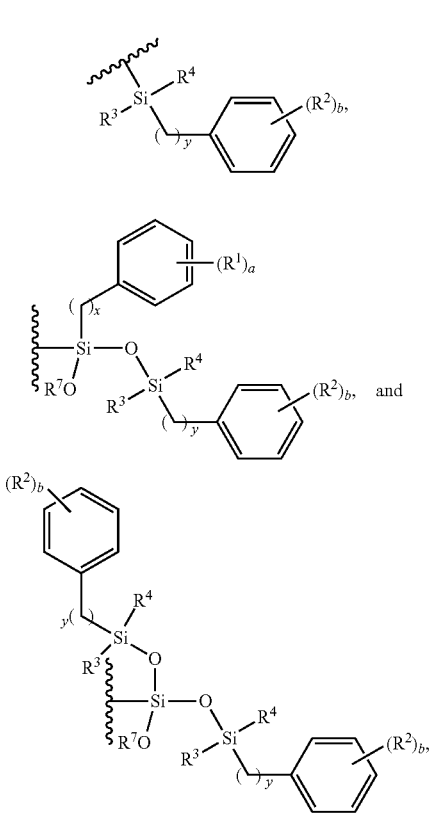

and wherein the remaining variables and features are as described in any one of the first, second, third, fourth, or fifth embodiment.

In an eighth embodiment, the surface modifier of Formula I is of the Formula

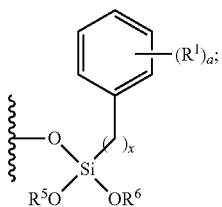

wherein R⁵ and R⁶ are each independently selected from hydrogen,

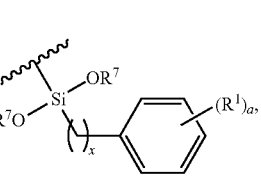

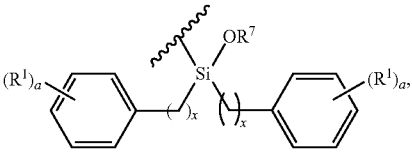

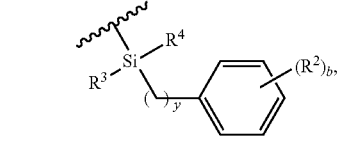

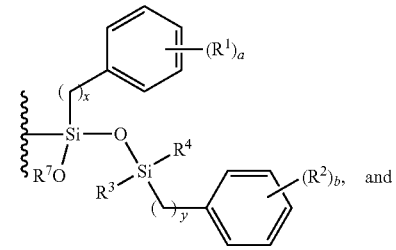

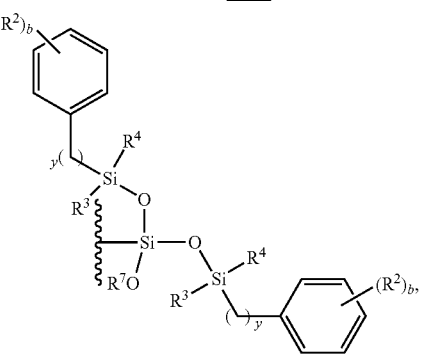

and wherein the remaining variables and features are as described in any one of the first, second, third, fourth, or fifth embodiment.

In a ninth embodiment, the stationary phase composition described herein further comprises a surface modifier having the Formula V:

wherein, $R^8$ is selected from trimethylsilyl, triethylsilyl, triisopropylsilyl, tert-butyldimethylsilyl, and n-butyldimethylsilyl. In one alternative, $R^8$ in the surface modifier of Formula V is trimethylsilyl.

In a tenth embodiment, b in any of the surface modifiers described herein is 0 to 4, wherein the remaining variables for the surface modifiers are described in any one of the first to ninth embodiments. In one alternative, b in any of the surface modifiers described herein is 0 to 3, wherein the remaining variables for the surface modifiers are as described in any one of the first to ninth embodiments. In another alternative b in any of the surface modifiers described herein is 0 to 2, wherein the remaining variables for the surface modifiers are as described in any one of the first to ninth embodiments. In yet another alternative b in any of the surface modifiers described herein is 0 or 1, wherein the remaining variables for the surface modifiers are as described in any one of the first to ninth embodiments. In yet a further alternative, b in any of the surface modifiers described herein is 0, wherein the remaining variables for the surface modifiers are as described in any one of the first to ninth embodiments.

In an eleventh embodiment, in any of the surface modifiers described herein is 0 to 4, wherein the remaining variables for the surface modifiers are as described in any one of the first to tenth embodiments. In one alternative, in any of the surface modifiers described herein is 0 to 3, wherein the remaining variables for the surface modifiers are as described in any one of the first to tenth embodiments. In another alternative a in any of the surface modifiers described herein is 0 to 2, wherein the remaining variables for the surface modifiers are as described in any one of the first to tenth embodiments. In yet another alternative. in any of the surface modifiers described herein is 0 or 1, wherein the remaining variables for the surface modifiers are as described in any one of the first to tenth embodiments. In yet a further alternative, in any of the surface modifiers described herein is 0, wherein the remaining variables for the surface modifiers are as described in any one of the first to tenth embodiments.

In a twelfth embodiment, x in any of the surface modifiers described herein is 0 to 8, wherein the remaining variables for the surface modifiers are as described in any one of the first to eleventh embodiments. In one alternative, x in any of the surface modifiers described herein is 0 to 6, wherein the remaining variables for the surface modifiers are as described in any one of the first to eleventh embodiments. In another alternative x in any of the surface modifiers described herein is 0 to 4, wherein the remaining variables for the surface modifiers are as described in any one of the first to eleventh embodiments. In yet another alternative x in any of the surface modifiers described herein is 0 to 2, wherein the remaining variables for the surface modifiers are as described in any one of the first to eleventh embodiments. In yet a further alternative, x in any of the surface modifiers described herein is 0, wherein the remaining variables for the surface modifiers are as described in any one of the first to eleventh embodiments.

In a thirteenth embodiment, y in any of the surface modifiers described herein is 0 to 8, wherein the remaining variables for the surface modifiers are as described in any one of the first to twelfth embodiments. In one alternative, y in any of the surface modifiers described herein is 0 to 6, wherein the remaining variables for the surface modifiers are as described in any one of the first to twelfth embodiments. In another alternative y in any of the surface modifiers described herein is 0 to 4, wherein the remaining variables for the surface modifiers are as described in any one of the first to twelfth embodiments. In yet another alternative y in any of the surface modifiers described herein is 0 to 2, wherein the remaining variables for the surface modifiers are as described in any one of the first to twelfth embodiments. In yet a further alternative, y in any of the surface modifiers described herein is 0, wherein the remaining variables for the surface modifiers are as described in any one of the first to twelfth embodiments.

In a fourteenth embodiment, $R^3$ and $R^4$ in any of the surface modifiers described herein are independently aryl or $(C_1-C_4)$alkyl optionally substituted with cyano, wherein the remaining variables for the surface modifiers are as described in any one of the first to thirteenth embodiments. In one alternative, $R^3$ in any of the surface modifiers is phenyl or napthyl, wherein the remaining variables for the surface modifiers are as described in any one of the first to thirteenth embodiments. In another alternative, $R^3$ is phenyl or napthyl and each $R^4$ is $(C_1-C_4)$alkyl in any of the surface modifiers described herein, wherein the remaining variables for the surface modifiers are as described in any one of the first to thirteenth embodiments.

In a fifteenth embodiment, $R^7$ in any of the surface modifiers described herein is hydrogen or trimethylsilyl, wherein the remaining variables for the surface modifiers are as described in any one of the first to fourteenth embodiments.

In a sixteenth embodiment, the total phenyl surface coverage of the stationary phase compositions described herein is greater than or equal to 5.3 µmol/m². Alternatively, the total phenyl surface coverage of the stationary phase compositions described herein is greater than or equal 5.4 µmol/m². In another alternative, the total phenyl surface coverage of the stationary phase compositions described herein is greater than or equal 5.5 µmol/m². In yet another alternative, the total phenyl surface coverage of the stationary phase composition described herein is greater than or equal to 5.6 µmol/m², e.g., greater than or equal to 5.7 µmol/m², greater than or equal to 5.8 µmol/m², greater than or equal to 5.9 µmol/m², and greater than or equal to 6.0 µmol/m².

In one aspect, the stationary phase compositions described herein may be in the form of a plurality of particles. The average particle size can be e.g., from about 0.5 to about 20 µm, from about 1 to about 10 µm, from about 1.5 to about 5 µm, or from about 2.0 to about 3.0 µm.

In one aspect, the disclosed stationary phase compositions are in the form of a monolith. In another aspect, the disclosed stationary phase compositions are in the form of a monolith and are in the form of a plurality of particles having an average particle size from about 0.5 to about 20 µm, from about 1 to about 10 µm, from about 1.5 to about 5 µm, or from about 2.0 to about 3.0 µm.

In one aspect, the stationary phase compositions described herein are stable under various pH ranges. For example, the disclosed stationary phase compositions are stable at a pH of 1 to 5. Alternatively, the disclosed stationary phase compositions are stable at a pH of 1 to 4, pH 1 to 3, pH less than 4, pH less than 4, and pH less than 3. In yet another alternative, the disclosed stationary phase compositions are stable at a pH of 10 to 14. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; and/or are stable at a pH of 1 to 5, pH of 1 to 4, pH 1 to 3, pH less than 4, pH less than 4, or pH less than 3.

In one aspect, the disclosed stationary phases are stable at high temperatures. For example, the disclosed stationary phases are stable at temperatures up to and including 100° C., up to and including 90° C., up to and including 80° C., and up to and including 70° C. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; and/or are stable at temperatures up to and including 100° C., up to and including 90° C., up to and including 80° C., and up to and including 70° C.

In one aspect, the disclosed stationary phases are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; and/or are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.

In one aspect, the disclosed stationary phase compositions have a surface area of about 0.1 to about 1100 $m^2/g$ such as about 0.5 to about 500 $m^2/g$ and about 0.7 to about 330 $m^2/g$. In one alternative, disclosed stationary phase compositions have a surface area of about 5 to about 1100 $m^2/g$. In one alternative, the surface area is about 10 to about 500 $m^2/g$ or about 15 to about 330 $m^2/g$. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures up to and including 100° C., up to and including 90° C., up to and including 80° C., and up to and including 70° C.; and/or have a surface area of about 0.1 to about 1100 $m^2/g$, about 0.5 to about 500 $m^2/g$, or about 0.7 to about 330 $m^2/g$. In another aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures up to and including 100° C., up to and including 90° C., up to and including 80° C., and up to and including 70° C.; and/or have a surface area of about 5 to about 1100 $m^2/g$, about 10 to about 500 $m^2/g$, or about 15 to about 330 $m^2/g$.

In one aspect, the disclosed stationary phase compositions have a surface area of about 0.1 to about 1100 $m^2/g$ such as about 0.5 to about 500 $m^2/g$ and about 0.7 to about 330 $m^2/g$. In one alternative, disclosed stationary phase compositions have a surface area of about 5 to about 1100 $m^2/g$. In one alternative, the surface area is about 10 to about 500 $m^2/g$ or about 15 to about 330 $m^2/g$. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; and/or have a surface area of about 0.1 to about 1100 $m^2/g$, about 0.5 to about 500 $m^2/g$, or about 0.7 to about 330 $m^2/g$. In another aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; and/or have a surface area of about 5 to about 1100 $m^2/g$, about 10 to about 500 $m^2/g$, or about 15 to about 330 $m^2/g$.

In one aspect, the stationary phase compositions described herein have a pore volume of about 0.001 to about 1.7 $cm^3/g$. In one alternative the pore volume is about 0.1 to about 1.7 $cm^3/g$, about 0.1 to about 1.3 $cm^3/g$, or about 0.15 to about 1.3 $cm^3/g$. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; have a surface area of about 0.1 to about 1100 $m^2/g$, about 0.5 to about 500 $m^2/g$, about 0.7 to about 330 $m^2/g$, about 5 to about 1100 $m^2/g$, about 10 to about 500 $m^2/g$, or about 15 to about 330 $m^2/g$; and/or a pore volume of about 0.001 to about 1.7 $cm^3/g$, 0.1 to about 1.7 $cm^3/g$, about 0.1 to about 1.3 $cm^3/g$, or about 0.15 to about 1.3 $cm^3/g$.

In one aspect, the stationary phase compositions described herein have a micropore surface area of less than about 110 $m^2/g$. In an alternative, the micropore surface area of less than about 105 $m^2/g$ e.g., less than about 80 $m^2/g$ or less than about 50 $m^2/g$. In one aspect, the disclosed stationary phase compositions are in the form of a monolith; are in the form of a plurality of particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures up to and including 100° C., up to and including 90° C., up to and including 80° C., and up to and including 70° C.; have a surface area of about 0.1 to about 1100 $m^2/g$, about 0.5 to about 500 $m^2/g$, about 0.7 to about 330 $m^2/g$, about 5 to about 1100 $m^2/g$, about 10 to about 500 $m^2/g$, or about 15 to about 330 $m^2/g$; have a pore volume of about 0.001 to about 1.7 $cm^3/g$, about 0.1 to about 1.7 $cm^3/g$, about 0.1 to about 1.3 $cm^3/g$, or about 0.15 to about 1.3 cm³/g; and/or a micropore surface area of less than about 110 m²/g e.g., less than about 105 m²/g, less than about 80 m²/g, or less than about 50 m²/g.

In one aspect, the stationary phase compositions described herein have a micropore surface area of less than about 110 m²/g. In an alternative, the micropore surface area of less than about 105 m²/g e.g., less than about 80 m²/g or less than about 50 m²/g. In one aspect, the disclosed stationary phase compositions are in the form of a monolith; are in the form of a plurality of particles having an average particle size from about 0.5 to about 20 μm, from about 1 to about 10 μm, from about 1.5 to about 5 μm, or from about 2.0 to about 3.0 μm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; have a surface area of about 0.1 to about 1100 m²/g, about 0.5 to about 500 m²/g, about 0.7 to about 330 m²/g, about 5 to about 1100 m²/g, about 10 to about 500 m²/g, or about 15 to about 330 m²/g; have a pore volume of about 0.001 to about 1.7 cm³/g, about 0.1 to about 1.7 cm³/g, about 0.1 to about 1.3 cm³/g, or about 0.15 to about 1.3 cm³/g; and/or a micropore surface area of less than about 110 m²/g e.g., less than about 105 m²/g, less than about 80 m²/g, or less than about 50 m²/g.

In one aspect, the stationary phase compositions described herein have an average pore diameter of about 20 to about 1500 Å. In one aspect, the average pore diameter is about 50 to about 1200 Å e.g., about 100 to about 1100 Å, about 200 to about 1000 Å, about 300 to about 1000 Å, or about 300 to about 700 Å. In one aspect, the disclosed stationary phase compositions are in the form of a monolith; are in the form of a plurality of particles having an average particle size from about 0.5 to about 20 μm, from about 1 to about 10 μm, from about 1.5 to about 5 μm, or from about 2.0 to about 3.0 μm; are stable at a pH of 1 to 5, pH of 1 to 4, pH 1 to 3, pH less than 4, pH less than 4, or pH less than 3; are stable at temperatures up to and including 100° C., up to and including 90° C., up to and including 80° C., and up to and including 70° C.; have a surface area of about 0.1 to about 1100 m²/g, about 0.5 to about 500 m²/g, about 0.7 to about 330 m²/g, about 5 to about 1100 m²/g, about 10 to about 500 m²/g, or about 15 to about 330 m²/g; have a pore volume of about 0.001 to about 1.7 cm³/g, about 0.1 to about 1.7 cm³/g, about 0.1 to about 1.3 cm³/g, or about 0.15 to about 1.3 cm³/g; a micropore surface area of less than about 110 m²/g, less than about 105 m²/g, less than about 80 m²/g or less than about 50 m²/g; and/or an average pore diameter of about 20 to about 1500 Å e.g., about 50 to about 1200 Å e.g., about 100 to about 1100 Å, about 200 to about 1000 Å, about 300 to about 1000 Å, or about 300 to about 700 Å.

In one aspect, the stationary phase compositions described herein have an average pore diameter of about 20 to about 1500 Å. In one aspect, the average pore diameter is about 50 to about 1200 Å e.g., about 100 to about 1100 Å, about 200 to about 1000 Å, about 300 to about 1000 Å, or about 300 to about 700 Å. In one aspect, the disclosed stationary phase compositions are in the form of a monolith; are in the form of a plurality of particles having an average particle size from about 0.5 to about 20 μm, from about 1 to about 10 μm, from about 1.5 to about 5 μm, or from about 2.0 to about 3.0 μm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; have a surface area of about 0.1 to about 1100 m²/g, about 0.5 to about 500 m²/g, about 0.7 to about 330 m²/g, about 5 to about 1100 m²/g, about 10 to about 500 m²/g, or about 15 to about 330 m²/g; have a pore volume of about 0.001 to about 1.7 cm³/g, about 0.1 to about 1.7 cm³/g, about 0.1 to about 1.3 cm³/g, or about 0.15 to about 1.3 cm³/g; a micropore surface area of less than about 110 m²/g, less than about 105 m²/g, less than about 80 m²/g or less than about 50 m²/g; and/or an average pore diameter of about 20 to about 1500 Å e.g., about 50 to about 1200 Å e.g., about 100 to about 1100 Å, about 200 to about 1000 Å, about 300 to about 1000 Å, or about 300 to about 700 Å.

In one aspect, the stationary phase compositions described herein comprise a chromatographic core having a ratio of core diameter to particle diameter of about 0.05 to about 0.99. In one alternative, the stationary phase compositions described herein comprise a chromatographic core having a ratio of core diameter to particle diameter of about 0.2 to about 0.9. In one aspect, the disclosed stationary phase compositions are in the form of a monolith; are in the form of a plurality of particles having an average particle size from about 0.5 to about 20 μm, from about 1 to about 10 μm, from about 1.5 to about 5 μm, or from about 2.0 to about 3.0 μm; are stable at a pH of 1 to 5, pH of 1 to 4, pH 1 to 3, pH less than 4, pH less than 4, or pH less than 3; are stable at temperatures up to and including 100° C., up to and including 90° C., up to and including 80° C., and up to and including 70° C.; have a surface area of about 0.1 to about 1100 m²/g, about 0.5 to about 500 m²/g, about 0.7 to about 330 m²/g, about 5 to about 1100 m²/g, about 10 to about 500 m²/g, or about 15 to about 330 m²/g; have a pore volume of about 0.001 to about 1.7 cm³/g, about 0.1 to about 1.7 cm³/g, about 0.1 to about 1.3 cm³/g, or about 0.15 to about 1.3 cm³/g; a micropore surface area of less than about 110 m²/g e.g., less than 105 m²/g, less than 80 m²/g, or less than 50 m²/g; an average pore diameter of about 20 to about 1500 Å e.g., about 50 to about 1200 Å e.g., about 100 to about 1100 Å, about 200 to about 1000 Å, about 300 to about 1000 Å, or about 300 to about 700 Å; and/or comprise a chromatographic core having a ratio of core diameter to particle diameter of about 0.05 to about 0.99 or about 0.2 to about 0.9.

In one aspect, the stationary phase compositions described herein comprise a chromatographic core having a ratio of core diameter to particle diameter of about 0.05 to about 0.99. In one alternative, the stationary phase compositions described herein comprise a chromatographic core having a ratio of core diameter to particle diameter of about 0.2 to about 0.9. In one aspect, the disclosed stationary phase compositions are in the form of a monolith; are in the form of a plurality of particles having an average particle size from about 0.5 to about 20 μm, from about 1 to about 10 μm, from about 1.5 to about 5 μm, or from about 2.0 to about 3.0 μm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; have a surface area of about 0.1 to about 1100 m²/g, about 0.5 to about 500 m²/g, about 0.7 to about 330 m²/g, about 5 to about 1100 m²/g, about 10 to about 500 m²/g, or about 15 to about 330 m²/g; have a pore volume of about 0.001 to about 1.7 cm³/g, about 0.1 to about 1.7 cm³/g, about 0.1 to about 1.3 cm³/g, or about 0.15 to about 1.3 cm³/g; a micropore surface area of less than about 110 m²/g e.g., less than about 105 m²/g, less than 80 m²/g, or less than 50 m²/g; an average pore diameter of about 20 to about 1500 Å e.g., about 50 to about 1200 Å e.g., about 100 to about 1100 Å, about 200 to about 1000 Å, about 300 to about 1000 Å, or about 300 to about 700 Å; and/or comprise a chromatographic core having a ratio of core diameter to particle diameter of about 0.05 to about 0.99 or about 0.2 to about 0.9.

In one aspect, the stationary phase compositions described herein comprise a non-porous particle. In one aspect, the disclosed stationary phase compositions are in the form of a plurality of non-porous particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures up to and including 100° C., up to and including 90° C., up to and including 80° C., and up to and including 70° C.; have a surface area of about 0.1 to about 1100 $m^2/g$, about 0.5 to about 500 $m^2/g$, about 0.7 to about 330 $m^2/g$, about 5 to about 1100 $m^2/g$, about 10 to about 500 $m^2/g$, or about 15 to about 330 $m^2/g$; have a pore volume of about 0.001 to about 1.7 $cm^3/g$, about 0.1 to about 1.7 $cm^3/g$, about 0.1 to about 1.3 $cm^3/g$, or about 0.15 to about 1.3 $cm^3/g$; a micropore surface area of less than about 110 $m^2/g$ e.g., less than 105 $m^2/g$, less than 80 $m^2/g$, or less than 50 $m^2/g$; an average pore diameter of about 20 to about 1500 Å e.g., about 50 to about 1200 Å e.g., about 100 to about 1100 Å, about 200 to about 1000 Å, about 300 to about 1000 Å, or about 300 to about 700 Å; and/or comprise a chromatographic core having a ratio of core diameter to particle diameter of about 0.05 to about 0.99 or about 0.2 to about 0.9.

In one aspect, the stationary phase compositions described herein comprise a non-porous particle. In one aspect, the disclosed stationary phase compositions are in the form of a plurality of non-porous particles having an average particle size from about 0.5 to about 20 µm, from about 1 to about 10 µm, from about 1.5 to about 5 µm, or from about 2.0 to about 3.0 µm; are stable at a pH of 1 to 5, pH of 1 to 4, pH 1 to 3, pH less than 4, pH less than 4, or pH less than 3; are stable at temperatures ranging from 40° C. to 65° C., 40° C. to 60° C., 45° C. to 60° C., 50° C. to 60° C., or 50° C. to 55° C., and at 45° C., 50° C., 55° C., and 60° C.; have a surface area of about 0.1 to about 1100 $m^2/g$, about 0.5 to about 500 $m^2/g$, about 0.7 to about 330 $m^2/g$, about 5 to about 1100 $m^2/g$, about 10 to about 500 $m^2/g$, or about 15 to about 330 $m^2/g$; have a pore volume of about 0.001 to about 1.7 $cm^3/g$, about 0.1 to about 1.7 $cm^3/g$, about 0.1 to about 1.3 $cm^3/g$, or about 0.15 to about 1.3 $cm^3/g$; a micropore surface area of less than about 110 $m^2/g$ e.g., less than 105 $m^2/g$, less than 80 $m^2/g$, or less than 50 $m^2/g$; an average pore diameter of about 20 to about 1500 Å e.g., about 50 to about 1200 Å e.g., about 100 to about 1100 Å, about 200 to about 1000 Å, about 300 to about 1000 Å, or about 300 to about 700 Å; and/or comprise a chromatographic core having a ratio of core diameter to particle diameter of about 0.05 to about 0.99 or about 0.2 to about 0.9.

3. Exemplary Uses

The disclosed stationary phase compositions described herein can be used for the separation of one or more substances. Thus, the present disclosure includes various separation apparatuses (e.g., chromatographic columns, capillary and microfluidic devices, and systems for use thereof) including the chromatographic materials described herein. While several illustrative examples are discussed below, a practitioner of ordinary skill will understand that the present disclosure can contemplate a number of different embodiments, including but not limited to chromatographic columns, apparatuses, methods of use, or kits.

In one aspect, column or apparatus employed with the disclosed compositions may be for high-pressure liquid chromatography (HPLC), solvated gas chromatography, supercritical fluid chromatography, sub-critical fluid chromatography, carbon dioxide based chromatography, hydrophilic interaction liquid chromatography or hydrophobic interaction liquid chromatography, or a combination thereof.

The column or apparatus includes a housing having at least one wall defining a chamber having an entrance and an exit, as well as the stationary phase compositions described herein. The devices can have preformed frits, frits generated by interconnected materials, or devices without frits. The housing and stationary phase can be adapted for high-pressure liquid chromatography, solvated gas chromatography, supercritical fluid chromatography, sub-critical fluid chromatography, carbon dioxide based chromatography, hydrophilic interaction liquid chromatography or hydrophobic interaction liquid chromatography, or a combination thereof.

In one aspect, the disclosed stationary phase compositions are in the form a packed column. In one aspect, the disclosed stationary phase composition are for use in reversed phase chromatography columns such as a reversed phase HPLC column. In one aspect, the internal diameter of the column ranges from about 75 microns to about 50 mm size. In one aspect, the column length is from about 20 mm to about 300 mm.

The sample to be separated using the disclosed stationary phase compositions may be a sample that is compatible with chromatographic methods. Compatible sample include, but are not limited to, small organic molecules, proteins (e.g., antibodies such as monoclonal antibodies or fragments thereof), nucleic acids, lipids, fatty acids, carbohydrates, polymers, and the like. Similarly, the present invention can be used for the separation of small molecules, antibodies, polymers and oligomers, sugars, petrochemicals, lipids, hydrocarbons, foods, forensics, pesticides, agrochemicals, and biosimilars. In one aspect, the sample used for separation is a protein or protein fragment such as a monoclonal antibody or fragment thereof.

Thus, in one aspect, provided herein is a reversed-phase liquid chromatography method for the separation of one or more proteins, the method comprising applying a sample comprising one or more proteins to the disclosed stationary phase composition; eluting said sample through the stationary phase composition using a mobile phase; and isolating said one or more proteins.

Mobile phases may be chosen from those know in the art including, but not limited to acetonitrile, methanol, ethanol, isopropanol, n-propanol, n-butanol, n-pentanol, tetrahydrofuran, and water, or a combination thereof. In one aspect, the mobile phase used in the disclosed separations is selected from acetonitrile, isopropanol, n-propanol, n-butanol, n-pentanol, and water, or a combination thereof. In another aspect, the mobile phase is a combination of acetonitrile and water.

The mobile phase may also comprise a pH modifier. For example, the mobile phase comprise a pH modifier selected from trifluoroacetic acid, formic acid, phosphoric acid, sulfonic acid, hydrochloric acid, perchloric acid, and chloroacetic acid. In one aspect, the mobile phase further comprises trifluoroacetic acid. Alternatively, the pH of the mobile phase may be less than 5, e.g., less than 4.5, less than 4.0, less than 3.5, or less than 3.0.

Separations can be performed at elevated temperatures. For example, the sample (such as a protein) may be eluted at a temperature of greater than or equal to 40° C. Alternatively, the sample (such as protein) is eluted at a temperature of greater than or equal to 60° C. e.g., greater than or equal to 80° C. Separations may also be performed (e.g., on proteins) at temperatures ranging from 40° C. to 60° C.

In one aspect, the separation methods described herein using the disclosed stationary phase compositions further comprise the step of performing UV or fluorescence detection. In another aspect, the separation methods described herein using the disclosed stationary phase compositions further comprise the step of performing mass spectrometry after eluting said sample. In yet another aspect, the separation methods described herein using the disclosed stationary phase compositions further comprise the step of performing electrospray mass spectrometry after eluting said sample, 4. Methods of Manufacture It has been found that a multistep phenyl-based silanization approach improves the performance of silica particles for separations such as protein RPLC separations. Through this discovery and the application of the resulting stationary phase compositions through this process, it has been possible to achieve a combination of improvements that has previously been elusive, namely to achieve enhanced peak capacity, improved completeness of protein elution, reduced peak tailing, and cleaner baselines along with noteworthy low pH stability as described herein.

FIG. 1 is a schematic representation of an exemplary process for forming the compositions described herein. In the first step, a silica or organosilica substrate is modified with a trifunctional aryl silane (Step 1). In FIG. 1, by way of example, $R^1$ represents an optionally substituted aryl or an optionally substituted alkyaryl. This trifunctional silane has a propensity to bond in a bidentate manner to the surface and to thereby in situ produce an additional free silanol group. In the second step of this bonding process (Step 2), a monofunctional aryl-containing silane is used to bond both the newly formed in situ silanols and any others potentially remaining on the base particle. In FIG. 1, by way of example, $R^2$, $R^3$, and $R^4$ can each independently represent an optionally substituted aryl or an optionally substituted alkyaryl; or one or two of $R^2$, $R^3$, and $R^4$ can be an optionally substituted alkyl. Finally, the Step 2 product can optionally be subjected to endcapping, such as with an alkyl silane (trimethyl or triethyl silyl endcapping). In one aspect, the aryl group is optionally substituted phenyl or optionally substituted alkyphenyl.

The multistep silane bonding process described herein can be used to produce numerous unique bonded phases for chromatographic separations such as protein reversed phase chromatography. In one aspect, the Step 1 reaction is performed with a trifunctional aryl (e.g., phenyl) silane having reactive groups including, but not limited to, dimethylamino, chloro, silazane or methoxy. The Step 1 reaction can be performed with a trifunctional aryl (e.g., phenyl) silane having a linker between the silicon and the aryl. Lastly, the Step 1 reaction can be performed with a substituted aryl (e.g., phenyl).

The Step 2 reaction differs from Step 1 in that it is typically performed with a monofunctional aryl (e.g., phenyl)-based silane. This reaction also can be performed with various different reactive groups, including but not limited to dimethylamino, chloro, silazane or methoxy. The Step 2 reaction can be performed with monofunctional silanes comprised of varying phenyl content, including but not limited to diphenylmethyl, diphenylethyl, diphenyln-propyl, diphenyln-butyl, diphenylisopropyl, diphenyltert-butyl, diphenyl cyanopropyl, phenyldimethyl, phenyldiethyl, phenyldi-n-propyl, phenyldi-n-butyl, phenyl di-isopropyl, phenyl di-tert-butyl, phenyl di-cyanopropyl, triphenyl, and others. In the optional endcapping step, varying silane reagents and reactive groups can be used. These groups include, but are not limited to, dimethylamino, chloro, silazane and methoxy. The silane of the endcap can introduce any range of substituents. Exemplary endcap substituents, include but are not limited to, trimethylsilyl, triethylsilyl, triisopropylsilyl, tert-butyldimethylsilyl, n-butyldimethylsilyl, cyanopropyldimethylsilyl, and cyanopropyldiisopropylsilyl.

FIG. 2 is a schematic representation of an exemplary process described herein where the first step comprises a reaction with a trifunctional aryl (e.g., phenyl) silane such as tris(dimethylamino)phenylsilane, followed by subsequent reaction with a monofunctional aryl (e.g., phenyl) silane such as diphenylmethyl(dimethylamino)silane, and optionally encapping with e.g., a trimethyl silyl group via reaction with e.g., hexamethyldisilazane It will also be understood that the reverse process can also be performed. For example, Step 1 can comprise the reaction of a monofunctional aryl (e.g., phenyl)-based silane and Step 2 can comprise the reaction of a trifunctional aryl (e.g., phenyl)-based silane, then followed by optional endcapping.

It will further be understood that regardless of whether a monofunctional aryl (e.g., phenyl)-based silane followed by a trifunctional aryl (e.g., phenyl)-based silane is used or a trifunctionalaryl (e.g., phenyl)-based silane followed by a monofunctional aryl (e.g., phenyl)-based silane, the described processes can afford products of varying connectivities. This is due to, in part, the extreme difficulty in controlling 1:1 molar reactions between a single reactive group of a functional silane and a single hydroxyl on a particle surface. For example, while Step 1, with the reaction of a trifunctional aryl (e.g., phenyl) silane has the option of reaction with two hydroxyl groups on the particle surface to form a bidendate product, it may be that only one reactive group interacts with one hydroxyl on the particle surface thus forming a single oxygen-silicon bond. In this situation, that leaves two remaining reactive group that can possibly react in Step 2 with one or even two monofunctional aryl (e.g., phenyl) silanes to form a mixture of products. Alternatively, in Step 1, quantitative reaction yield may not be obtained between the trifunctional aryl (e.g., phenyl) silane and all of the available hydroxyl groups on the particle surface. Thus, the possibility exists for one of the monofunctional silanes in Step 2 to react directly with a free-hydroxyl on the particle surface as opposed to a mono- or bidendate trifunctional aryl (e.g., phenyl) silane bonded from Step 1. Other possibilities exist and will be apparent to those skilled in the art.

In one aspect, the present disclosure therefore provides a process for preparing a stationary phase composition described herein, the process comprising: reacting a silica or an organosilica particle with a trifunctional aryl (e.g., phenyl) silane to form a first surface modification; and reacting the silica or an organosilica particle again with a monofunctional aryl (e.g., phenyl) silane to form a second surface modification. In one aspect, the process produces a total aryl (e.g., phenyl) surface coverage of the resulting composition of greater than or equal to 5.3 µmol/m², e.g., greater than or equal to 5.4 µmol/m², greater than or equal to 5.5 µmol/m², greater than or equal to 5.6 µmol/m², greater than or equal to 5.7 µmol/m², greater than or equal to 5.8 µmol/m², greater than or equal to 5.9 µmol/m², or greater than or equal to 6.0 µmol/m². In one aspect, the above process further comprises the step of endcapping.

As stated above, the disclosed process produces the surface modifications described herein. Thus, in one aspect, the disclosed process produces a surface modification comprising the Formula I, II, III, or IV:

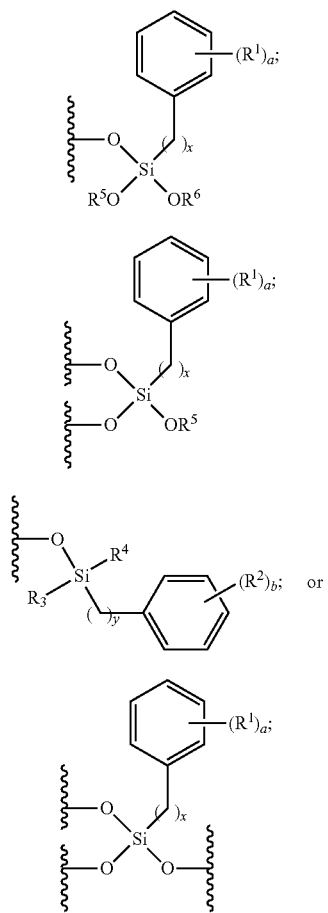

or a combination thereof, wherein the variables are as described in any one of the first to fifteenth embodiments. The compositions produced by the disclosed process also comprise one or more of the average particle sizes, monolithic forms, pH, temperature, surface area, pore volume, micropore surface area, average pore diameter, and ratio of core diameter to particle diameter as described for the exemplary compositions described above.

In certain aspects, the silica or organosilica particles are rehydroxylated prior to reacting with the trifunctional phenyl silane.

In one aspect, a wide pore superficially porous silica particle is used in the disclosed process.

In one aspect, the process described herein affords a % C value that is greater than 0.85%, e.g., greater than 0.90%, or greater than 0.90% of the stationary phase % C value derived from aromatic carbons.

In alternative processes, the reaction of the trifunctional and monofunctional aryl (e.g., phenyl) silane is reversed. Thus, in one aspect, the present disclosure provides a process for preparing a stationary phase composition described herein, the process comprising: reacting a silica or an organosilica particle with a monofunctional aryl (e.g., phenyl)silane to form a first surface modification; and reacting the silica or an organosilica particle again with a trifunctional aryl (e.g., phenyl) silane to form a second surface modification. In one aspect, the process produces a total aryl (e.g., phenyl) surface coverage of the resulting composition of greater than or equal to 5.3 µmol/m², e.g., greater than or equal to 5.4 µmol/m², greater than or equal to 5.5 µmol/m², greater than or equal to 5.6 µmol/m², greater than or equal to 5.7 µmol/m², greater than or equal to 5.8 µmol/m², greater than or equal to 5.9 µmol/m², or greater than or equal to 6.0 µmol/m². In one aspect, the above process further comprises the step of endcapping. This process also may produce a surface modification comprising the Formula I, II, III, or IV:

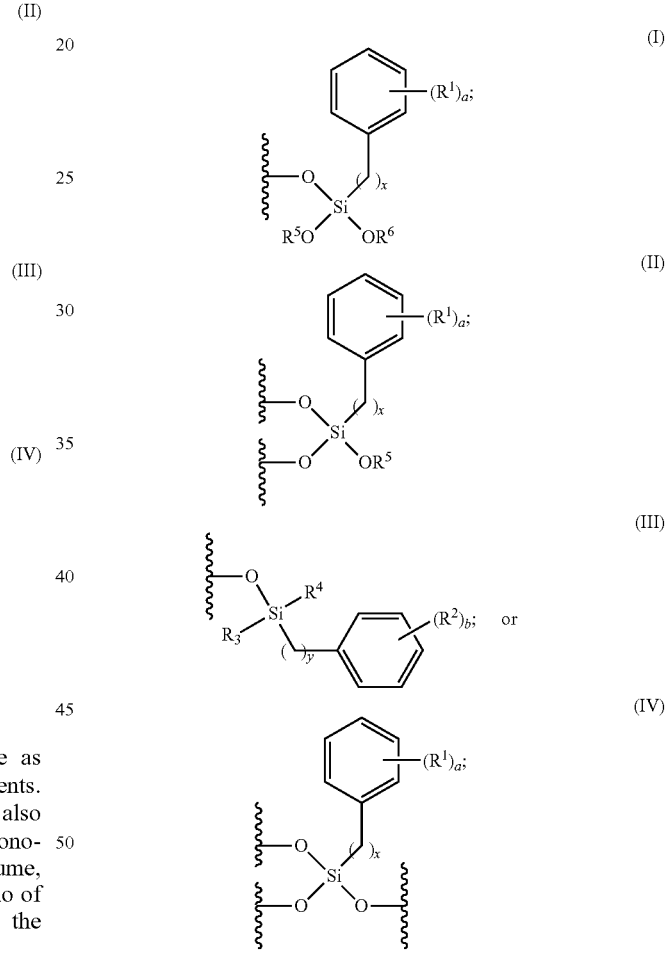

or a combination thereof, wherein the variables are as described in any one of the first to fifteenth embodiments. The compositions produced by this reverse process also may comprise one or more of the average particle sizes, monolithic forms, pH, temperature, surface area, pore volume, micropore surface area, average pore diameter, and ratio of core diameter to particle diameter as described for the exemplary compositions described above. In certain aspects, the silica or organosilica particles may be rehydroxylated prior to reacting with the monofunctional phenyl silane of the reverse process.

The subject technology is further illustrated by the following non-limiting examples.

EXEMPLIFICATION

Synthesis of Protein RPLC Stationary Phases and Initial Properties

Superficially porous particles, approximately 3 μm, were prepared from approximately 2 μm non-porous silica particles using a layer by layer technique. See Journal of chromatography. A 2014, 1357, 36-52 and Journal of chromatography. A 2011, 1218 (15), 1915-38. The crude particles were subsequently ashed, hydrothermally treated, calcined and rehydroxylated using techniques which are well known to those skilled in the art. The final rehydroxylated silica batches were characterized by the following metrics in Table 1.

TABLE 1

|  | Value |
| --- | --- |
| Metrics for Batch 1 Silica | |
| Core Diameter by SEM | 2.0 μm |
| Superficially Porous Particle Diameter by SEM | 3.0 μm |
| Surface Area by Nitrogen Sorption | 21.8 m$^2$/g |
| Total Pore Volume by Hg Porosimetry | 0.27 cm$^3$g |
| Mean Pore Diameter by Hg Porosimetry | 439 Å |
| Skeletal Density by Helium Pyncnometry | 2.25 g/cm$^3$ |
| Metrics for Batch 2 Silica | |
| Core Diameter by SEM | 2.0 μm |
| Superficially Porous Particle Diameter by SEM | 2.9 μm |
| Surface Area by Nitrogen Sorption | 22.2 m$^2$/g |
| Total Pore Volume by Hg Porosimetry | 0.27 cm$^3$g |
| Mean Pore Diameter by Hg Porosimetry | 440 Å |
| Skeletal Density by Helium Pyncnometry | 2.24 g/cm$^3$ |
| Metrics for Batch 3 Silica | |
| Core Diameter by SEM | 2.0 μm |
| Superficially Porous Particle Diameter by SEM | 3.1 μm |
| Surface Area by Nitrogen Sorption | 22.0 m$^2$/g |
| Total Pore Volume by Hg Porosimetry | 0.27 cm$^3$g |
| Mean Pore Diameter by Hg Porosimetry | 445 Å |
| Skeletal Density by Helium Pyncnometry | 2.29 g/cm$^3$ |

Three (3) portions of the final rehydroxylated silica were surface modified by treatment with the silanizing reagents detailed below. All reagents were used as received from Gelest, Inc. Those skilled in the art will recognize that equivalents of the following supplies and suppliers exist and, as such, the suppliers listed below are not to be construed as limiting. Surface modification procedures were used with the following reagents: n-Butyldimethyl(dimethylamino) silane, Diphenylmethyl(dimethylamino)silane, Tris(dimethylamino)phenylsilane and hexamethyldisilazane.

Inventive Composition

The following inventive composition was prepared using the multistep phenyl-based silanization process described herein.

A twenty gram portion of the rehydroxylated silica was slurried in toluene, dried by azeotropic strip, treated with excess Tris(dimethylamino)phenylsilane then washed, hydrolyzed, washed, vacuum dried and analyzed by TGA and % C. The material was then slurried in toluene, dried by azeotropic strip, treated with excess Diphenylmethyl(dimethylamino)silane, washed, vacuum dried and analyzed by TGA and % C. The material was then endcapped with hexamethyldisilazane, using a technique known to those skilled in the art, washed, vacuum dried, and analyzed by TGA and % C.

To compare the differences, and exploit the advantages of this approach and the resulting composition, comparator compositions using the conventional single step phenyl-based silanization approach are described below.

Comparator Composition A

A fifty gram portion of the rehydroxylated silica was slurried in toluene, dried by azeotropic strip, treated with excess n-Butyldimethyl(dimethylamino) silane then washed, vacuum dried and analyzed by TGA and % C. The material was then endcapped with hexamethyldisilazane, using a technique known to those skilled in the art, washed, vacuum dried, and analyzed by TGA and % C.

Comparator Composition B

A fifty gram portion of the rehydroxylated silica was slurried in toluene, dried by azeotropic strip, treated with excess Diphenylmethyl(dimethylamino)silane then washed, vacuum dried and analyzed by TGA and % C. The material was then endcapped with hexamethyldisilazane, using a technique known to those skilled in the art, washed, vacuum dried, and analyzed by TGA and % C.

Percent carbon data for the inventive and comparator bonded phases is tabulated below in Table 2. Surface coverage calculations were based on the change in carbon content before and after surface modification.

Alternative Process

In addition to the procedure described above, iterative bonding reactions can also be performed with a trifunctional silane before proceeding with a subsequent monofunctional silane bonding. For example, a twenty gram portion of rehydroxylated silica can be slurried in toluene, dried by azeotropic strip, treated with excess Tris(dimethylamino) phenylsilane then washed, hydrolyzed, washed, vacuum dried and then analyzed by TGA and % C. The material can then again be slurried in toluene, dried by azeotropic strip, retreated with excess Tris(dimethylamino)phenylsilane then washed, hydrolyzed, washed, vacuum dried and analyzed by TGA and % C. This retreatment technique may be performed iteratively as needed and is a means to increase the final phenyl surface concentration. Alternatively, other phenyl silane polymerization techniques, well known to those skilled in the art, can be used in place of the iterative trifunctional bonding steps. Any one of these extensively bonded materials can next be slurried in toluene, dried by azeotropic strip, treated with an excess amount of a monofunctional silane, like diphenylmethyl(dimethylamino)silane. The resulting material can then be washed, vacuum dried and analyzed by TGA and % C. Finally, the resulting material can also be endcapped, such as with hexamethyldisilazane, using a technique known to those skilled in the art, washed, vacuum dried, and analyzed by TGA and % C.

TABLE 2

| | Prototype | Comparator A - Batch 1 | Comparator B - Batch 1 | Inventive - Batch 1 | Inventive - Batch 2 | Inventive - Batch 2 |
|---|---|---|---|---|---|---|
| | Silica Surface Area (m2/g) (S) | 21.8 | 21.8 | 21.8 | 22.2 | 22.0 |
| Primary (Step 1) Ligand | Primary (Step 1) Ligand | Monofunctional n-Butyldimethyl | Monofunctional Diphenylmethyl | Trifunctional Phenyl | Trifunctional Phenyl | Trifunctional Phenyl |
| | % Carbon of the Material (by Weight) ($P_{CS1}$) | 0.589 | 0.890 | 0.456 | 0.348 | 0.417 |
| | Effective Molecular Weight of the Ligand ($M_{E1}$) | 114.3 | 196.35 | 128.2 | 128.2 | 128.2 |
| | Percent of Ligand Molecular Weight Corresponding to Carbon ($P_{CL1}$) | 63.04 | 79.52 | 56.21 | 56.21 | 56.21 |
| | Coverage ($\mu mol/m^2$) | 3.78 | 2.64 | 2.93 | 2.19 | 2.65 |
| Secondary (Step 2) Ligand | Secondary (Step 2) Ligand | None | None | Monofunctional Diphenylmethyl | Monofunctional Diphenylmethyl | Monofunctional Diphenylmethyl |
| | % Carbon (by Weight) ($P_{CS2}$) | N/A | N/A | 0.905 | 0.934 | 0.919 |
| | Δ % Carbon ($P_{CS2} - P_{CS1}$) | N/A | N/A | 0.449 | 0.586 | 0.502 |
| | Effective Molecular Weight of the Ligand ($M_{E2}$) | N/A | N/A | 196.35 | 196.35 | 196.35 |
| | Percent of Ligand Molecular Weight Corresponding to Carbon ($P_{CL2}$) | N/A | N/A | 79.52 | 79.52 | 79.52 |
| | Coverage ($\mu mol/m^2$) | N/A | N/A | 1.34 | 1.72 | 1.49 |
| End Cap Ligand | End Cap Ligand | TMS | TMS | TMS | TMS | TMS |
| | % Carbon (by Weight) | 0.637 | 0.925 | 0.962 | 0.993 | 0.950 |
| | Δ % Carbon | 0.048 | 0.035 | 0.057 | 0.059 | 0.031 |
| Sum of Primary and Secondary Ligand Coverages ($\mu mol/m^2$) | | 3.78 | 2.64 | 4.27 | 3.91 | 4.53 |
| Total Phenyl Coverage ($\mu mol/m^2$) | | | 5.29 | 5.62 | 5.63 | 5.63 |

Coverage Calculations

Ligand surface coverages (as reported in Table 2) were calculated using equations adapted from J. Liq. Chromatogr., 1, (1978) 561-586 (see below). Equation 1 (Eq 1) provides a means for calculating the surface coverage of a step 1 reaction product and equation 2 (Eq 2) provides a means for calculating the surface coverage of a step 2 (Eq 2) reaction product. From the resulting ligand coverages, a total phenyl coverage can be calculated using equation 3 (Eq 3). Approximations as to the molecular weight of the ligands and their relative amount of carbon content are generated. For a trifunctional silane, these values depend on how the silane bonds to a surface and whether the ligand reacts to form a monodentate, bidentate or tridentate linkage. However, for the surface modifications described herein, the differences in effective molecular weights and relative amounts of carbon content among these various mono-, bi-, or tridendate forms are negligible. To simplify calculations, it was therefore assumed that reactions with trifunctional silanes afford a bidentate surface modified product, i.e., where two hydroxyl groups on the material surface bond react with two reactive groups from a trifunctional silyl to bond with the same silicon atom e.g., to forming a modifier having the Formula II. In order to derive an accurate value for total phenyl surface coverage, it is necessary to measure percent carbon after each discrete step in which a different phenyl containing silane is employed. Example calculations of primary ligand (step 1) coverage, secondary (step 2) ligand coverage, and phenyl surface coverage are provided below:

$$\text{Primary Ligand (Step 1) Coverage } (\mu\text{mol/m}^2) = \frac{10^6 * (P_{cS1} - P_{c0})}{S * (P_{cL1} - P_{cS1}) * M_{E1}} \quad (Eq\ 1)$$

$$\text{Secondary Ligand (Step 2) Coverage } (\mu\text{mol/m}^2) = \frac{10^6 * (P_{cL1} - P_{c0}) * (P_{cS2} - P_{cS1})}{S * (P_{cL1} - P_{cS1}) * ((P_{cL2} - P_{cS2}) * M_{E2})} \quad (Eq\ 2)$$

Where:
$P_{cS1}$=% carbon on the Step 1 material
$P_{c0}$=% carbon on the underivatized material (assumed to equal 0 for a silica particle)
$P_{cL1}$=% carbon in the Step 1 ligand=$100*12*n_1/M_{E1}$
S=specific surface area (m²/g) of the underivatized material
$n_1$=number of carbon atoms in the Step 1 ligand
$M_{E1}$=effective molecular weight (g/mole) of the Step 1 ligand
$P_{cS2}$=% carbon on the Step 2 material
$P_{cL2}$=% carbon in the Step 1 ligand=$100*12*n_2/M_{E2}$
$n_2$=number of carbon atoms in the Step 2 ligand
$M_{E2}$=effective molecular weight of the Step 2 ligand Total Phenyl Coverage =                                                        (Eq 3)

(Moles of Phenyl Groups in the Primary Ligand × Primary Ligand Surface Coverage) +

(Moles of Phenyl Groups in the Secondary Ligand × Secondary Ligand Surface Coverage)

Base particle and bonded phase details for the inventive and comparator compositions are provided in Table 3.

of anti-citrinin murine monoclonal antibody (Intact mAb Mass Check Standard, Part Number 186006552, available from Waters Corporation, Milford Mass.).

A reduced, IdeS digest of NIST mAb Reference Material (RM) 8671 was prepared as follows: 100 µg of formulated NIST mAb Reference Material (RM) 8671 (an IgG1κ) was added to 100 units of IdeS and incubated for 30 minutes at 37° C. The resulting IdeS-digested mAb was then denatured and reduced by the addition of 1M TCEP and solid GuHCl. The final buffer composition for the denaturation/reduction step was approximately 6 M GuHCl, 80 mM TCEP, and 10 mM phosphate (pH 7.1). IdeS-digested NIST mAb RM 8671 (1.5 mg/mL) was incubated in this buffer at 37° C. for 1 hour, prior to being stored at 4° C. until analysis. In a similar fashion, a non-reduced, IdeS digest of infliximab was prepared. Infliximab (100 µg) was added to 100 units of IdeS

TABLE 3

| Composition | Base Particle Details | | | | | Bonded Phase | |
|---|---|---|---|---|---|---|---|
| | Type | Core Diameter (µm) | Particle Diameter (50, v) (µm) | Surface Area (m²/g) | Average Pore Diameter (Å) | Rho | Silane Type (Step 1) | Silane Type (Step 2) |
| Comparator A | SPP silica | 2 | 2.7 | 21.8 | 439 | 0.7 | monofunctional n-butyldimethyl | none |
| Comparator B | SPP silica | 2 | 2.7 | 21.8 | 439 | 0.7 | monofunctional diphenylmethyl | none |
| Inventive (batch 1) | SPP silica | 2 | 2.7 | 21.8 | 439 | 0.7 | trifunctional phenyl | monofunctional diphenylmethyl |
| Inventive (batch 2) | SPP silica | 2 | 2.6 | 22.2 | 440 | 0.7 | trifunctional phenyl | monofunctional diphenylmethyl |
| Inventive (batch 3) | SPP silica | 2 | 2.6 | 22.0 | 445 | 0.7 | trifunctional phenyl | monofunctional diphenylmethyl |

*SPP denotes superficially porous particle. (50, v) signifies a particle diameter measured by Coulter particle size analysis at 50% of the sample volume. Rho is defined as the ratio of the particle's core diameter to its total diameter. Average pore diameter was determined by mercury desorption porosimetry.

The inventive and comparator compositions were packed into chromatographic columns and evaluated for performance using protein reversed phase chromatography of monoclonal antibodies samples.

Protein Reversed Phase Chromatography

Three different monoclonal antibody samples were used to comprehensively evaluate the chromatographic performance of the inventive and comparator stationary phase compositions: a reduced, IdeS digested sample of NIST mAb Reference Material 8671, a non-reduced IdeS digested sample of infliximab, and an unadulterated (intact) sample and incubated for 30 minutes at 37° C. The sample at a concentration of 2 mg/mL was then stored at 4° C. until analyzed, without being denatured or reduced. A 2 mg/mL sample of intact anti-citrinin murine monoclonal antibody was also prepared by reconstituting a 1 mg quantity of the lyophilized mAb in 0.1% (w/v) aqueous formic acid. This sample was also stored at 4° C. until analyzed.

Reversed phase (RP) separations of the reduced, IdeS-fragmented NIST mAb, the IdeS-fragmented infliximab, and intact anti-citrinin mAb were performed using 2.1×50 mm columns. Prior to performing analytical mass loads and corresponding analyses, all tested columns were conditioned by two repeat, 20 µg injections of intact, anti-citrinin mAb.

Samples were thereafter chromatographed at a flow rate of 0.2 mL/min and temperature of 80° C. across a 20 min linear gradient from 15 to 55% organic mobile phase. Species eluting during the above separations were detected serially via UV detection (280 nm, 10 Hz) followed by online ESI-MS. Mass spectra were acquired with a Xevo G2 Q-Tof mass spectrometer operating with a capillary voltage of 3.0 kV, source temperature of 120° C., desolvation temperature of 450° C., and sample cone voltage of 50 V. Mass spectra were acquired at a rate of 2 Hz with a resolution of approximately 20,000 over a range of 500-5000 m/z. Additional method parameters for these analyses are noted below.

FIGS. 3-10 present comparisons of the reversed phase separations obtained using columns packed with the various reversed phase chromatographic materials, the details of which are discussed further below.

Along with chromatograms, peak capacity values were calculated. For each separation, an average peak capacity ($P_c$) was calculated. In addition, to account for the fact that different stationary phases can exhibit varying degrees of selectivity, an effective peak capacity was also calculated using the retention time difference between the last and first eluting species of the separations. The following formulae describe these calculations:

Average Peak Capacity:

$$P_{c,Avg} = 1 + \frac{(t_{gradient})}{\left[\left(\frac{W_{HHFc/2} + W_{HHLc} + W_{HHFd'}}{3}\right)_{NISTmAb} + W_{HHF(ab'2)Infliximab} + W_{HHIntactAnti-CitrininmAb}\right]/3}$$

Average Effective Peak Capacity:

$$P^*_{c,Avg} = 1 + \frac{(\Delta t_{(Fd'NISTmAb-Fc/2Infliximab)})}{\left[\left(\frac{W_{HHFc/2} + W_{HHLc} + W_{HHFd'}}{3}\right)_{NISTmAb} + W_{HHF(ab'2)Infliximab} + W_{HHIntactAnti-CitrininmAb}\right]/3}$$

Method Parameters:
System: ACQUITY UPLC H-Class Bio
Injection Mass Load: 1 µg
Columns: Prototype A, 2.1×50 mm
　Prototype B, 2.1×50 mm
　Prototype C, 2.1×50 mm
　Waters ACQUITY UPLC Protein BEH C4 300 Å 1.7 µm, 2.1×50 mm
　AMT HALO Protein C4, 2.1×50 mm
　Agilent AdvanceBio RP-mAb Diphenyl, 2.1×50 mm
Column Temperature: 80° C.
UV Detection: 280 m, 10 Hz
Mobile Phases: (A) 0.1% Formic Acid in Water/(B) 0.1% (v/v) Formic Acid in ACN
or
(A) 0.1% Trifluoroacetic Acid in Water/(B) 0.1% (v/v) Trifluoroacetic Acid in ACN

| Time(min) | (mL/min) | % A | % B | Curve |
|---|---|---|---|---|
| 1. Initial | 0.200 | 85.0 | 15.0 | Initial |
| 2. 20.00 | 0.200 | 45.0 | 55.0 | 6 |
| 3. 20.30 | 0.200 | 20.0 | 80.0 | 6 |
| 4. 21.30 | 0.200 | 20.0 | 80.0 | 6 |
| 5. 21.60 | 0.200 | 85.0 | 15.0 | 6 |
| 6. 25.00 | 0.200 | 85.0 | 15.0 | 6 |

In addition to the methods noted above, the inventive stationary phase compositions described herein can be used with separation temperatures ranging from 30 up to 100° C., chromatographic velocities between 0.1 and 10 mm/sec, and organic solvent eluents comprised of acetonitrile, methanol, ethanol, n-propanol, isopropanol, n-butanol, n-pentanol or combinations thereof. A variety of different acidic mobile phase additives can also be used e.g., formic acid, trifluoroacetic acid, heptafluoroacetic acid or combinations thereof. These acids can be added to aqueous or organic mobile phase in concentrations ranging between 0.005% (w/v) and 0.5% (w/v).

Superior Qualities of the Disclosed Stationary Phase Compositions

Superior qualities/properties of the disclosed stationary phase compositions over commercially available counterparts are now described. It will be understood that the disclosed compositions have numerous other properties that are available, and which would be apparent to one of skill in the art. Thus, the following are for illustrative purposes and are not a comprehensive listing of all technical effects, or problems to which the present compositions solve.

pH and Temperature Stability

Most methods for protein reversed phase separations entail the use of mobile phases containing acidic ion pairing agents, such as TFA or formic acid. These strongly acidic mobile phases (having pH values between 1.9 and 3) are frequently coupled to high separation temperatures, whereby columns are heated to between 60 and 90° C. This ensures that proteins adopt more reversible structural conformations and more reversible adsorption/desorption behavior. Without resistance to acid catalyzed hydrolysis, a stationary phase can lose fractions of its bonded phase and exhibit unstable, potentially worsening chromatography over the time it is used for protein separations. Thus, an ideal bonded phase for protein reversed phase chromatography must exhibit resistance to acid-catalyzed hydrolysis and be stable to elevated temperatures (e.g., above 60° C.).

Figure 9:
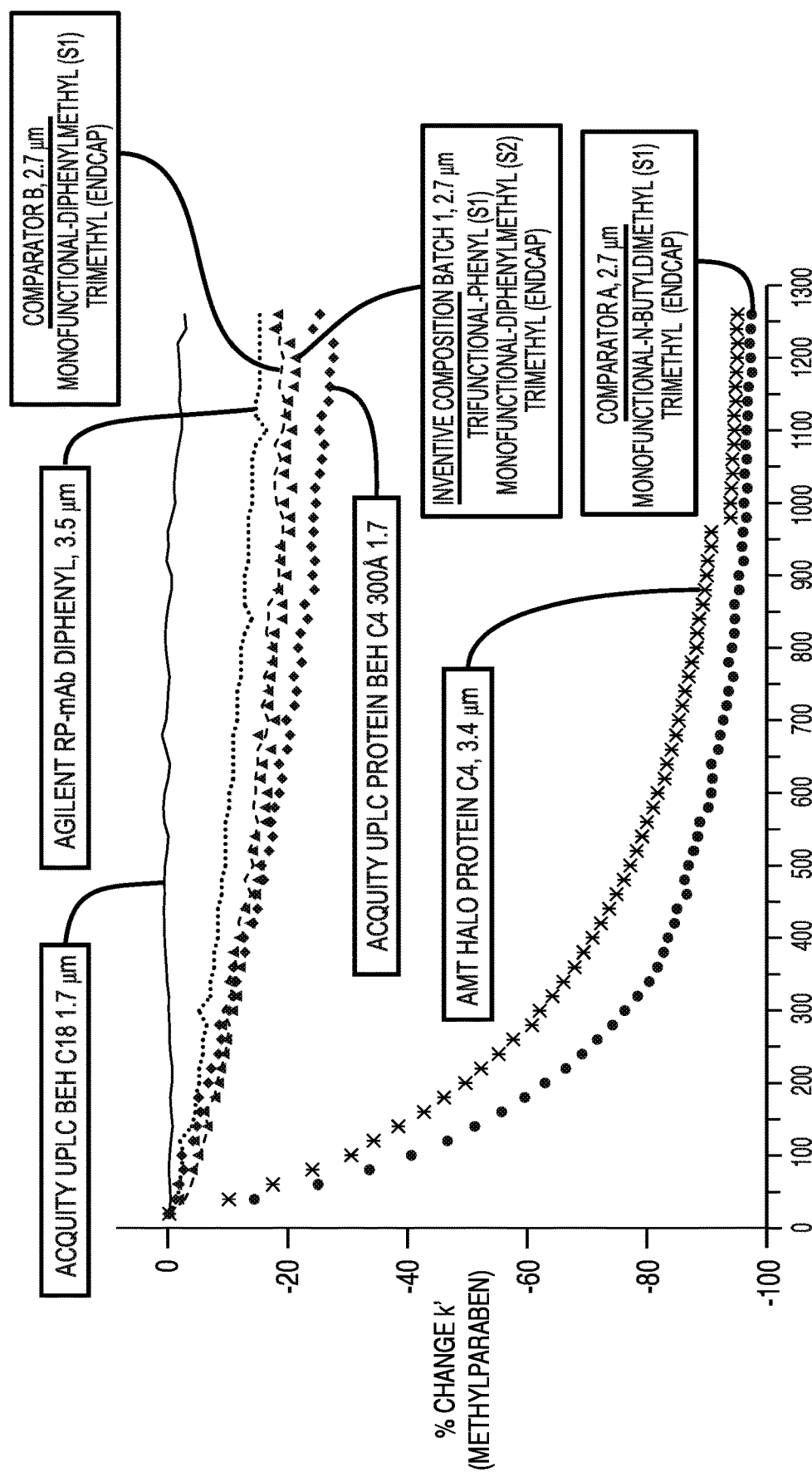
FIG. 9 shows the pH stability of an exemplified stationary phase composition.

To this end, the resistance of various stationary phase compositions to acid catalyzed hydrolysis of bonded phase was evaluated using an isocratic test wherein 2.1×50 mm column were subjected to 0.5% (v/v) aqueous TFA at a flow rate of 1.4 mL/min and temperature of 60° C. for approximately 20 hours. Across this low pH stability test, a sample of methylparaben was periodically injected and its retentivity (k') was monitored. Method parameters for this test are noted below. FIG. 9 presents traces for different stationary phases that correspond to the change in retentivity (k') of methylparaben as a function of the time of exposure to the acidic stress condition.

System: ACQUITY UPLC System with BSM, TUVe, SM, and Column Manager Modules
Columns: Prototype A, 2.1×50 mm
　Prototype B, 2.1×50 mm Prototype C, 2.1×50 mm
Waters ACQUITY UPLC Protein BEH C4 300 Å 1.7 µm, 2.1×50 mm
Waters ACQUITY UPLC BEH C18 130 Å 1.7 µm, 2.1×50 mm
AMT HALO Protein C4, 2.1×50 mm
Agilent AdvanceBio RP-mAb Diphenyl, 2.1×50 mm
Mobile Phase (v/v) 0.5% TFA in Water
Flow Rate (mL/min): 1.4
Sample (µg/mL): Thiourea (25) Aniline (525) Phenol (300) Methyl paraben (50)
Injection Volume: 2.0 µL As shown by FIG. 9, comparator compositions A and B showed changes in methylparaben retentivity of −97% and −20%, whereas the inventive composition only exhibited an −18% change. That is, comparator composition A with its monofunctional n-butyldimethyl bonding showed undesirably poor low pH stability, a characteristic shared with the commercially available AMT Halo Protein C4 column (−95%). Both comparator composition B and the inventive composition, meanwhile, showed significantly better low pH stability. Indeed, their low pH stability was found to be better than commercially available ACQUITY UPLC Protein BEH C4 column (−27%) and about comparable to a commercially Agilent AdvanceBio RP-mAb Diphenyl column (−15%). These differences in low pH stability are of significance to the ability of a column technology to give stable chromatographic performance. Indeed, additional testing has shown that the difference between the low pH stability of comparator composition A and B amounts to about 4 times slower peak retention time shifting and peak width broadening. It is noteworthy that as described below, in addition to being stable at low pH and at elevated temperatures, the inventive composition also has significant improvements in peak capacity, incomplete peak elution, batch-to-batch reproducibility, and baseline properties.

Enhanced Peak Capacity

A bonded phase produced by the multistep silane bonding process described herein provides substantial improvements in peak capacity. These improvements can be observed e.g., in the comparison data provided in FIGS. 3A-F and 4A-F. These figures show the reversed phase chromatograms are displayed for three different antibody samples as obtained with either formic acid or TFA mobile phases. Because they are based on reduced, IdeS-digested NIST mAb, IdeS-digested infliximab, and intact anti-citrinin mAb, these three samples contain seven different mAb-based species ranging from 25 up to 150 kDa (as labeled in FIGS. 3A-F). This makes it possible to comprehensively measure the performance of a prototype stationary phase in a manner that reports on its utility for assaying mAb-based biotherapeutics. The peak width and retention time information derived from these samples can be used to rigorously calculate an average effective peak capacity for prototype and commercially available column technologies (see above for formula). Where a standard peak capacity measurement defines the number of peaks that could hypothetically fit into a separation's gradient time, an effective peak capacity takes into account separation selectivity by the fact that it is based on the empirically observed time window existing between the last and first eluting components of a given separation. Accordingly, it is an effective peak capacity that best informs on the resolving power of a column and its corresponding bonded phase. When viewed in this way, the performance of the inventive composition is quite remarkable.

Figures 6A, 6B:
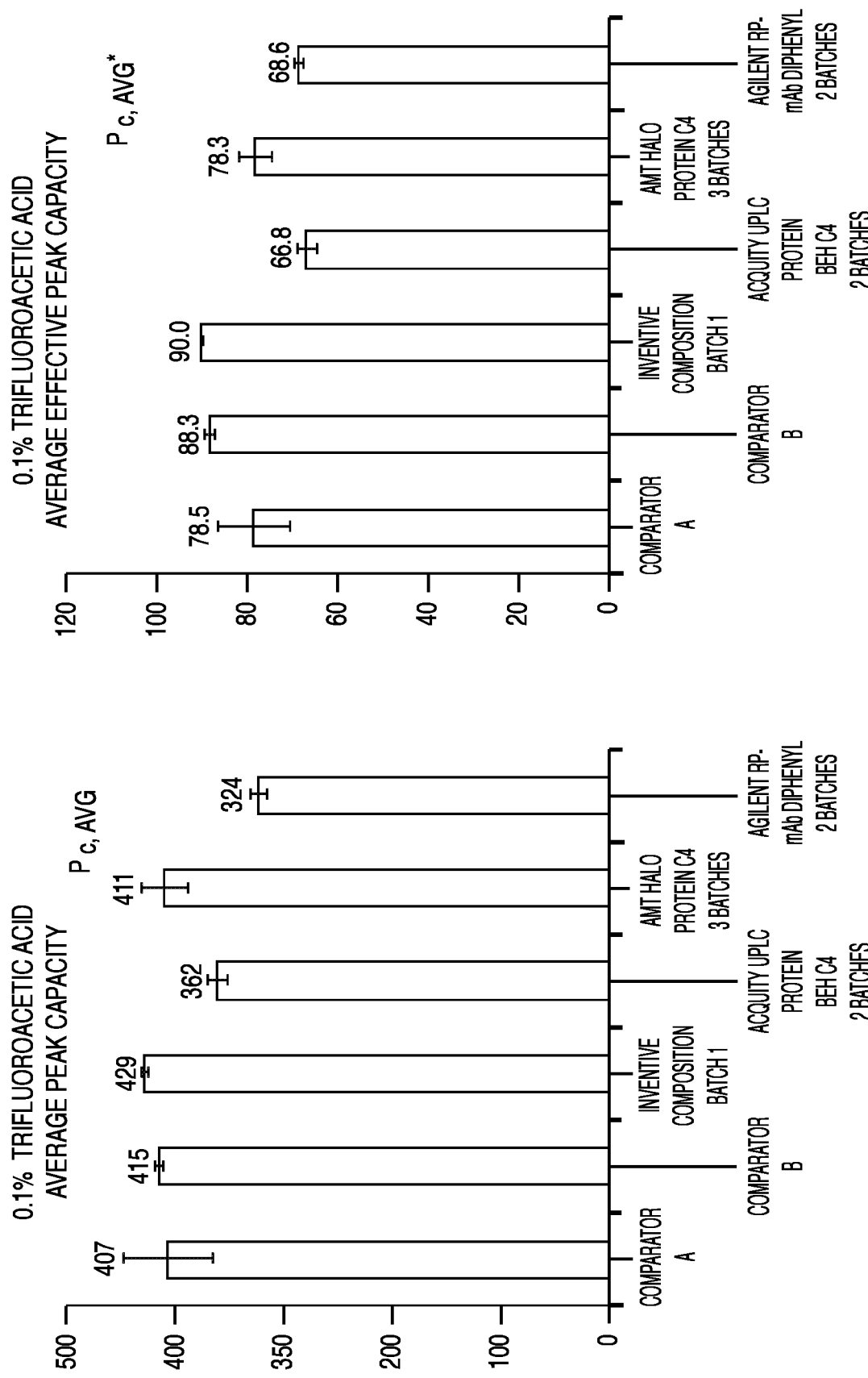
FIG. 6A and FIG. 6B show the average peak capacity values obtained with an exemplified stationary phase composition and comparator compositions when using mobile phases modified with 0.1% (v/v) trifluoroacetic acid, where

The inventive composition yielded a formic acid effective peak capacity that was at least 10% higher than the comparators based on the same base particle. The inventive composition was also 17% higher than commercially available counterparts (See FIG. 5B). As such, the disclosed stationary phase compositions are well suited to LC-MS analyses, given the ionization friendliness of a formic acid mobile phase. Nevertheless, and as shown in FIG. 6B, the effective peak capacity generated by the inventive stationary phase composition with stronger ion pairing TFA mobile phases was also compelling in that it was 2% higher than other prototypes and at least 15% higher than commercially available counterparts. Stationary phase performance was tested in duplicate (n=2 columns). For commercially available stationary phases, unique batches/lots of packing material were evaluated with each replicate column tested. The inventive composition results correspond to batch 1 described above.

Peak Elution and Baseline Properties

Figure 7:
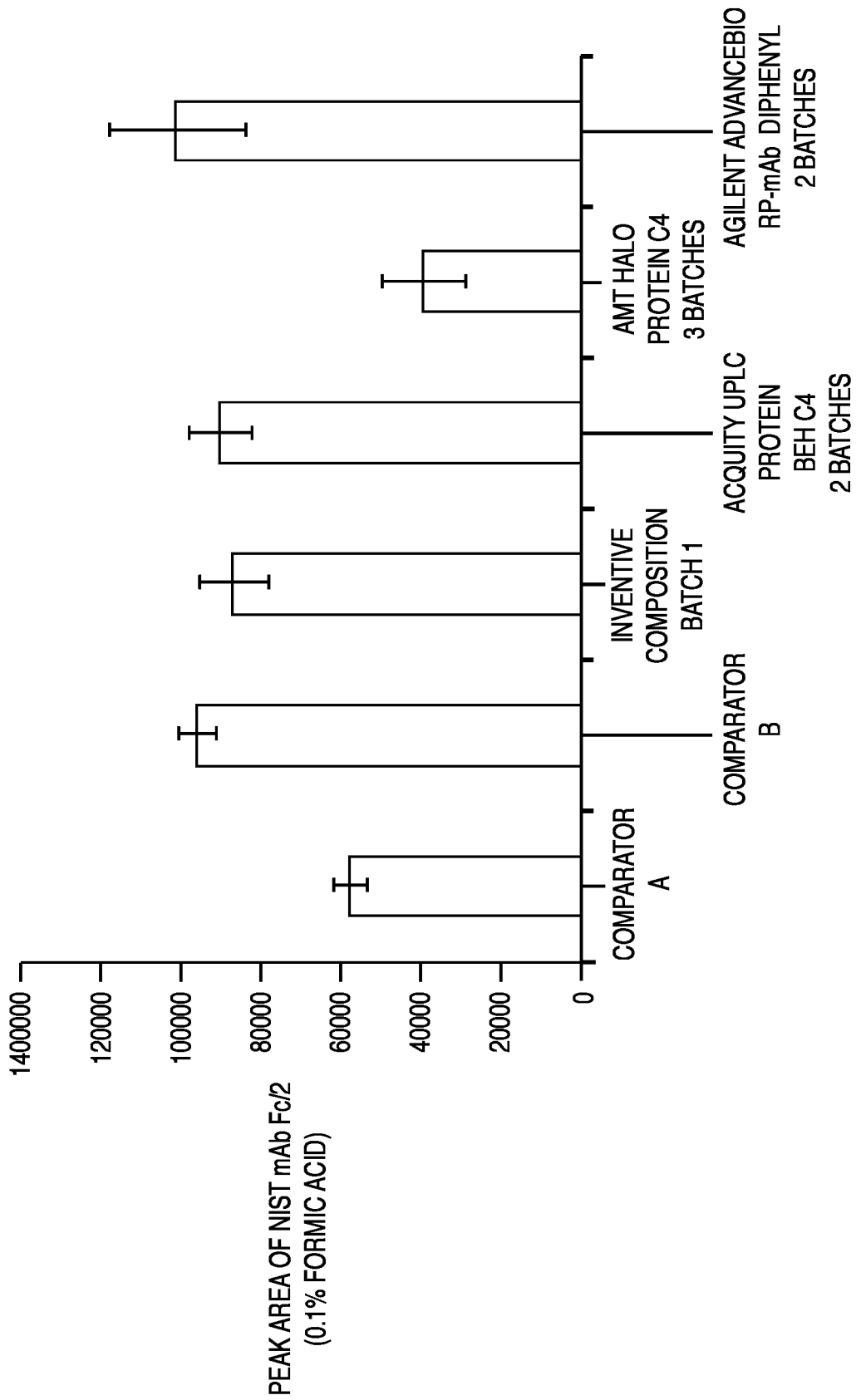
FIG. 7 illustrates the peak area of an Fc/2 NIST mAb subunit as obtained with an exemplified stationary phase composition and comparator stationary phase compositions when using mobile phases modified with 0.1% (v/v) formic acid. Stationary phase performance was tested in duplicate (n=2 columns).
Figures 8E, 8F:
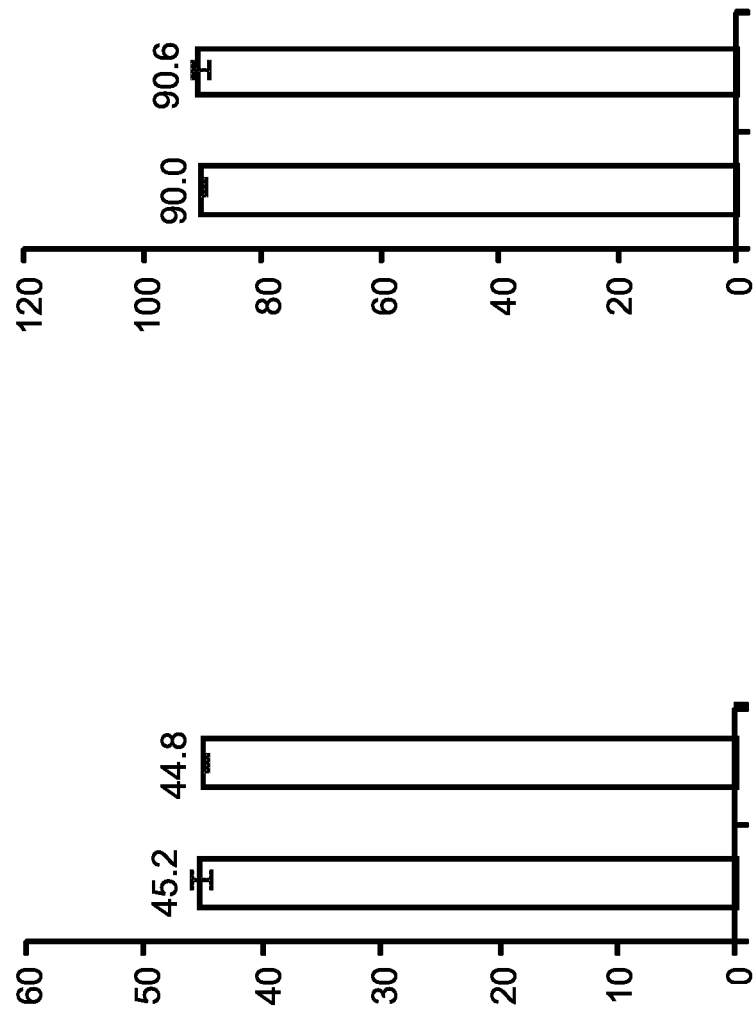

In addition to providing enhanced peak capacity, the inventive stationary phase compositions address issues involving incomplete peak elution and poor baseline quality. Notice that when formic acid separations of mAb subunits are performed with an n-alkyl bonded phase (i.e. Comparator A and AMT Halo Protein C4), the peak area for the Fc/2 NIST mAb subunit is low and the subsequently developed portion chromatogram shows high background (FIGS. 3A-F). In this situation, it has been found that the protein analyte does not elute completely as a discrete chromatographic peak and instead a significant portion of the protein desorbs slowly across a significant portion of the separation. Phenyl-based bonded phases, like that of the inventive stationary phase composition, appear to mitigate this undesirable chromatographic behavior. As shown in FIG. 7, the peak areas of the Fc/2 NIST mAb subunit are appreciably higher with any one of the phenyl based bondings. In turn, the chromatograms from these phases, including the inventive stationary phase compositions, are noticeably cleaner and easier to interpret. For commercially available stationary phases, unique batches/lots of packing material were evaluated with each replicate column tested. The inventive composition results correspond to batch 1 as described above.

Batch-to-Batch Reproducibility

The inventive stationary phase compositions have also been found to yield excellent batch-to-batch reproducibility. Example chromatographic data obtained from two different batches of the inventive stationary phase compositions are provided in FIGS. 8A-8F. Separations achieved with the two batches are highly similar, thereby showing the robustness of future methods based on the inventive stationary phase composition. Stationary phase performance was tested in duplicate (n=2 columns).

Tables 4 and 5 show the retention time reproducibility of the two different batches of FIGS. 8A-8F.

TABLE 4

| | 0.1% (v/v) Formic Acid | | | | |
|---|---|---|---|---|---|
| | Inventive Composition Batch 1 | Inventive Composition Batch 2 | Avg. TFA | Std Dev | RSD (%) |
| $t_R$, NIST mAb $F_c/2$ (min) | 9.29 | 9.17 | 9.23 | 0.08 | 0.92 |
| $t_R$, NIST mAb LC (min) | 10.70 | 10.59 | 10.65 | 0.08 | 0.73 |
| $t_R$, NIST mAb Fd' (min) | 13.27 | 13.17 | 13.22 | 0.07 | 0.56 |
| $t_R(Fd')/t_r(F_c/2)$ | 1.428 | 1.436 | 1.432 | 0.01 | 0.36 |

TABLE 5

| | 0.1% (v/v) TFA | | | | |
|---|---|---|---|---|---|
| | Inventive Composition Batch 1 | Inventive Composition Batch 2 | Avg. TFA | Std Dev | RSD (%) |
| $t_R$, NIST mAb $F_c/2$ (min) | 11.94 | 11.97 | 11.96 | 0.02 | 0.18 |
| $t_R$, NIST mAb LC (min) | 13.00 | 13.04 | 13.02 | 0.02 | 0.19 |
| $t_R$, NIST mAb Fd' (min) | 15.48 | 15.52 | 15.5 | 0.03 | 0.18 |
| $t_R(Fd')/t_r(F_c/2)$ | 1.296 | 1.296 | 1.296 | 0.00 | 0.00 |

In sum, the stationary phase compositions described herein afford protein reversed phase separations of unprecedented quality; have substantial improvements in peak shape, peak capacity, and baseline properties; are batch-to-batch reproducible; and are pH and temperature stable.

The contents of all references, patents and published patent applications cited throughout this application, are incorporated herein by reference.

Lessened Temperature Dependence

Yet another advantageous property of the inventive stationary phase compositions is their reduced temperature dependence. Conventional protein reverse phase separations, such as those of intact monoclonal antibodies (mAbs) or their fragments, have required the use of column temperatures greater than 60° C. in order for analytes to be sufficiently recovered as discrete chromatographic peaks. FIGS. 10A-10C provides chromatographic data obtained with one of the inventive stationary phase compositions as well as comparator stationary phases.

Method Parameters:
System: ACQUITY UPLC H-Class Bio
Injection Mass Load: 1 μg
Columns: Prototype A, 2.1×50 mm
  Prototype B, 2.1×50 mm
  Prototype C, 2.1×50 mm
  Waters ACQUITY UPLC Protein BEH C4 300 Å 1.7 μm, 2.1×50 mm
  AMT HALO Protein C4, 2.1×50 mm
  Agilent AdvanceBio RP-mAb Diphenyl, 2.1×50 mm
Column Temperature: 80° C.
UV Detection: 280 m, 10 Hz
Mobile Phases: (A) 0.1% Formic Acid in Water/(B) 0.1% (v/v) Formic Acid in Acetonitrile
  or
  (A) 0.1% Trifluoroacetic Acid in Water/(B) 0.1% (v/v Trifluoroacetic Acid in Acetonitrile
  or
  (A) 0.02% Trifluoroacetic Acid, 0.08% Formic Acid (v/v) in Water/0.02% Trifluoroacetic Acid, 0.08% Formic Acid (v/v) in Acetonitrile

| Time(min) | (mL/min) | % A | % B | Curve |
|---|---|---|---|---|
| 1. Initial | 0.400 | 85.0 | 15.0 | Initial |
| 2. 10.00 | 0.400 | 45.0 | 55.0 | 6 |
| 3. 10.15 | 0.400 | 20.0 | 80.0 | 6 |
| 4. 10.65 | 0.400 | 20.0 | 80.0 | 6 |
| 5. 10.80 | 0.400 | 85.0 | 15.0 | 6 |
| 6. 12.50 | 0.400 | 85.0 | 15.0 | 6 |

With these data, the recovery of an intact mAb is displayed as a function of column temperature and mobile phase system. In each of the tested mobile phase systems, the inventive stationary phase composition was found to produce higher recoveries across a broader range of temperatures. In fact, unlike comparators, the inventive stationary phase composition was able to produce high recoveries of the analyzed monoclonal antibody at temperatures as low as 50° C.

Accordingly, the stationary phase compositions described herein make it possible to perform protein reversed phase separations at uniquely low column temperatures. This is a capability that can be readily exploited to limit on-column degradation of protein analytes, which can occur by a number of mechanisms, including but not limited to hydrolysis.

Nucleic Acid Reversed Phase Chromatography

Nucleic acids are of increasing therapeutic relevance, as can be seen in their use as small interfering RNA as well as their significance to recent FDA-approved gene therapies. In their analysis and characterization, it has become common to use reversed phase chromatography. In such a separation, a mobile phase additive capable of ion pairing, such as triethanolammonium acetate, is employed to facilitate retention, which would otherwise be challenging to achieve given that nucleic acids are relatively hydrophilic and that they bear many repeat negative charges. In a slight variation of this approach, a mobile phase system containing hexafluoroisopropanol with comparatively lower concentrations of triethanolamine can also be used to achieve comparable separation efficiency along with improved MS sensitivity.

Understanding that there is a need for improved approaches for nucleic acid analysis, the utility of the inventive composition for ion pair reversed phase separations was investigated. A comparative example to assess chromatographic capabilities is provided in FIGS. 11A-11C, wherein a set of 15 to 35-mer deoxythymidine oligonucleotides were separated on either a column comprised of a stationary phase of the inventive composition, ACQUITY® UPLC® BEH C18 130 Å 1.7 μm stationary phase, or ACQUITY® UPLC® BEH C18 300 Å 1.7 μm stationary phase (each commercially available from Waters Corporation, Milford, Mass.). Being that the latter two columns represent the state-of-the-art in oligonucleotide reversed phase separations, this is a rather informative comparison. Immediately upon comparing the chromatograms, it can be observed that there is a significant difference in retentivity. Most notably, the inventive composition provides significantly higher retentivity versus the state-of-the-art BEH C18 columns, despite the fact that this particular embodiment is based on a low surface area substrate (a superficially porous particle with a 450 Å average pore diameter). It is also noteworthy that the effective peak capacity for the set of oligodeoxythymidines was highest with the column comprised of the inventive composition. While not limited to theory, it is believed that the inventive composition is particularly advantageous for nucleic acid separations as a result of its uniquely high surface coverage of phenyl moieties, which ensures extensive opportunity for attractive pi-pi electron interactions between the stationary phase and the nucleobase residues of a nucleic acid molecule. Hence, in a particular embodiment, the inventive composition is used to perform a reversed phase separation that advantageously separates nucleic acid molecules.

Figure 11A:
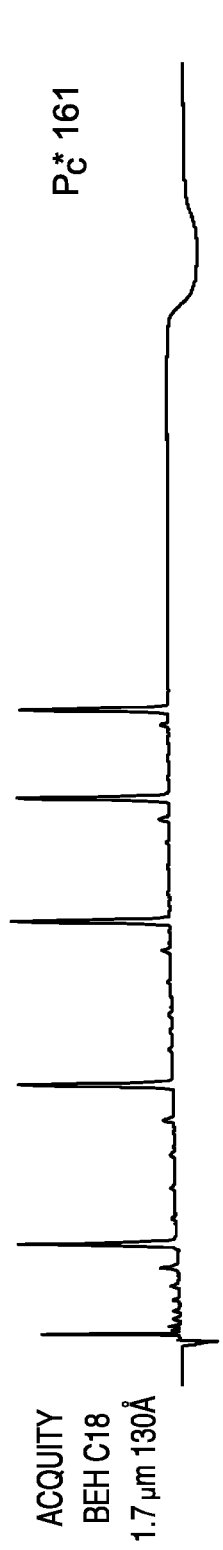
FIGS. 11A-11C show reversed phase separations of 15, 20, 25, 30 and 35-mer long deoxythymidine (20 pmol each) samples using a water/methanol mobile phase system modified with 15 mM triethanolamine and 400 mM hexafluoroisopropanol. Separations were performed with a 0.2 mL/min flow rate, 60° C. temperature, 2.1×100 mm columns, and a 24 min gradient from 19 to 25% methanol. Effective peak capacities are provided as measured from chromatograms obtained with three different stationary phases, including the inventive composition.
Figure 11B:
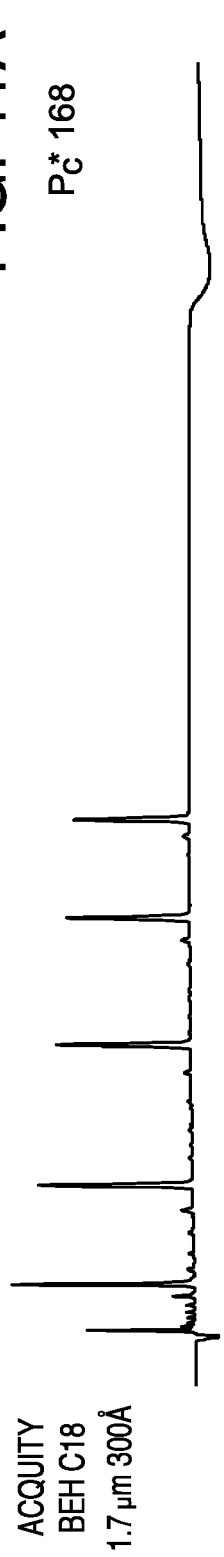
Figure 11C:
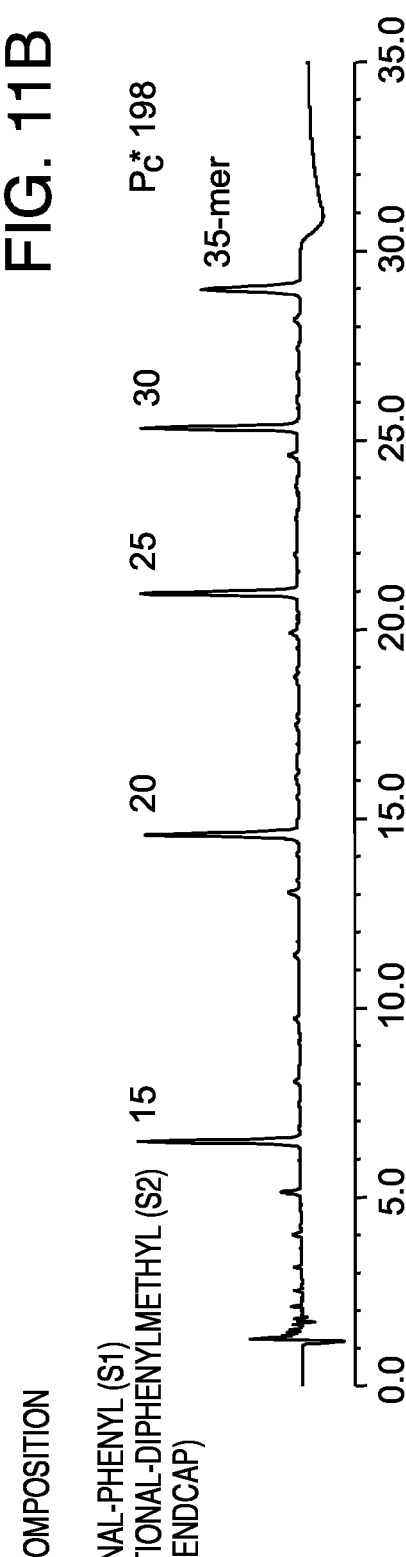

The comparative example corresponding to FIGS. 11A-11C was generated according to the following experimental parameters:

| Method Parameters: | |
| --- | --- |
| System: | ACQUITY ® UPLC ® H-Class Bio |
| Injection Mass Load: | 20 picomole each of 15, 20, 25, 30, and 35-mer deoxythymidine |
| Columns: | Inventive Composition, 450 Å 1.7 µm, 2.1 × 100 mm |
| | Waters ACQUITY ® UPLC ® Peptide BEH C18 300 Å 1.7 µm, 2.1 × 100 mm |
| | Waters ACQUITY ® UPLC ® Peptide BEH C18 130 Å 1.7 µm, 2.1 × 100 mm |
| Column Temperature: | 60° C. |
| UV Detection: | 260 m, 10 Hz |
| Mobile Phases: | (A) 15 mM Triethanolamine, 400 mM Hexafluoroisopropanol in Water |
| | (B) 15 mM Triethanolamine, 400 mM Hexafluoroisopropanol in 50% (v/v) Methanol |

| Time (min) | (mL/min) | % A | % B | Curve |
| --- | --- | --- | --- | --- |
| Initial | 0.2 | 90 | 10 | Initial |
| 24.0 | 0.2 | 70 | 30 | 6 |
| 25.0 | 0.2 | 70 | 30 | 6 |
| 26.0 | 0.2 | 90 | 10 | 11 |
| 35.0 | 0.2 | 90 | 20 | 6 |

Base Digestion of the Inventive Composition and Observation of Phenyl Containing Silyl Multimers In one embodiment of this invention, a multistep silanization yields a surface comprised of a trifunctional monophenyl silyl group connected to a monofunctional diphenyl monomethyl silyl group. To confirm the presence of this novel chemical component, the inventive composition was subjected to a hydrolyzing basic condition, through which components of the bonded phase were liberated into solution. While only qualitative, a subsequent analysis of these reaction products was theorized to give a chance to directly observe the chemical building blocks and major compositional features of the bonded phase.

Herein, 0.50 gram of stationary phase was heated at 65° C. for 2 hours while being rotated in a 5.0 mL volume of 50:50 acetonitrile/water containing 0.2% ammonium hydroxide. The resulting basic extract was thereafter collected as supernatant from centrifugation. Reaction products contained within this basic extract were then analyzed by negative ion mode electrospray ionization (ESI) time of flight (Tof) mass spectrometry.

Figure 12A:
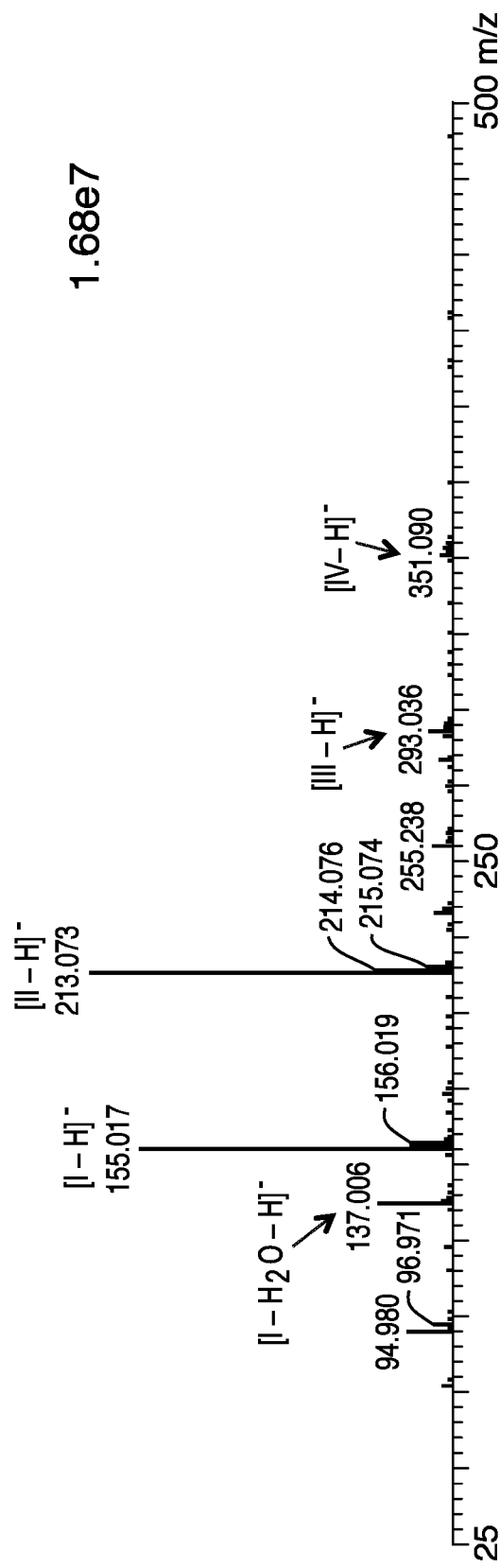
FIG. 12A is an electrospray negative ion mode mass spectrum of the reaction products (FIG. 12B) resulting from base digestion of the inventive composition.
Figure 12B:
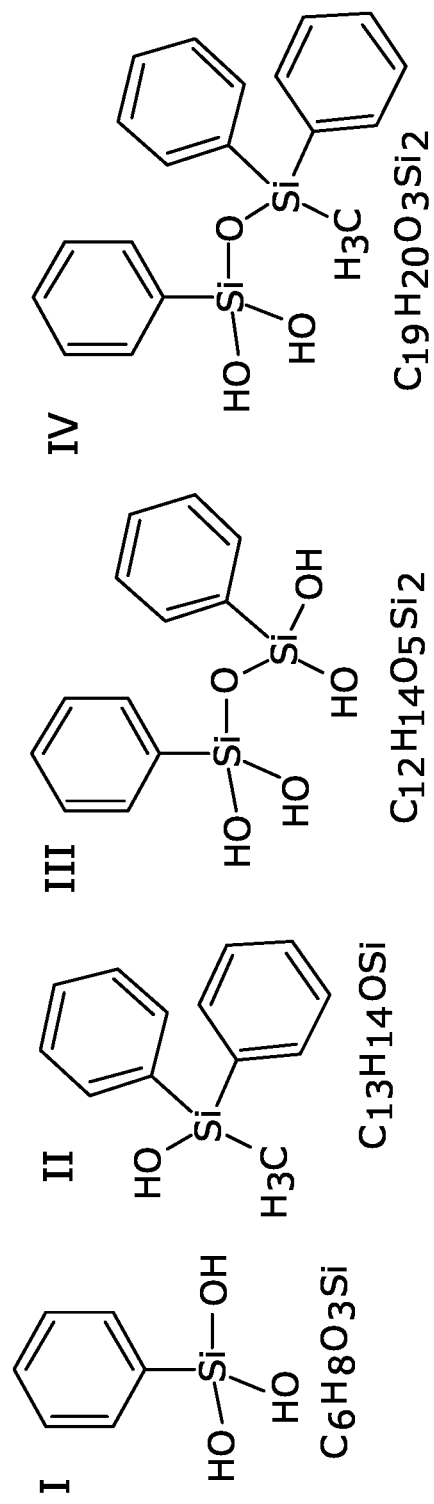

FIG. 12A presents a mass spectrum representative of the inventive composition. From this analysis, four primary chemical compositions were detected. As the basic conditions are sufficient for hydrolyzing any type of siloxane bond, trifunctional monophenyl (FIG. 12B, Structure I) and monofunctional diphenyl monomethyl (FIG. 12B, Structure II) species were seen to dominate the spectrum. In addition, however, two other high molecular weight species were observed at m/z values of 293 and 351. The 293 m/z ion is indicative of two trifunctional monophenyl species connected by a siloxane bond (FIG. 12B, Structure III), while the 351 m/z ion can be attributed to combined trifunctional monophenyl and monofunctional diphenyl monomethyl species (FIG. 12B, Structure IV). It is these latter ions and corresponding base digestion reaction products that provide evidence of the structures and chemical compositions that are most germane to this invention.

The contents of all references, patents and published patent applications cited throughout this application, are incorporated herein by reference.

The invention claimed is:
1. A stationary phase composition comprising a chromatographic surface of porous or non-porous core material comprising a surface modifier having the Formula I, II, III, or IV:

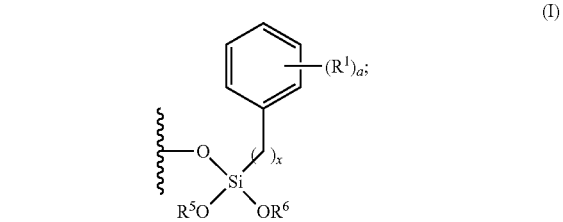

(I)

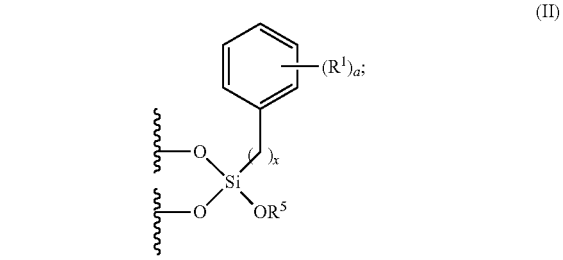

(II)

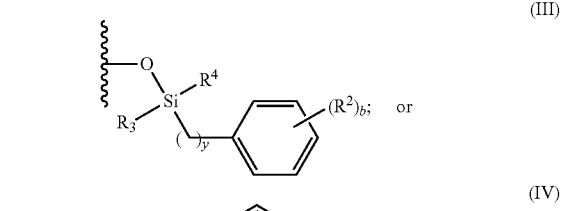

(III)

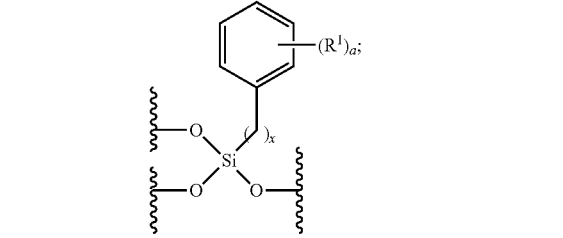

(IV)

or a combination thereof, wherein:
x and y are each independently integers from 0 to 10;
a is 0 to 5;
b is 0 to 5;
$R^1$ and $R^2$ are each independently selected from ($C_1$-$C_3$)alkyl, hydroxyl, fluorine, chlorine, bromine, cyano, —C(O)NH$_2$, and carboxyl;
$R^3$ and $R^4$ are each independently aryl optionally substituted with 1 to 5 groups selected from ($C_1$-$C_3$) alkyl, hydroxyl, fluorine, chlorine, bromine, cyano, —C(O)NH$_2$, and carboxyl, or R$^3$ and R$^4$ are each independently (C$_1$-C$_4$)alkyl optionally substituted with cyano;

R$^5$ and R$^6$ are each independently selected from hydrogen, trimethylsilyl, triethylsilyl, triisopropylsilyl, tert-butyldimethylsilyl, n-butyldimethylsilyl,

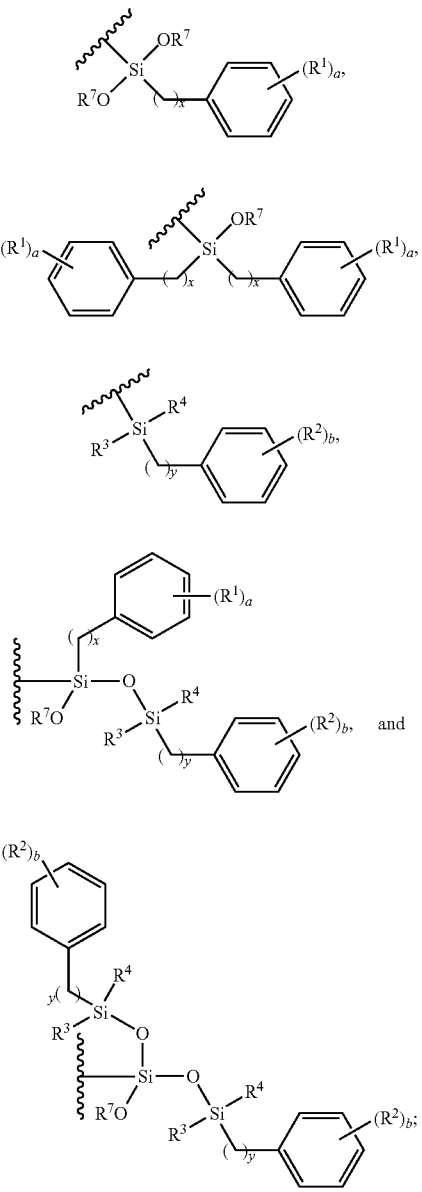

R$^7$ is hydrogen, trimethylsilyl, triethylsilyl, triisopropylsilyl, tert-butyldimethylsilyl, or n-butyldimethylsilyl; and the hashed bond designate the point at which the surface modifier is attached, wherein the total phenyl surface coverage of the composition is greater than or equal to 5.3 µmol/m$^2$.

2. The stationary phase composition of claim 1, wherein the surface modifier of Formula II is of the formula:

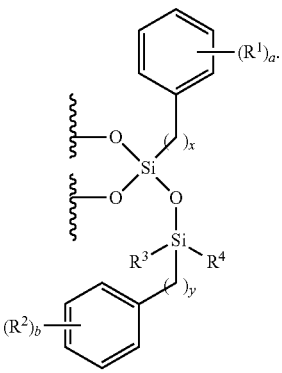

3. The stationary phase composition of claim 1, wherein the surface modifier of Formula II is of the formula:

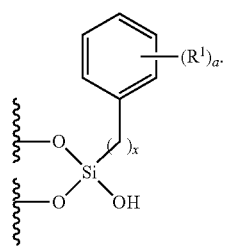

4. The stationary phase composition of claim 1, wherein the surface modifier of Formula II is of the formula:

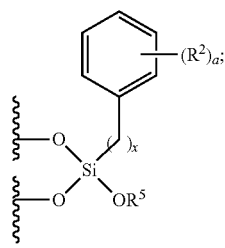

wherein R$^5$ is selected from trimethylsilyl, triethylsilyl, triisopropylsilyl, tert-butyldimethylsilyl, and nbutyldimethylsilyl.

5. The stationary phase composition of claim 4, wherein R$^5$ is trimethylsilyl.

6. The stationary phase composition of claim 1, wherein the surface modifier of Formula II is of the formula:

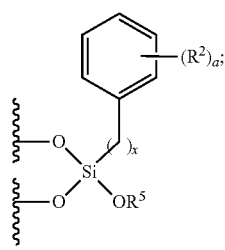

wherein $R^5$ is selected from

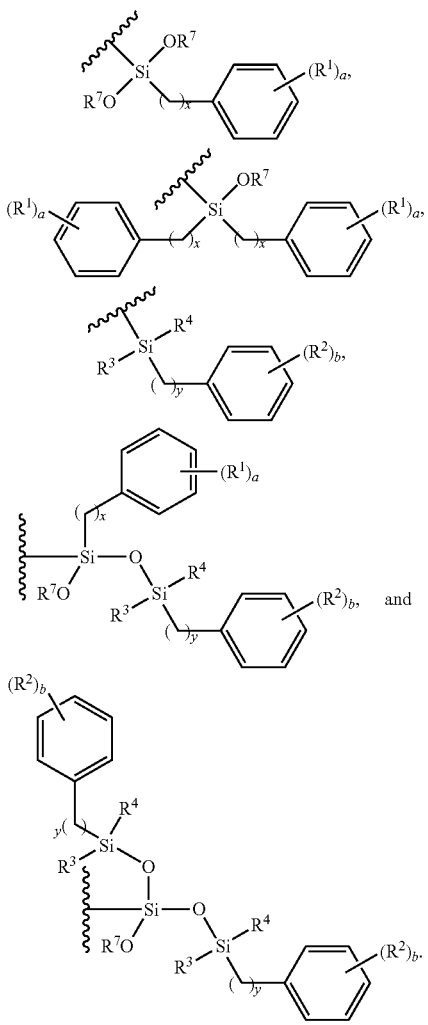

7. The stationary phase composition of claim 1, wherein the surface modifier of Formula I is of the formula:

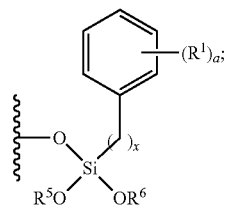

wherein $R^5$ is selected from hydrogen, trimethylsilyl, triethylsilyl, triisopropylsilyl, tert-butyldimethylsilyl, and n-butyldimethylsilyl; and $R^6$ is selected from

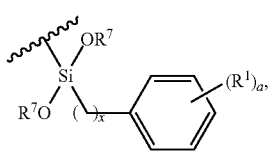

-continued

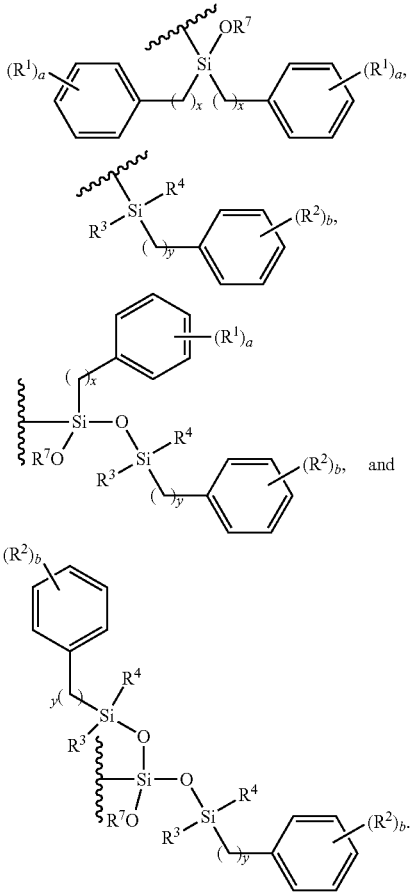

8. The stationary phase composition of claim 1, wherein the surface modifier of Formula I is of the formula

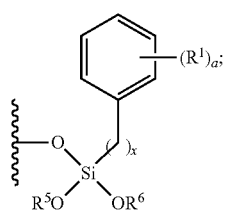

wherein $R^5$ is selected from hydrogen, trimethylsilyl, triethylsilyl, triisopropylsilyl, tert-butyldimethylsilyl, and n-butyldimethylsilyl; and $R^6$ is selected from

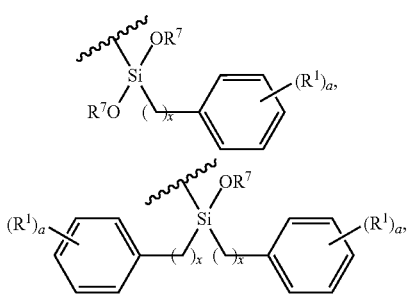

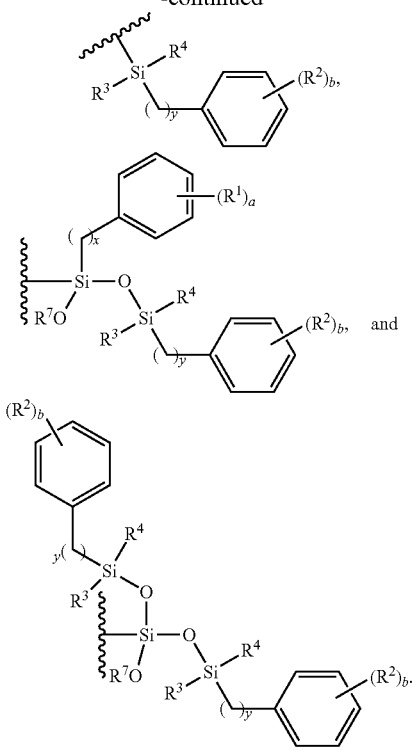

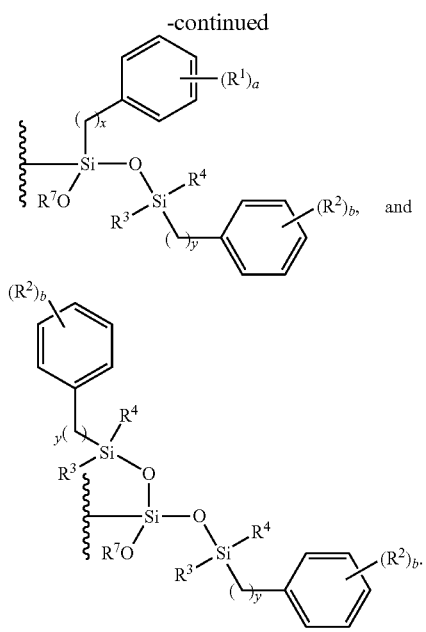

and

10. The stationary phase composition of claim 1, wherein the surface of the porous or non-porous core material further comprises a surface modifier having the Formula V:

wherein $R^8$ is selected from trimethylsilyl, triethylsilyl, triisopropylsilyl, tert-butyldimethylsilyl, and n-butyldimethylsilyl.

11. The stationary phase composition of claim 10, wherein $R^8$ is trimethylsilyl.

12. The stationary phase composition of claim 1, wherein each b is 0 to 3.

13. The stationary phase composition of claim 1, wherein each b is 0.

14. The stationary phase composition of claim 1, wherein each a is 0 to 3.

15. The stationary phase composition of claim 1, wherein each a is 0.

16. The stationary phase composition of claim 1, wherein each x is 0 to 4.

17. The stationary phase composition of claim 1, wherein each x is 0.

18. The stationary phase composition of claim 1, wherein each y is 0 to 4.

19. The stationary phase composition of claim 1, wherein each y is 0.

20. The stationary phase composition of claim 1, wherein each $R^3$ and $R^4$ are independently aryl or $(C_1-C_4)$alkyl optionally substituted with cyano.

9. The stationary phase composition of claim 1, wherein the surface modifier of Formula I is of the Formula

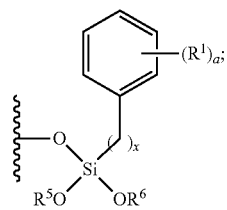

wherein $R^5$ and $R^6$ are each independently selected from hydrogen,

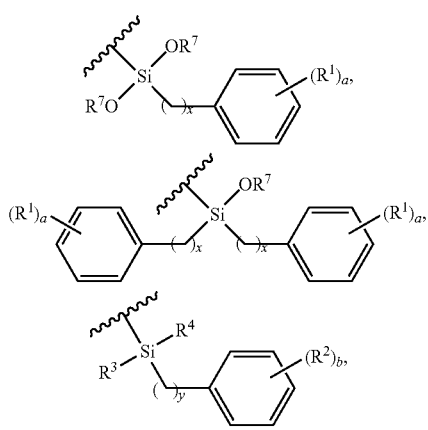

* * * * *